United States Patent
Copeland, II et al.

(10) Patent No.: US 7,971,316 B2
(45) Date of Patent: Jul. 5, 2011

(54) DOOR CLOSER ASSEMBLY

(75) Inventors: David James Copeland, II, Indian Trail, NC (US); Keith James Weepie, Marthasville, MO (US); Robert L. Tadlock, Jr., Charlotte, NC (US); Charles E. Burris, Norwood, NC (US); John J. White, Jr., Huntsville, AL (US); Jason Scott Gurley, Madison, AL (US); Steven Michael Faes, Canisteo, NY (US); Joseph Ralph McGinty, Madison, AL (US); Wade C. Patterson, Huntsville, AL (US)

(73) Assignee: Yale Security Inc., Monroe, NC (US)

( * ) Notice: Subject to any disclaimer, the term of this patent is extended or adjusted under 35 U.S.C. 154(b) by 29 days.

(21) Appl. No.: 12/109,184

(22) Filed: Apr. 24, 2008

(65) Prior Publication Data
US 2009/0093913 A1 Apr. 9, 2009

Related U.S. Application Data

(60) Provisional application No. 60/913,714, filed on Apr. 24, 2007.

(51) Int. Cl.
*E05F 1/08* (2006.01)
(52) U.S. Cl. .......................................................... 16/79
(58) Field of Classification Search .................. 340/606; 16/79
See application file for complete search history.

(56) References Cited

U.S. PATENT DOCUMENTS

| | | | |
|---|---|---|---|
| 618,053 | A | 1/1899 | Brown |
| 1,124,941 | A | 1/1915 | Norton |
| 1,152,339 | A | 8/1915 | Norton |
| 1,520,765 | A | 12/1924 | Norton |
| 1,595,722 | A | 8/1926 | Norton |
| 1,595,723 | A | 8/1926 | Norton |
| 2,843,376 | A | 7/1958 | Osuch et al. |
| 2,877,639 | A | 3/1959 | Gust |
| 2,899,701 | A | 8/1959 | Schroeder |

(Continued)

FOREIGN PATENT DOCUMENTS

EP 0292743 11/1988

(Continued)

OTHER PUBLICATIONS

Yale Security Inc., International Patent Application No. PCT/US2008/061441, International Search Report and Written Opinion, dated Sep. 4, 2008.

(Continued)

*Primary Examiner* — David J Bagnell
*Assistant Examiner* — Matthew Sullivan
(74) *Attorney, Agent, or Firm* — Michael G. Johnston; Moore & Van Allen PLLC

(57) ABSTRACT

A door closer assembly is provided, including a valve regulating an amount of hydraulic fluid that flows through the valve. The amount of hydraulic fluid flowing through the valve controls a force generated by the door closer assembly on a door. A first sensor measures an angular position of the door, and a second sensor measures an angular position of the valve. The angular position of the valve determines the amount of hydraulic fluid flowing through the valve. A controller controls the adjustment of the valve based on the angular position of the door and the angular position of the valve.

7 Claims, 47 Drawing Sheets

U.S. PATENT DOCUMENTS

| | | | |
|---|---|---|---|
| 2,924,449 A | 2/1960 | Leimer et al. | |
| 2,964,779 A | 12/1960 | Gohr | |
| 2,994,906 A | 8/1961 | Check | |
| 3,000,043 A | 9/1961 | Check | |
| 3,003,317 A | 10/1961 | Schroeder et al. | |
| 3,040,372 A | 6/1962 | Ellis | |
| 3,044,103 A | 7/1962 | Check | |
| 3,087,720 A | 4/1963 | Catlett | |
| 3,114,541 A | 12/1963 | Coffey | |
| 3,135,991 A | 6/1964 | Ellis | |
| 3,137,888 A | 6/1964 | Blom | |
| 3,149,366 A | 9/1964 | Martin | |
| 3,156,001 A | 11/1964 | Schmid | |
| 3,156,002 A | 11/1964 | Schmid | |
| 3,161,908 A | 12/1964 | Walach | |
| 3,174,177 A | 3/1965 | Bugge | |
| 3,222,709 A | 12/1965 | Ellis | |
| 3,246,362 A | 4/1966 | Jackson | |
| 3,255,482 A | 6/1966 | Flint | |
| 3,259,936 A | 7/1966 | Sheridan | |
| 3,260,545 A | 7/1966 | Check | |
| 3,266,080 A | 8/1966 | Spencer | |
| 3,284,950 A | 11/1966 | Gute | |
| 3,546,734 A | 12/1970 | Pollack et al. | |
| 3,593,367 A | 7/1971 | Waldo | |
| 3,665,549 A | 5/1972 | Quinn | |
| 3,675,270 A | 7/1972 | Jentsch | |
| 3,680,171 A | 8/1972 | MacDonald | |
| 3,701,180 A | 10/1972 | Jentsch et al. | |
| 3,708,826 A | 1/1973 | Larson | |
| 3,724,023 A | 4/1973 | Tillmann | |
| 3,760,455 A | 9/1973 | Berry et al. | |
| 3,777,423 A | 12/1973 | Coulter et al. | |
| 3,781,943 A | 1/1974 | Cain | |
| 3,785,004 A | 1/1974 | Stoffregen | |
| 3,838,477 A | 10/1974 | Evans et al. | |
| 3,852,846 A * | 12/1974 | Slaybaugh | 16/48.5 |
| 3,874,117 A | 4/1975 | Boehm | |
| 3,886,425 A | 5/1975 | Weiss | |
| 3,895,849 A | 7/1975 | Zehr | |
| 3,934,306 A | 1/1976 | Farris | |
| 3,935,614 A | 2/1976 | Pannone et al. | |
| 4,045,914 A | 9/1977 | Catlett | |
| 4,050,114 A | 9/1977 | Zunkel | |
| 4,064,589 A | 12/1977 | Bejarano et al. | |
| 4,067,084 A | 1/1978 | Tillmann | |
| 4,069,545 A | 1/1978 | Holet et al. | |
| 4,115,897 A | 9/1978 | Zunkel | |
| 4,222,147 A | 9/1980 | Burnett, Jr. | |
| 4,267,619 A | 5/1981 | Suska | |
| 4,285,094 A | 8/1981 | Levings, Jr. | |
| 4,287,639 A | 9/1981 | Denton | |
| 4,289,995 A | 9/1981 | Sorber et al. | |
| 4,330,958 A | 5/1982 | Richmond | |
| 4,333,270 A | 6/1982 | Catlett | |
| 4,348,835 A | 9/1982 | Jones et al. | |
| 4,349,939 A | 9/1982 | Tillmann | |
| 4,358,870 A | 11/1982 | Hong | |
| 4,372,005 A | 2/1983 | Inesso | |
| 4,376,323 A | 3/1983 | Tillmann | |
| 4,382,311 A | 5/1983 | Watts | |
| 4,419,786 A | 12/1983 | Surko, Jr. | |
| 4,429,490 A | 2/1984 | Zunkel | |
| 4,483,043 A | 11/1984 | Tillmann | |
| 4,486,917 A | 12/1984 | Johnston et al. | |
| 4,506,407 A | 3/1985 | Downey | |
| 4,533,905 A | 8/1985 | Leivenzon et al. | |
| 4,553,656 A | 11/1985 | Lense | |
| 4,573,238 A | 3/1986 | Phillips | |
| 4,590,639 A | 5/1986 | Fritsche et al. | |
| 4,658,468 A | 4/1987 | Tillmann et al. | |
| 4,660,250 A | 4/1987 | Tillman et al. | |
| 4,663,800 A | 5/1987 | Mettenleiter et al. | |
| 4,665,583 A | 5/1987 | Frolov et al. | |
| 4,669,147 A | 6/1987 | Suchanek | |
| 4,669,218 A | 6/1987 | Kornbrekke et al. | |
| 4,727,679 A | 3/1988 | Kornbrekke et al. | |
| 4,750,236 A | 6/1988 | Teague, Jr. | |
| 4,783,882 A | 11/1988 | Frolov | |
| 4,785,493 A | 11/1988 | Tillmann et al. | |
| 4,793,023 A | 12/1988 | Simpson et al. | |
| 4,815,163 A | 3/1989 | Simmons | |
| 4,847,946 A | 7/1989 | Nam et al. | |
| 4,848,031 A | 7/1989 | Yamagishi et al. | |
| 4,878,265 A | 11/1989 | Nesbitt | |
| 4,894,883 A | 1/1990 | Fleischhauer | |
| 4,966,266 A | 10/1990 | Yamada et al. | |
| 4,972,629 A | 11/1990 | Merendino et al. | |
| 4,973,894 A | 11/1990 | Johansson | |
| 4,995,194 A | 2/1991 | Schultze et al. | |
| 4,999,551 A | 3/1991 | Yoshida et al. | |
| 5,024,124 A | 6/1991 | Popov et al. | |
| 5,040,331 A | 8/1991 | Merendino et al. | |
| 5,048,151 A | 9/1991 | Orii et al. | |
| 5,050,268 A | 9/1991 | Toledo | |
| 5,083,342 A | 1/1992 | Klinefelter | |
| 5,090,089 A | 2/1992 | Schulte et al. | |
| 5,117,646 A * | 6/1992 | Nose et al. | 62/181 |
| 5,129,091 A | 7/1992 | Yorimoto et al. | |
| 5,187,835 A | 2/1993 | Lee | |
| 5,193,647 A | 3/1993 | O'Brien, II | |
| 5,219,275 A * | 6/1993 | Ribaudo | 417/291 |
| 5,221,239 A | 6/1993 | Catlett | |
| 5,230,074 A | 7/1993 | Canova, Jr. et al. | |
| 5,243,735 A | 9/1993 | O'Brien, II | |
| 5,251,400 A | 10/1993 | Schultze | |
| 5,259,090 A | 11/1993 | Fayngersh | |
| 5,265,306 A | 11/1993 | Yu | |
| 5,272,787 A | 12/1993 | Salena et al. | |
| 5,278,480 A | 1/1994 | Murray | |
| 5,291,630 A | 3/1994 | Brown | |
| 5,337,448 A | 8/1994 | Brown | |
| 5,343,593 A | 9/1994 | Fayngersh | |
| 5,375,374 A | 12/1994 | Rohroff, Sr. | |
| D355,580 S | 2/1995 | Salena et al. | |
| 5,386,614 A | 2/1995 | Fayngersh | |
| 5,386,885 A | 2/1995 | Bunzl et al. | |
| 5,417,013 A | 5/1995 | Tillmann | |
| 5,428,278 A | 6/1995 | Bollengier et al. | |
| 5,468,042 A | 11/1995 | Heinrichs et al. | |
| 5,502,874 A | 4/1996 | Lucas | |
| 5,507,120 A | 4/1996 | Current | |
| 5,513,467 A | 5/1996 | Current et al. | |
| 5,594,316 A | 1/1997 | Hayashida | |
| 5,630,248 A | 5/1997 | Luca | |
| 5,634,296 A | 6/1997 | Hebda | |
| 5,651,216 A | 7/1997 | Tillmann | |
| 5,666,692 A | 9/1997 | Toledo | |
| 5,687,507 A | 11/1997 | Beran | |
| 5,706,551 A | 1/1998 | Jeynes et al. | |
| 5,709,009 A | 1/1998 | Lasson et al. | |
| 5,752,344 A | 5/1998 | Richmond | |
| 5,802,670 A | 9/1998 | Bienek | |
| 5,828,302 A | 10/1998 | Tsutsumi et al. | |
| 5,829,097 A | 11/1998 | Toledo | |
| 5,829,508 A | 11/1998 | DeBower et al. | |
| 5,832,561 A | 11/1998 | Bienek | |
| 5,832,562 A | 11/1998 | Luca | |
| 5,850,671 A * | 12/1998 | Kaser | 16/79 |
| 5,851,049 A | 12/1998 | Squire et al. | |
| 5,851,050 A | 12/1998 | Squire et al. | |
| 5,878,530 A | 3/1999 | Eccleston et al. | |
| 5,881,497 A | 3/1999 | Borgardt | |
| 5,901,412 A | 5/1999 | Jentsch | |
| 5,913,763 A | 6/1999 | Beran et al. | |
| 5,930,954 A | 8/1999 | Hebda | |
| 5,956,249 A | 9/1999 | Beran et al. | |
| 5,957,108 A * | 9/1999 | Kato | 123/336 |
| 6,006,475 A | 12/1999 | Schwantes et al. | |
| 6,067,753 A | 5/2000 | Hebda | |
| 6,115,965 A | 9/2000 | Jennings | |
| 6,118,243 A | 9/2000 | Reed et al. | |
| 6,135,514 A | 10/2000 | Kowalewski et al. | |
| 6,167,589 B1 | 1/2001 | Luedtke | |
| 6,209,695 B1 * | 4/2001 | Braford, Jr. | 192/3.58 |
| 6,223,469 B1 | 5/2001 | Moll | |
| 6,260,236 B1 | 7/2001 | Toledo | |

| | | |
|---|---|---|
| 6,282,750 B1 | 9/2001 | Bishop et al. |
| 6,318,196 B1 | 11/2001 | Chang |
| 6,336,294 B1 | 1/2002 | Kowalczyk et al. |
| 6,343,437 B1 | 2/2002 | Hoffman et al. |
| 6,347,485 B1 | 2/2002 | Hebda |
| 6,357,805 B1 | 3/2002 | Hebda |
| 6,384,414 B1 | 5/2002 | Fisher et al. |
| 6,397,430 B1 | 6/2002 | Brown et al. |
| 6,397,431 B1 | 6/2002 | Alonso |
| 6,412,224 B1 | 7/2002 | Feucht et al. |
| 6,434,788 B1 | 8/2002 | Schulte |
| 6,442,795 B1 | 9/2002 | Chen |
| 6,481,160 B1 | 11/2002 | Kowalczyk |
| 6,484,784 B1 | 11/2002 | Weik, III et al. |
| 6,493,904 B1 | 12/2002 | Chiang |
| 6,530,178 B1 | 3/2003 | Kowalczyk et al. |
| 6,563,431 B1 | 5/2003 | Miller, Jr. |
| 6,618,899 B1 | 9/2003 | Ginzel et al. |
| 6,633,094 B1 | 10/2003 | Andou |
| 6,634,140 B1 | 10/2003 | Sellman |
| 6,640,494 B2 | 11/2003 | Hormann |
| 6,751,909 B2 | 6/2004 | Ranaudo |
| 6,786,006 B2 | 9/2004 | Kowalczyk et al. |
| 6,883,275 B2 | 4/2005 | Hellinga et al. |
| 6,886,217 B2 | 5/2005 | Foster |
| 6,959,949 B2 | 11/2005 | Rockenbach |
| 7,068,179 B2 | 6/2006 | Snell et al. |
| 7,124,469 B2 | 10/2006 | Tsekhanovsky et al. |
| 7,138,912 B2 | 11/2006 | Fitzgibbon et al. |
| 7,234,201 B2 | 6/2007 | Brown et al. |
| 7,270,029 B1 | 9/2007 | Papanikolaou et al. |
| 7,296,380 B2 | 11/2007 | Backman |
| 2001/0007163 A1 | 7/2001 | Alonso |
| 2001/0015033 A1 | 8/2001 | Minami |
| 2002/0092126 A1 | 7/2002 | Chen |
| 2002/0092237 A1 | 7/2002 | Hebda |
| 2002/0133904 A1 | 9/2002 | Donoval et al. |
| 2003/0097793 A1 | 5/2003 | Kowalczyk et al. |
| 2003/0204935 A1 | 11/2003 | Kim |
| 2004/0034964 A1 | 2/2004 | Loggen et al. |
| 2004/0251868 A1 | 12/2004 | Sato et al. |
| 2005/0154602 A1 | 7/2005 | Hertz |
| 2006/0021189 A1 | 2/2006 | Johnson |
| 2006/0086468 A1 | 4/2006 | Altimore |
| 2006/0191204 A1 | 8/2006 | Herwig et al. |
| 2006/0197481 A1 | 9/2006 | Hotto et al. |
| 2006/0244271 A1 | 11/2006 | Hass |
| 2009/0034208 A1* | 2/2009 | Suzuki .................. 361/725 |
| 2009/0265992 A1* | 10/2009 | Hass et al. ............... 49/340 |

FOREIGN PATENT DOCUMENTS

| | | |
|---|---|---|
| GB | 2244092 | 11/1991 |
| GB | 2278882 | 12/1994 |
| JP | 6033994 | 2/1994 |
| JP | 2000213234 | 8/2000 |

OTHER PUBLICATIONS

Yale Security, Inc., International Patent Application No. PCTUS2005023398, International Search Report and Written Opinion.

Yale Security, Inc., International Patent Application No. PCTUS2005023398, International Preliminary Report on Patentability.

US 7,170,240, 01/2007, Hancock et al. (withdrawn)

* cited by examiner

Abbreviations and Terms:
- L – Latch Speed
- C – Closing Speed
- B – Backcheck Speed
- D – Delay Time
- ω – Allowable Speed variation for the control scheme. This is a constant defined before the design is finished.
- Pinion – The pinion is the shaft that protrudes from the closer body and connects the arm set to the closer. The pinion translates the rotational speed and loads into linear speeds and loads within the closer body through an internal gear set.
- Home – The Home location is where the door is fully closed and latched.
- Fully Open – The farthest point the installer / facilities manager wants the door to open to (in terms of pinion position).

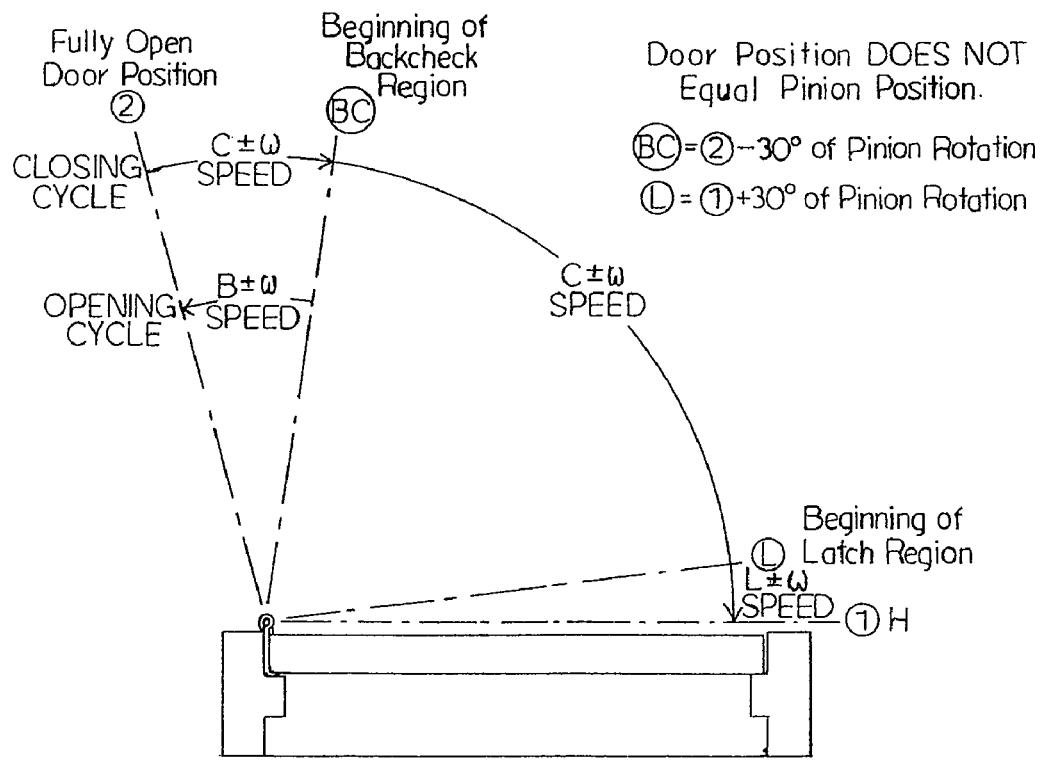

FIG. 27

Door Position Angle ◊ Pinion Position Angle
| Door Angle | Pinion Angle per Templated Mounting Type | | |
|---|---|---|---|
| | Regular | Parallel | Top Jamb |
| 0 | 15.0° | 52.1° | 19.4° |
| 10 | 46.4° | 71.1° | 44.3° |
| 20 | 70.3° | 85.5° | 62.5° |
| 30 | 88.6° | 97.8° | 77.6° |
| 40 | 103.7° | 108.9° | 90.9° |
| 50 | 116.8° | 119.4° | 103.1° |
| 60 | 128.9° | 129.3° | 114.5° |
| 70 | 140.1° | 138.9° | 125.3° |
| 80 | 150.8° | 148.0° | 135.5° |
| 90 | 170.0° | 156.8° | 145.3° |
| 100 | 161.0° | 165.1° | 154.6° |
| 110 | 179.8° | 173.1° | 163.4° |
| 120 | 189.3° | 179.5° | 171.7° |
| 130 | 198.0° | 187.5° | 179.3° |
| 140 | 206.2° | 193.8° | 173.8° |
| 150 | 213.9° | 199.5° | 192.3° |
| 160 | 221.1° | 204.6° | 197.7° |
| 170 | 227.7° | 209.0° | 202.2° |
| 180 | 233.7° | 212.8° | 206.1° |
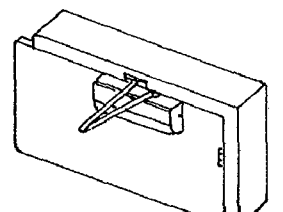
Regular Mounting
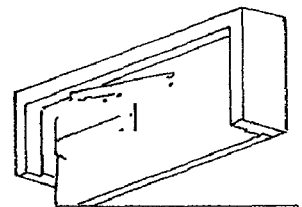
Parallel Mounting
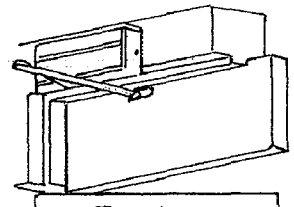
Top Jamb Mounting
FIG. 28

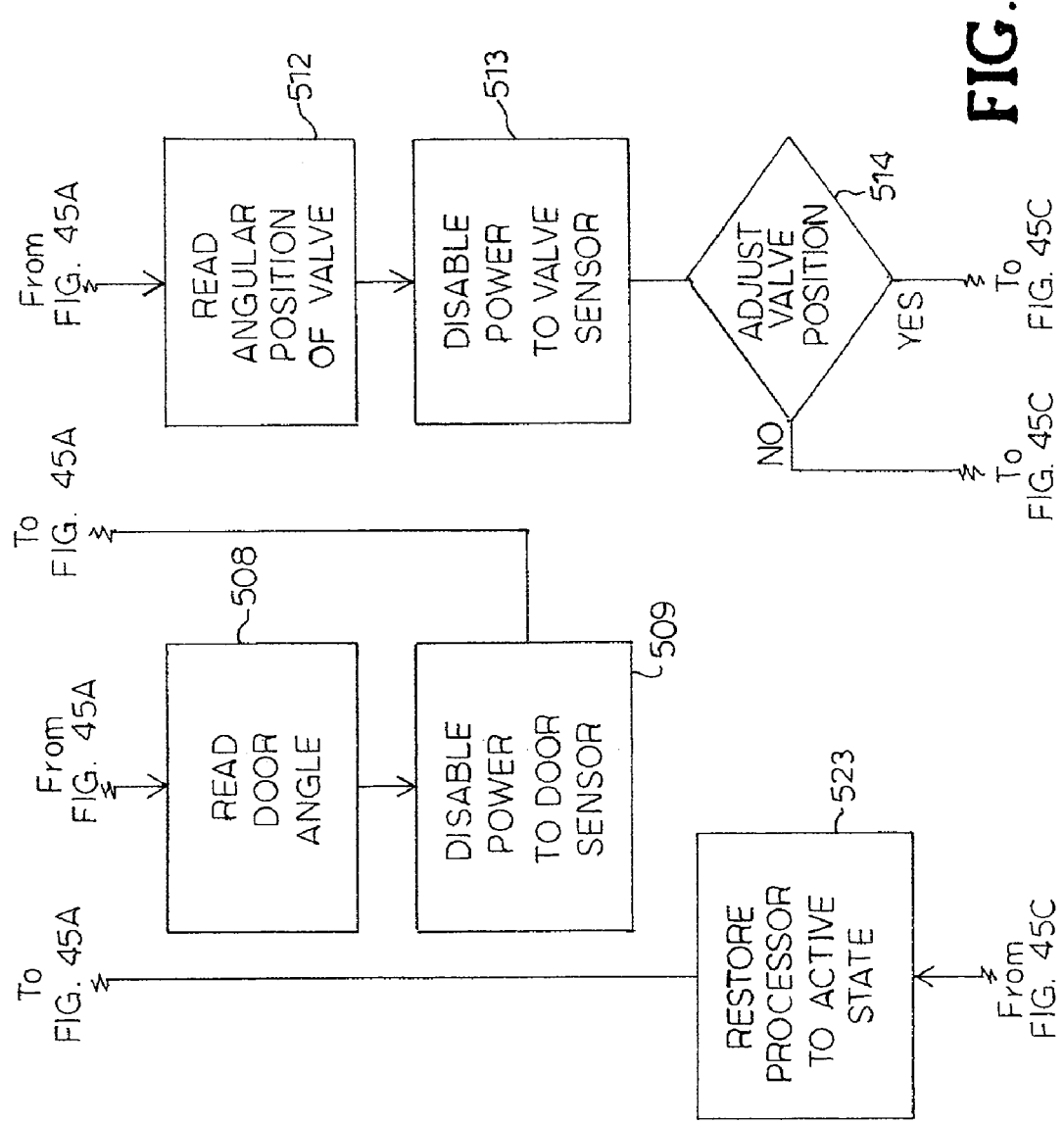

DOOR CLOSER ASSEMBLY

BACKGROUND

The invention relates to the field of door closers, and more particularly concerns varying the force applied to a door by a closer depending on the door operating position.

Door closers are used to automatically close doors, saving people who pass through the doorway the effort of closing the door and helping to ensure that doors are not inadvertently left open. In general, a door closer may be attached to the top of a door, and a pivotable arm extends from the door closer to a door frame or wall. When the door is opened, the door closer automatically generates a mechanical force that actuates the arm, causing the arm to close the door without any manual application of force.

Many conventional door closers are designed to apply varying forces to a door as a function of the door angle, meaning the angle at which the door is open relative to the door frame. A door and door closer may be considered to experience an opening cycle and a closing cycle. With respect to the opening cycle, the door starts in the fully closed or home position, typically where the door is at the jamb. When the door is opened, the door closer generates little force until the door reaches a certain predetermined door angle, which may be designated as the beginning of the backcheck region. As the door enters the backcheck region, the door closer applies force to the door. This force slows the progress of the door, increasing the force required to open the door further, and may help to prevent the door from hitting a wall or otherwise opening past a desired stop point. Increase in force applied by a door closer at other points between the home position and the beginning of the backcheck region may be included as a feature of a particular door closer. Therefore, as the door angle increases or, in other words, as the door is opened wider, it becomes more difficult to continue pushing the door open, usually for protection of an adjacent wall.

When the door is released by the user, for example, from the fully opened position, the force generated by the door closer begins the closing cycle. The door may pass through the backcheck region and to the beginning of a latch region, proximate to the home position, with a substantially constant force applied by the door closer. As the door reaches the beginning of the latch region, very little or no force is applied to the door. If calibrated correctly, the latch region allows the door to close without slamming the door or damaging the door frame, and with relatively low risk of injury to a person's body part struck by the door. Reduction in the force applied by a door closer at other points between the fully open position and the latch region may be included as a feature of a particular door closer.

Many conventional door closers are mechanically actuated and have a piston and a plurality of springs and valved ports. The piston moves through a reservoir filled with a hydraulic fluid, such as oil. The piston is coupled to the door closer's arm such that, as the door is opened, the piston is moved in one direction and, as the door is closed, the piston is moved in the opposite direction. As the piston moves, it displaces hydraulic fluid, which may be forced through various valved ports. By allowing, limiting, or preventing flow of hydraulic fluid, the valved ports control the varying amounts of force applied to the door as a function of door angle. The piston may either cover or expose individual ports to make flow of hydraulic fluid through the ports possible depending position of the piston, as determined by the door angle. The force exerted by the door closer depends on the open or closed status of the ports.

The door's opening and closing profile can be controlled by adjusting the valves, which may often be done by turning a screw to alter the flow characteristics through the valve and thereby control the force applied by the closer. However, this adjustment may be problematic in that the valves interact and changing the setting of one valve generally affects the flow rates of the other valves. Many conventional door closers implement undesirable closing characteristics because installers may be unwilling or unable to manually adjust the valve settings in a desired manner, or installers may be unaware that the valve settings can be changed in order to effectuate a desired closing profile.

Accordingly, there exists a need for a door closer that automatically adjusts after initial calibration, resulting in a door motion that has desirable opening and closing cycles and is relatively easy to install.

SUMMARY

According to one aspect of the present invention a door closer assembly includes a spring; a movable element configured to move in response to movement of a door, the movement of the movable element loading the spring; at least one gear configured to rotate responsive to a force exerted on one of the at least one gear by the spring; and a generator configured to generate electrical power responsive to the rotation of the at least one gear.

According to another aspect of the present invention a control unit for a door closer assembly includes a spring; a movable element configured to move in response to movement of a door, the movement of the movable element loading the spring; at least one gear configured to rotate responsive to a force exerted on one of the at least one gear by the spring; a generator configured to generate electrical power responsive to the rotation of the at least one gear; and a printed circuit board (PCB), the PCB comprising an energy storage device and control logic, the energy storage device being charged by the generated electrical power, the control logic being powered by the generated power and configured to control a valve in a door closer, wherein the control unit is configured to be attachable to a door closer.

According to a further aspect of the present invention a method for self-powered operation of a door closer includes providing power to a control unit responsive to movement of a door; reading an angular position of the door; reading an angular position of a valve; and adjusting the angular position of the valve based on the angular position of the door and the angular position of the valve.

According to a still further aspect of the present invention a method for self-powered operation of a door closer includes providing power to a control unit responsive to movement of a door; reading an angular position of the door; reading an angular position of a valve; and comparing the angular position of the door to a previously read angular position of the door; calculating a speed of the door based on the comparison; predicting a next movement of the door based on the calculated speed and at least one previously stored calculated speed; adjusting the valve based on the prediction; and transitioning at least one component of a control unit controlling the adjusting of the valve to a power saving sleep state for a set period of time.

According to an aspect of the present invention a method for self-powered operation of a door closer includes reading a first door position and storing the read first door position; reading a second door position and storing the read second door position; comparing the first door position with the second door position; calculating a speed of the door based on the comparison; associating the calculated door speed with the first door position and the second door position and storing; comparing the stored door speed with an average speed for the first door position and the second door position; and adjusting the angular position of the valve based on the comparing the stored door speed with an average speed for the first door position and the second door position.

According to another aspect of the present invention a door closer assembly, includes a valve, the valve regulating an amount of hydraulic fluid that flows through the valve, the amount of hydraulic fluid flowing through the valve controlling a force generated by the door closer assembly on a door; a first sensor, the first sensor measuring an angular position of the door; a second sensor, the second sensor measuring an angular position of the valve, the angular position of the valve determining the amount of hydraulic fluid flowing through the valve; and a controller, the controller controlling the adjustment of the valve based on the angular position of the door and the angular position of the valve.

According to a further aspect of the present invention a system for reduced energy operation of a door closer includes a controller, the controller comprising a processor; a voltage storage device, the voltage storage device being operatively connected to the controller; and a generator, the generator being operatively connected to the controller and the voltage storage device, the generator generating a voltage responsive to movement of a door, the voltage charging the voltage storage device, wherein the controller enables power to a first sensor to read an angular position of the door only for enough time to insure an accurate reading the first sensor, and wherein the controller enables power to a second sensor to read an angular position of a valve in the door closer only for enough time to insure an accurate reading the second sensor.

According to an aspect of the present invention a method for reduced energy operation of a door closer includes detecting movement of a door; providing power to a controller responsive to the movement of the door; enabling power to a door angle sensor only long enable to obtain an accurate reading of an angular position of the door and then disabling power to the door angle sensor; enabling power to a valve sensor only long enable to obtain an accurate reading of an angular position of the valve and then disabling power to the valve sensor; and adjusting the angular position of the value responsive to the read angular position of the door and the read angular position of the valve.

According to another aspect of the present invention a controller for reduced energy operation of a door closer includes a timer; and a processor, the processor detecting movement of a door, enabling power to a door angle sensor only long enable to obtain an accurate reading of an angular position of the door and then disabling power to the door angle sensor, enabling power to a valve sensor only long enable to obtain an accurate reading of an angular position of the valve and then disabling power to the valve sensor, and adjusting the angular position of the value responsive to the read angular position of the door and the read angular position of the valve, wherein the controller receives power responsive to the movement of the door.

BRIEF DESCRIPTION OF DRAWINGS

For a more complete understanding of the present invention, reference should now be had to the embodiments shown in the accompanying drawings and described below. In the drawings:

FIG. 27 is a diagram of door opening and closing regions according to an exemplary embodiment of the present invention;

FIG. 28 is a diagram of a table translating a door position angle to pinion position angle according to an exemplary embodiment of the present invention;

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components of the door closer may be oriented in any direction and the terminology, therefore, should be understood as encompassing such variations unless specified otherwise.

As used herein, the term "open position" for a door means a door position other than a closed position, including any position between the closed position and a fully open position as limited only by structure around the door frame, which can be up to 180° from the closed position.

Figure 1:
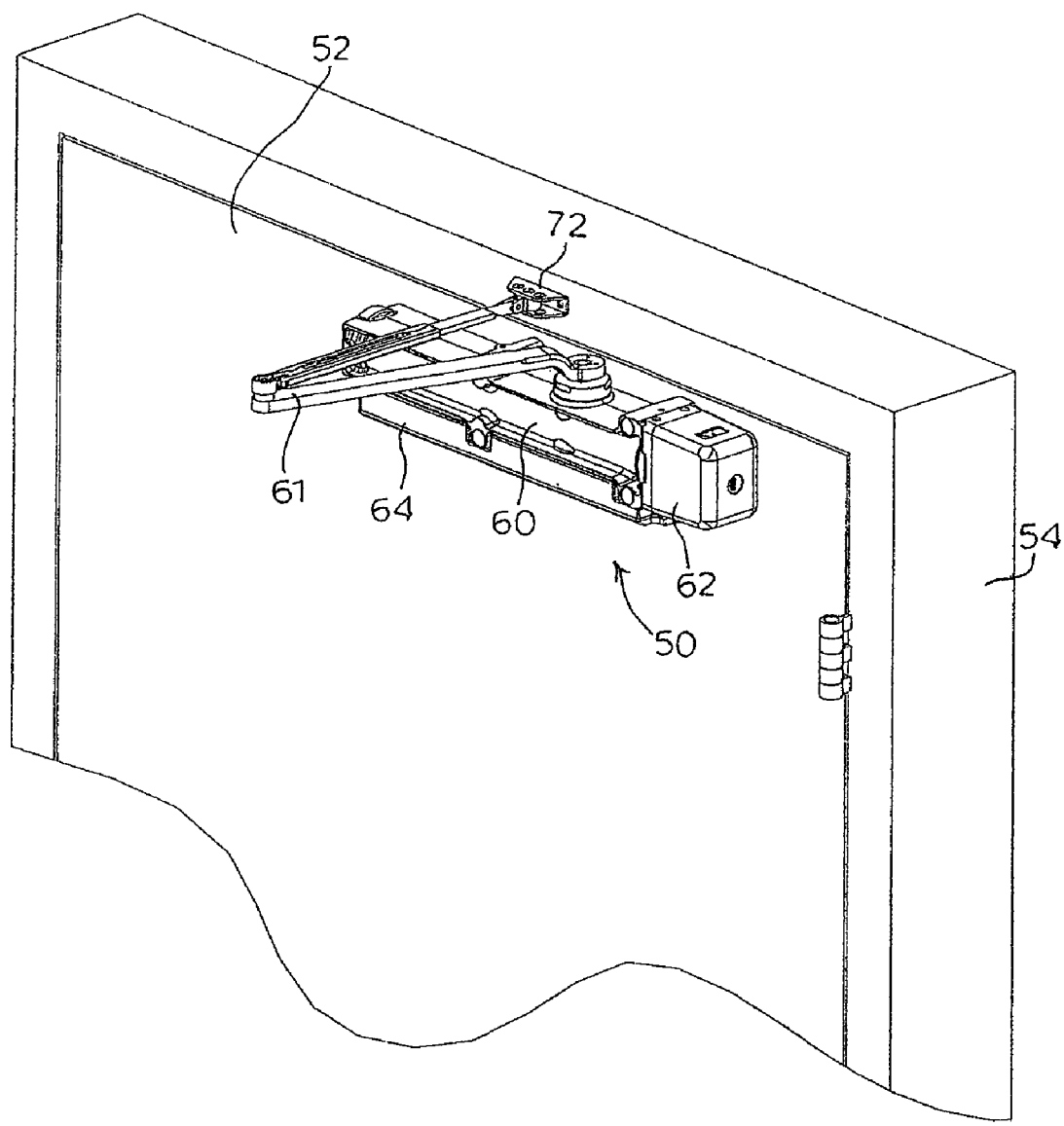
FIG. 1 is cut-away perspective view of a door closer assembly according to an embodiment of the present invention in position on a door.

Referring now to the drawings, wherein like reference numerals designate corresponding or similar elements throughout the several views, a door closer assembly according to the present invention is shown and generally designated at 50. Referring to FIG. 1, the door closer assembly 50 is mounted to a door 52 in a door frame 54. The door 52 is movable relative to the frame 54 between a closed position and an open position. For the purpose of this description, only the upper portion of the door 52 and the door frame 54 are shown. The door 52 is of a conventional type and is pivotally mounted to the frame 54 for movement from the closed position, as shown in FIG. 1, to an open position for opening and closing an opening through a building wall to allow a user to travel from one side of the wall to the other side of the wall.

Figure 2:
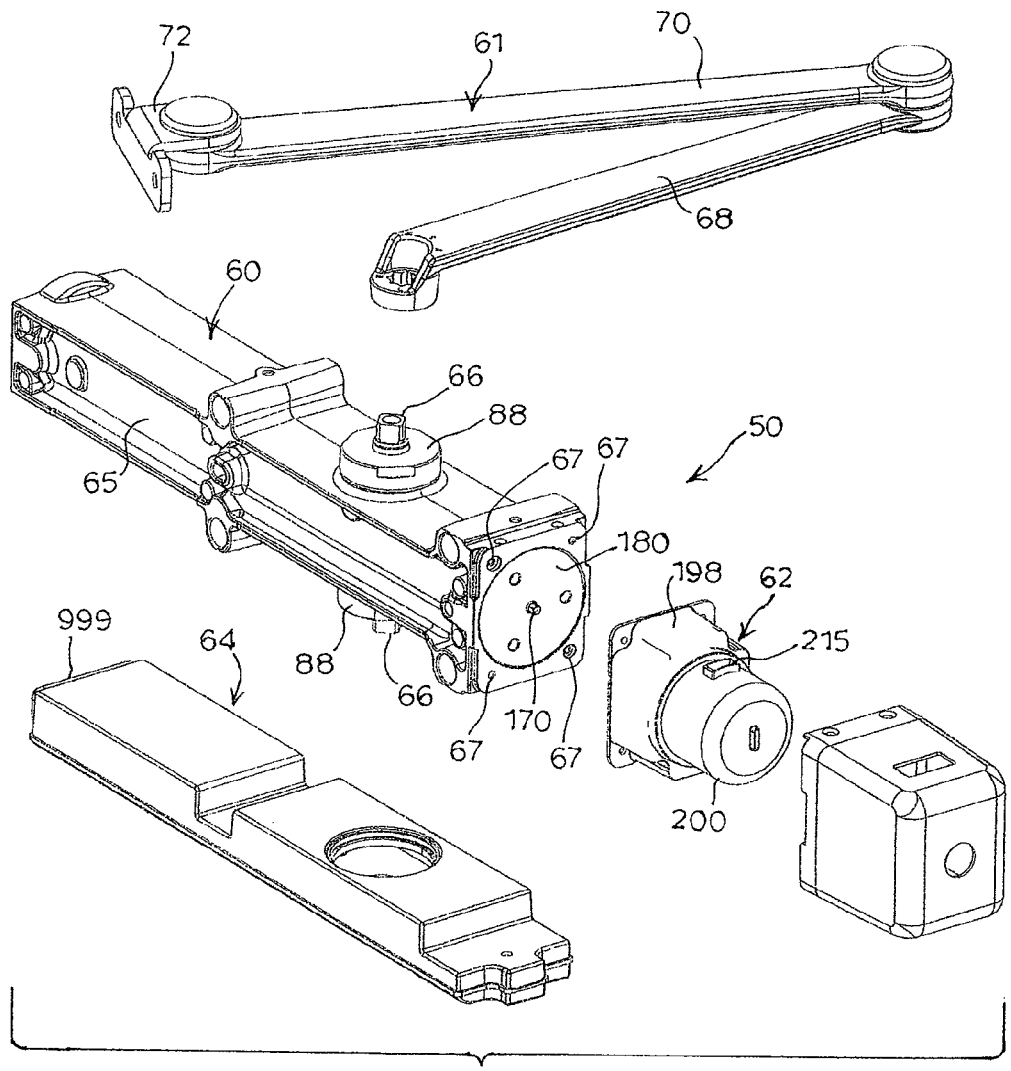
FIG. 2 is an exploded perspective view of the door closer assembly shown in FIG. 1.

As shown in FIGS. 1 and 2, the door closer assembly 50 according to the present invention comprises a door closer 60, including a linkage assembly 61 for operably coupling the door closer assembly 50 to the door frame 54, a drive unit 62, and a control unit 64. As seen in FIG. 2, ends of a rotating pinion 66 extend from the top and bottom of the door closer 60 for driving the linkage assembly 61 to control the position of the door 52. FIG. 1 shows a linkage assembly 61 for a push side mounting of the door closer assembly 50 to the door 52, comprising a first rigid connecting arm link 68 and a second rigid connecting arm link 70. The first connecting arm link 68 is fixed at one end for rotation with the upper end of the pinion 66 (FIG. 1) and at the other end is pivotally connected to an end of the second connecting arm link 70. The other end of the second connecting arm link 70 is pivotally joined to a mounting bracket 72 fixed to the door frame 54. A linkage assembly 61 for a pull side mounting of the door closer assembly 50 to the door 52 is also suitable. Both push side and pull side mounting of the linkage assemblies are well known in the art. Further, it should be understood that the linkage assembly 61 for use in the present invention may be any arrangement capable of linking the door closer 60 to the door 52 in such a manner that the door closer assembly 50 affects movement of the door 52. Thus, numerous alternative forms of the linkage assembly 61 may be employed.

The door closer assembly 50 is securely mounted to the upper edge of the door 52 using mounting bolts (not shown), or other fasteners. The door closer assembly 50 extends generally horizontally with respect to the door 52. The drive unit 62 and control unit 64 are fixed to the door closer 60. A cover (not shown) attaches to the door closer assembly 50. The cover serves to surround and enclose the components of the door closer assembly 50 to reduce dirt and dust contamination, and to provide a more aesthetically pleasing appearance. It is understood that although the door closer assembly 50 is shown mounted directly to the door 52, the door closer assembly 50 could be mounted to the door frame 54 or to the wall adjacent the door frame 54 or concealed within the wall or door frame 54. Concealed door closer assemblies are well known in the art of automatic door closer assemblies.

The door closer 60 is provided for returning the door 52 to the closed position by providing a closing force on the door 52 when the door is in an open position. The door closer 60 includes an internal return spring mechanism such that, upon rotation of the pinion 66 during door 52 opening, the spring mechanism will be compressed for storing energy. As a result, the door closer 60 will apply on the linkage assembly 61 a moment force which is sufficient for moving the door 52 in a closing direction. The stored energy of the spring mechanism is thus released as the pinion 66 rotates for closing the door 52. The closing characteristics of the door 52 can be controlled by a combination of the loading of the return spring mechanism and the controlled passage of fluid through fluid passages between variable volume compartments in the door closer housing, as described more fully below.

FIGS. 3-7 depict an embodiment of the door closer 60 according to the present invention. The door closer 60 comprises a housing 65 for accommodating the pinion 66, a piston 74, a spring assembly 80, and a valve assembly 100. The housing 65 defines an internal chamber which is open at both ends.

The pinion 66 is an elongated shaft having a central gear tooth portion 76 bounded by intermediate cylindrical shaft portions 77. The pinion 66 is rotatably mounted in the housing 65 such that the pinion 66 extends normal to the longitudinal axis of the housing 65. The intermediate cylindrical shaft portions 77 of the pinion 66 are rotatably supported in bearings 78 each held between an inner washer 82 and an outer retaining ring 83 disposed within opposed annular bosses 85 formed on the top surface and the bottom surface of the housing 65. The outer ends of the shaft of the pinion 66 extend through the openings in the bosses 85 and outwardly of the housing 65. The ends of the pinion 66 are sealed by rubber u-cup seals 86 which fit over the ends of the pinion 66 and prevent leakage of a hydraulic working fluid from the chamber of the housing 65. The periphery of the bosses 85 are externally threaded for receiving internally threaded pinion seal caps 88.

The spool-shaped piston 74 is slidably disposed within the chamber of the housing 65 for reciprocal movement relative to the housing 65. The annular ends of the piston 74 seal against the inside wall of the housing 65 to establish a fluid tight relation between the ends of the piston 74 and the housing 65. In this arrangement, as shown in the FIGS. 5-7, the piston 74 divides the chamber in the housing 65 into a first variable volume chamber 91 between one end of the piston 74 and the valve assembly 100 and a second variable volume chamber 95 between the other end of the piston 74 and the spring assembly 80. The central portion of the piston 74 is open and defines opposed rack teeth 75. The pinion 66 is received in the open central portion of the piston 74 such that the gear teeth 76 on the pinion 66 engage the rack teeth 75 in the piston 74. It is thus understood that rotation of the pinion 66 will cause linear movement of the piston 74 in a conventional manner known in the art.

Figure 5:
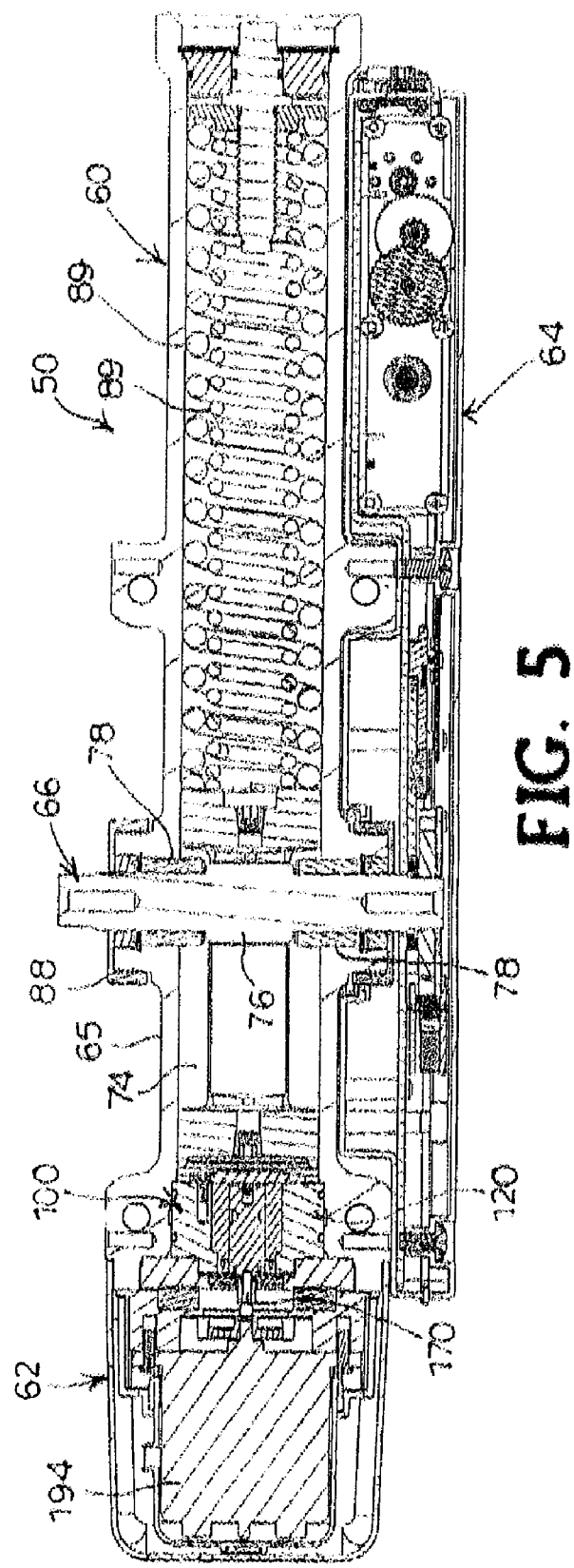
FIG. 5 is a longitudinal cross-section view of the assembled door closer taken along line 5-5 of FIG. 4 with the door in a closed position.
Figure 6:
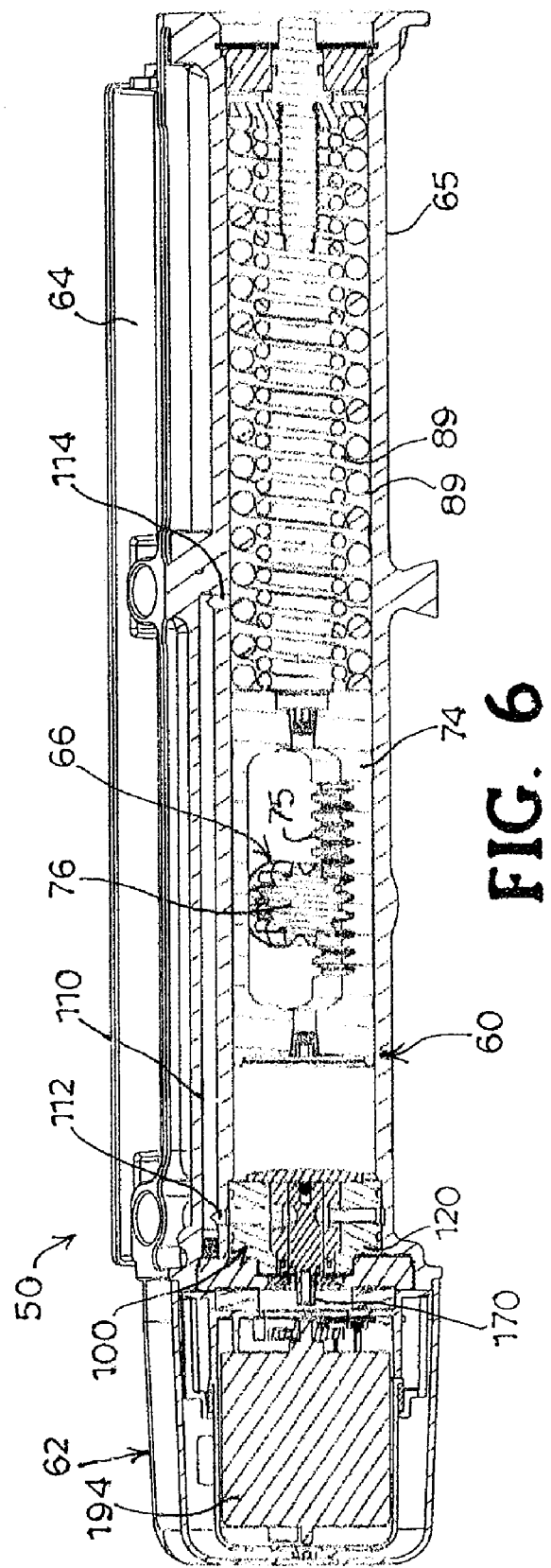
FIG. 6 is a longitudinal cross-section view of the assembled door closer taken along line 6-6 of FIG. 4 with the door in a closed position.
Figure 7:
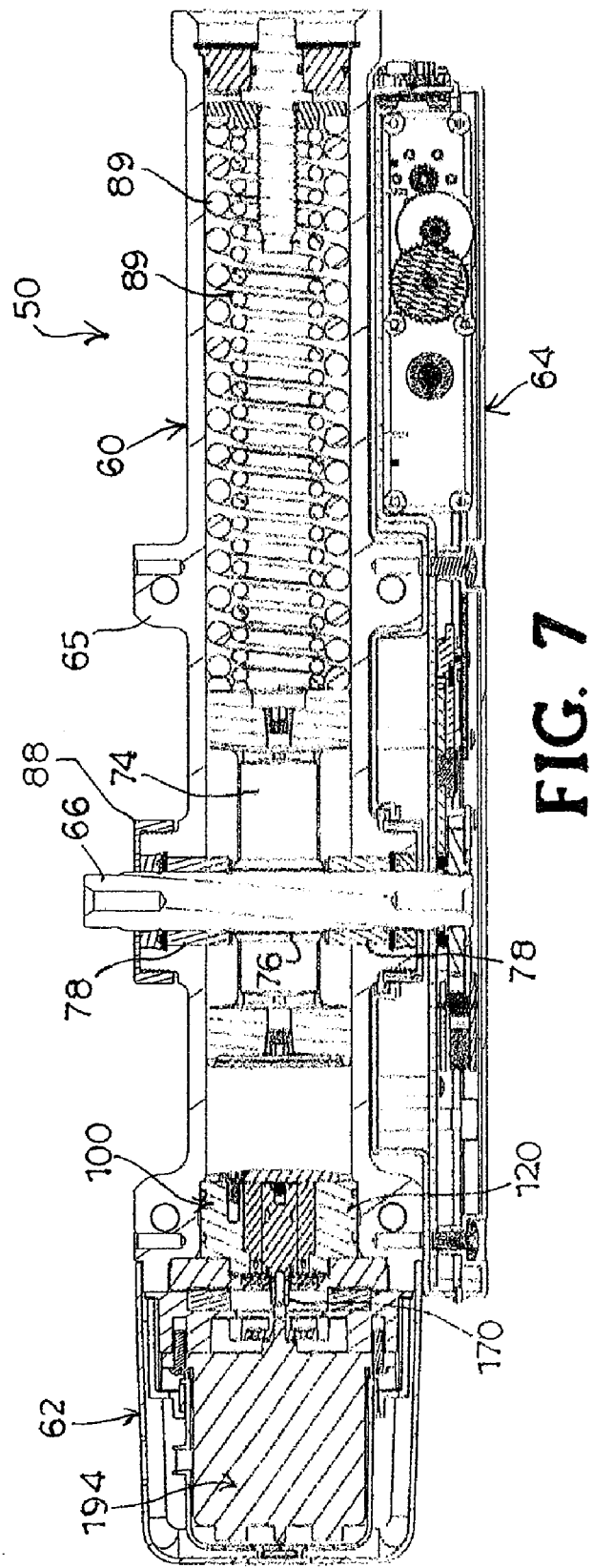
FIG. 7 is a longitudinal cross-section view of the assembled door closer as shown in FIG. 5 with the door in an open position.
Figure 8:
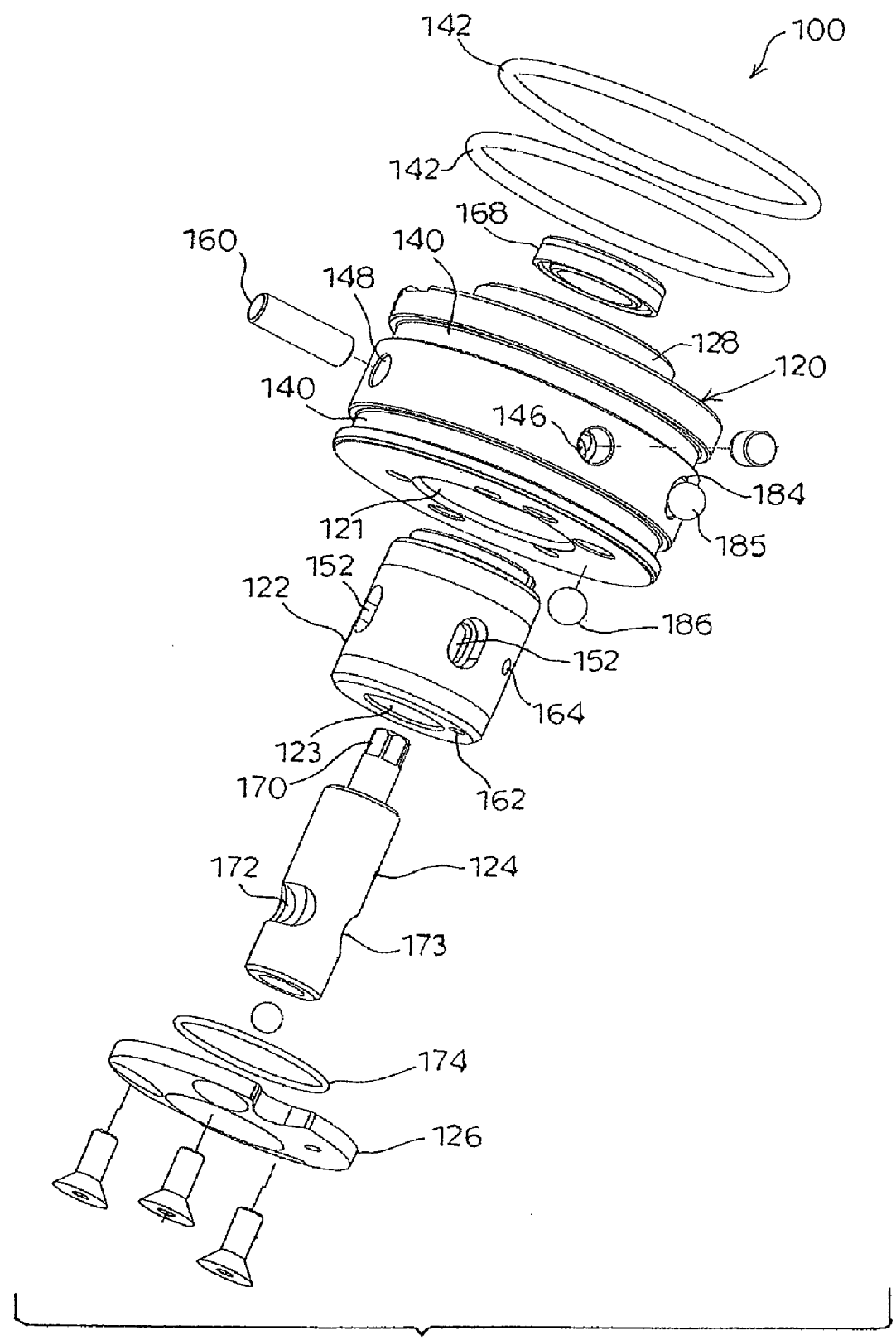
FIG. 8 is an exploded perspective view of a valve assembly according to the present invention for use with the door closer shown in FIG. 3.
Figure 9:
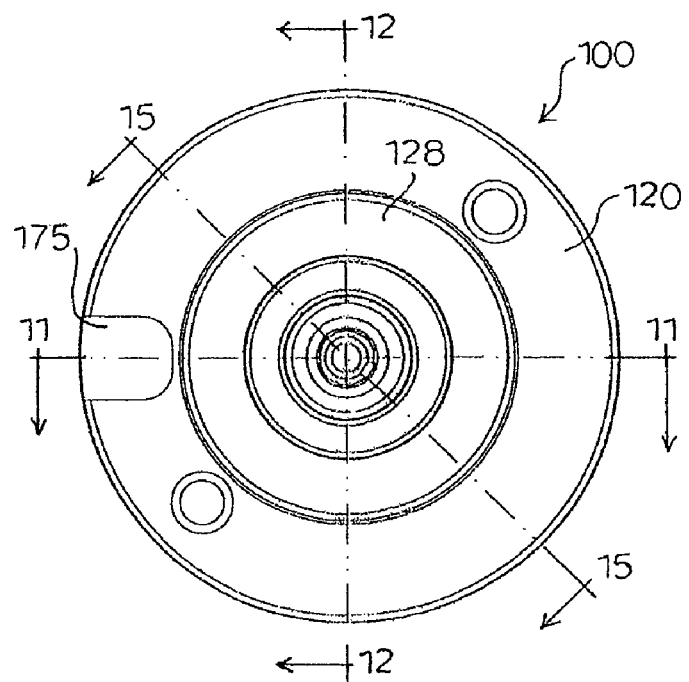
FIG. 9 is an inner end view of the assembled valve assembly shown in FIG. 8.
Figure 10:
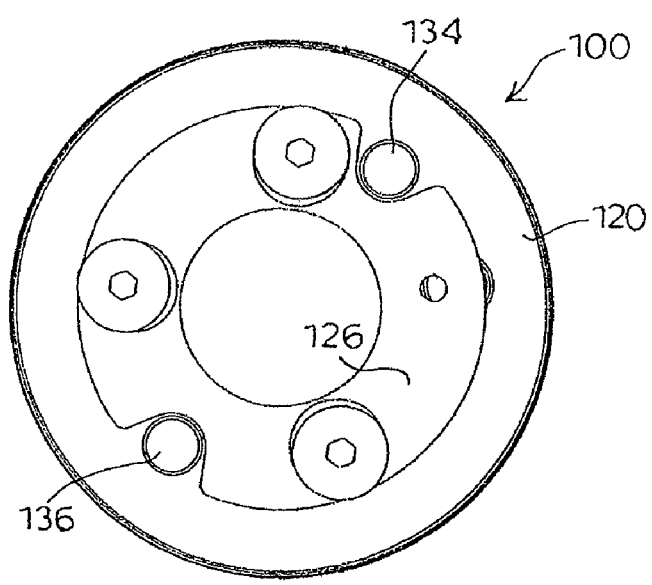
FIG. 10 is an outer end view of the assembled valve assembly shown in FIG. 8.

The spring assembly 80 comprises two compression springs 89, one nested inside the other and supported between the piston 74 and an end plug assembly 90. The end plug assembly includes an end plug 92, an adjusting screw 94, and a retaining ring 96. The end plug 92 is an externally threaded disc sealingly secured in the threaded opening in the end of the housing 65. The end plug 92 is sealed to the wall of the housing 65 with the retaining ring 96 disposed in a circumferential groove on the periphery of the end plug 92. The end plug 92 thus effectively seals the end of the housing 65 against leakage of fluid. The adjusting nut 94 is held in the housing 65 between the springs 89 and the end plug 92. The springs 89 urge the piston 74 towards the left end of the housing 65, as seen in FIGS. 5-7. The adjusting nut 94 is accessible by tool from the end of the housing 65, and rotating the adjusting nut 94 sets the initial compressed length of the springs 89.

A fluid medium, such as hydraulic oil, is provided in the chamber in the housing 65 to cooperate with the piston 74. As seen in FIG. 6, the housing 65 is provided with a passage 110 though which fluid is transferred during reciprocal movement of the piston 74 in the chamber for regulating movement of the door 52. The fluid passage 110 runs longitudinally between a radial passage 112 opening into the end of the housing 65 adjacent the valve assembly 100 to a radial passage 114 opening into the chamber adjacent the spring assembly 80. The passage 110 thus serves as a conduit for fluid to pass between the first variable volume chamber 91 on one side of the piston 74 and the second variable volume chamber 95 on the other side of the piston 74.

Figure 13B:
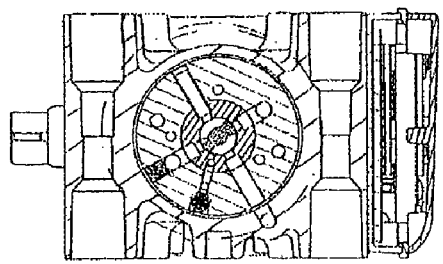
FIG. 13 is a longitudinal cross-section view of the valve assembly taken along line 13-13 of FIG. 10 with the valve in a closed position.
Figure 13A:
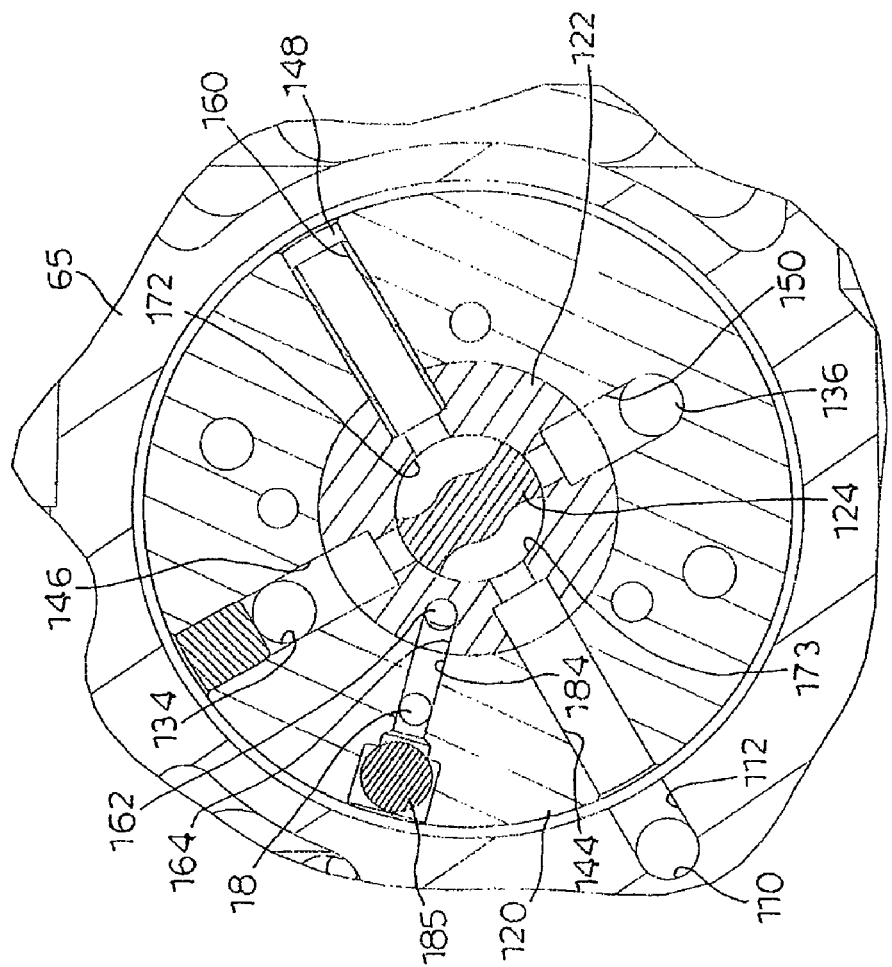
Figure 14B:
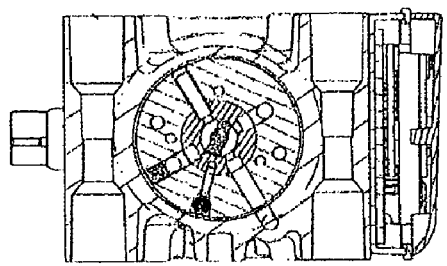
FIG. 14 is a longitudinal cross-section view of the valve assembly taken along line 14-14 of FIG. 10 with the valve in an open position.
Figure 14A:
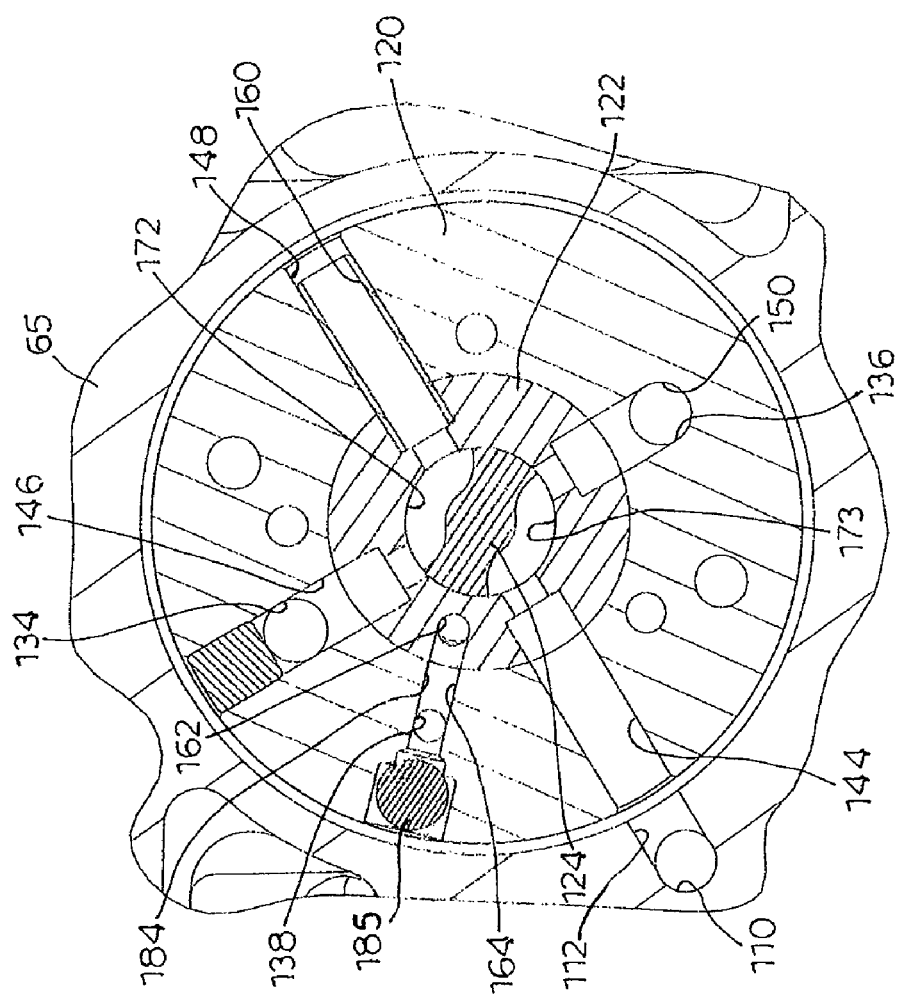

The valve assembly 100 is sealingly secured in the opening in the end of the housing 65 adjacent the piston 74. Referring to FIGS. 8-15, the valve assembly 100 comprises a valve housing 120, a valve sleeve 122, a valve shaft 124 and a spool plate 126. The valve housing 120 is a cylindrical member including a relatively short cylindrical projection 128 at an outer end. The valve housing 120 defines a central axial opening 121 therethrough. The outer end of the valve housing 120 defines a portion of the opening 121 having a smaller diameter than the remainder of the opening thereby forming a shoulder 130 (FIGS. 11, 12 and 15) in the axial opening 121 adjacent the outer end of the valve housing 120. The inner end of the housing 120 has six spaced axial bores 132, 134, 136, 138 in the inner surface of the housing. Three equally spaced bores 132 are threaded screw holes and three are fluid passages 134, 136, 138. Spaced circumferential grooves 140 are provided in the periphery of the valve housing 120 for receiving o-rings 142. The grooves 140 define an intermediate circumferential surface into which radial passages 144, 146, 148, 150, 151 (FIGS. 13 and 14). Four of the radial passages 144, 146, 148, 150 are drilled through to the central axial opening 121.

Figure 15:
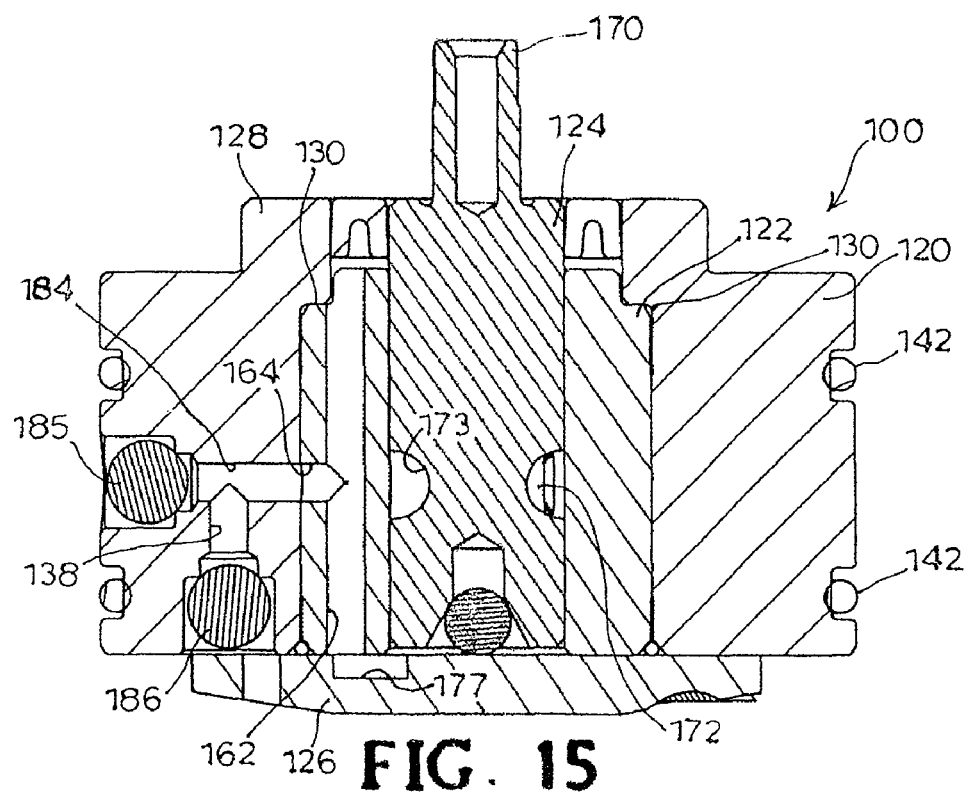
FIG. 15 is a longitudinal cross-section view of the valve assembly taken along line 15-15 of FIG. 10.
Figures 11, 12:
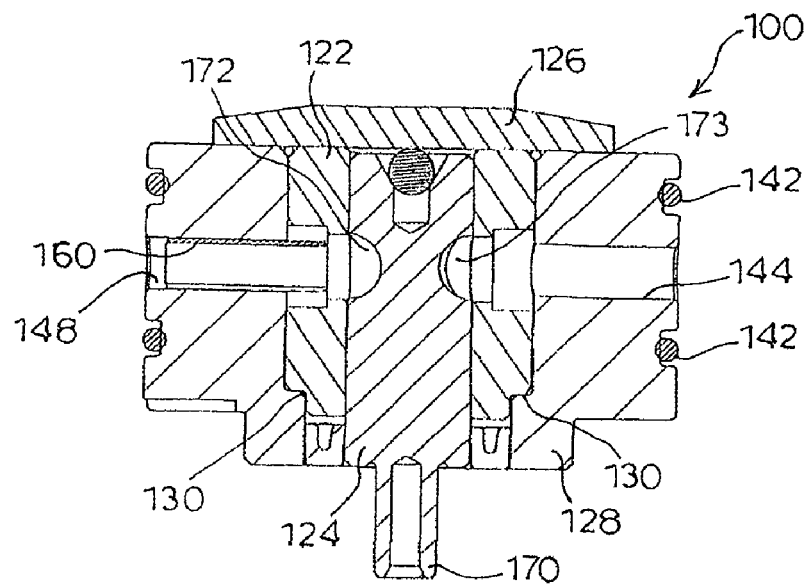
FIG. 11 is a longitudinal cross-section view of the valve assembly taken along line 11-11 of FIG. 10.
FIG. 12 is a longitudinal cross-section view of the valve assembly taken along line 12-12 of FIG. 10.

The cylindrical valve sleeve 122 fits into the opening 121 in the valve housing 120. The valve sleeve 122 defines a central axial opening 123 therethrough. The valve sleeve 122 has four circumferentially spaced radial openings 152 opening into the central axial opening 123. The valve sleeve 122 has a smaller axial passage 162 therethrough (FIG. 15). A small radial bore 164 in the periphery of the valve sleeve 122 connects to the axial passage 162. The valve sleeve 122 fits into the valve housing 120 such that each of the radial openings 152 is aligned with one of the radial openings 144, 146, 148, 150 in the valve housing 120. As best seen in FIG. 11, one corresponding set of the openings 148, 152 is sized to receive a hollow pin 160 for locking the valve sleeve 122 to the valve housing 120.

The cylindrical valve shaft 124 is journaled inside the valve sleeve 122. The outer end of the valve shaft 124 carries a cut off shaft 170 with a square end. Opposed partial circumferential grooves 172, 173 are provided intermediate the ends of the valve shaft 124. The valve shaft 124 is configured such that the grooves 172, 173 are at the same relative axial position as the radial openings 152 in the valve sleeve 122.

The spool plate 126 is attached to the inner surface of the valve housing 120 for holding the valve sleeve 122 in place. The spool plate 126 has a depression 177 which corresponds to the axial passage 162 in the valve sleeve 122 for fluid transfer during high pressure situations (FIG. 15).

The valve assembly 100 fits into the end of the housing 65 (FIGS. 3, 5-7). Each of the outer surface of the valve housing 120 and the end of the housing 65 has a depression 176 for receiving an anti-rotation tab 178. An externally threaded disc 180 and o-ring 181 is secured in the threaded opening in the end of the housing 65. The cut off shaft 170 on the valve shaft 124 extends through a central hole in the disc 180 and is held in place by the disc 180. As seen in FIGS. 5-7, a circumferential groove 182 is provided in the housing 65. With the valve assembly 100 in place, the groove 182 is disposed between the o-rings 142 for forming a fluid path around the periphery of the valve housing 120.

When the door 52 is in the fully closed position, the components of the door closer 60 according to the present invention are as shown in FIG. 5. As the door 52 is opened, the door rotates the pinion 66 and thereby advances the piston 74 linearly to the right as seen in FIGS. 6 and 7. Movement of the piston 74, in turn, compresses the springs 89 between the piston 74 and the end plug 92. It is understood that the door closer assembly 50 can be used on a left hand door or a right hand door and, therefore, the door could be opened in a either a clockwise or a counterclockwise direction, as viewed in FIG. 1.

As the piston 74 moves toward the right end of the chamber in the housing 65, the fluid surrounding the springs 89 is forced through the radial passage 114 and into the longitudinal fluid passage 110. The fluid passes through the radial passage 112 at the end of the housing 65 adjacent the valve assembly 100 and into the groove 182 in the housing 65. Fluid thus surrounds the central portion of the valve housing 120 between the o-rings 142 such that the opposed radial bores 144, 148 are in fluid communication with the main fluid passage 110 through the housing 65 (FIG. 6). The fluid flows into the long radial passages 144, 148 in the valve housing 120 and the through the openings 152 in the valve sleeve 122 toward the valve shaft 124. If the valve shaft 124 is in a closed position (FIG. 13), the fluid cannot advance. If the valve shaft 124 is rotated to the open position shown in FIG. 14, the fluid can flow to the radial passages 146, 150 and to the axial passages 134, 136 which open into the first variable volume chamber 91. The degree of rotation of the valve shaft 124 relative to the valve sleeve 122 regulates the rate of fluid flow past the valve shaft 124. When the door 52 reaches a fully open position, the piston 74 is in the position shown in FIG. 7 and the springs 89 are compressed.

Movement of the door 52 from an open position to the closed position is effected by expansion of the springs 89 acting to move the piston 74 to the left as seen in FIGS. 5-7. The advancing piston 74 causes the pinion 66 to rotate for moving the door 52 toward the closed position. Fluid is forced out of the first variable volume chamber 91 in the housing 65, through the valve assembly 100, and the housing passages 110, 112, 114 and into the second variable volume chamber 95 around the springs 89. Specifically, the fluid initially flows into the axial passages 134, 136 and then to the corresponding radial passages 146, 150 to the valve shaft 124. If the valve is closed, the fluid cannot advance. If the valve shaft is rotated to the open position shown in FIG. 14, the fluid exits via the grooves 172, 173 of the valve shaft 124 and into the radial passages 144, 148 in the valve housing 120 toward the housing passages 110, 112, 114. Fluid again surrounds the central portion of the valve housing 120 between the o-rings 142 and exits through housing passage 112. The degree of rotation of the valve shaft 124 relative to the valve sleeve 122 will affect the rate of fluid flow past the valve shaft 124 and, thus, the speed of movement of the closing door 52. When the door 52 reaches the closed position, the components of the door closer 60 are again as shown in FIG. 5.

As seen in FIG. 15, a radial vent passage 184 is provided in the valve housing and is arranged in fluid communication with the radial bore 164 in the valve sleeve 122 which communicates with the axial vent passage 162. The openings to vent passages 138, 184 in the valve housing 120 are counterbored for receiving check balls 185, 186. The diameter of the balls 185, 186 are larger than a smaller outer diameter portion of the passages 138, 184 for allowing only one-way fluid flow. This arrangement of fluid passages serves as a vent relief in high pressure situations. Specifically, during door opening, if the pressure in the fluid flow path becomes excessive, the pressure may force the ball 186 into the larger diameter portion of the passage 138 so as to open the passage allowing fluid flow through the passage 138.

It is understood that fluid pressure forces the other ball 185 onto the smaller outer diameter of the corresponding passage 184. Fluid surrounding the valve shaft 124 can exit outwardly via the radial passage 164 in the valve sleeve 122 and the radial passage 184 in the valve housing 120 and out the axial vent passage 138 in the valve housing 120 and in the first variable volume chamber 91 via the hole 127 in spool plate 126. During door closing, if the pressure in the fluid flow path becomes excessive, the pressure may force the ball 185 into the larger diameter portion of the passage 184 so as to open the passage allowing fluid flow through the passage 184. It is understood that fluid pressure forces the other ball 186 onto the smaller outer diameter of the corresponding passage 138. Fluid surrounding the valve shaft 124 will thus exit outwardly via the radial passage 164 in the valve sleeve 122 and will continue outwardly through the radial vent passage 184 to the groove 182 in the housing 65 and out of the area via the housing passages 110, 112, 114.

According to an embodiment of the present invention, the position of the valve shaft 124 may be dynamically changed during door movement for controlling the flow of fluid past the valve shaft 124 and through the passages. Thus, as the door opens and closes, the valve position can be changed in order to provide varying levels of hydraulic resistance as a function of door angle. Fluid flow is controlled by powered rotational movement of the valve shaft 124, referred to herein as the "cut-off shaft (COS)" 124. In this regard, many conventional valves have a screw, referred to herein as the "cut-off screw," that is used to control the valve's "angular position." That is, as the cut-off screw is rotated, the valve's angular position is changed. The valve's "angular position" refers to the state of the valve setting that controls the valve's flow rate. For example, for valves that employ a cut-off screw to control flow rate, the valve's "angular position" refers to the position of the cut-off screw. In this regard, turning the cut-off screw in one direction increases the valve's angular position such that valve allows a higher flow rate through the valve. Turning the cut-off screw in the opposite direction decreases the valve's angular position such that the flow through the value is more restricted (i.e., the flow rate is less). In one embodiment, the valve assembly 100 is conventional having a cut-off screw 170, and the COS 124 is coupled to the valve's cut-off screw 170 that controls flow rate. Thus, rotation of the COS 124 changes the angular position of the valve shaft 124 and, therefore, affects the fluid flow rate.

Figure 16:
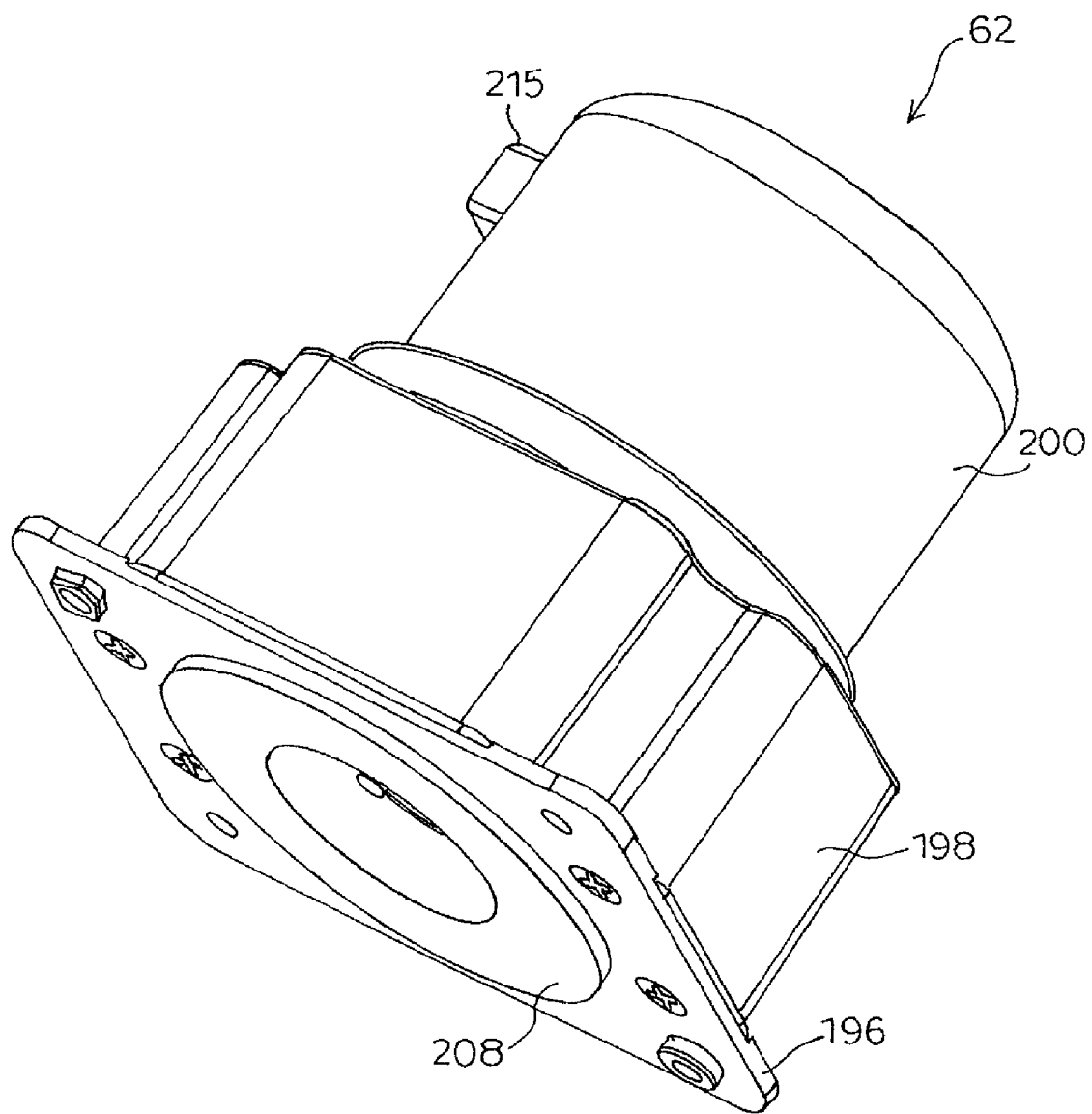
FIG. 16 is a perspective view of a drive unit according to the present invention for use with the door closer assembly shown in FIG. 1.
Figure 17:
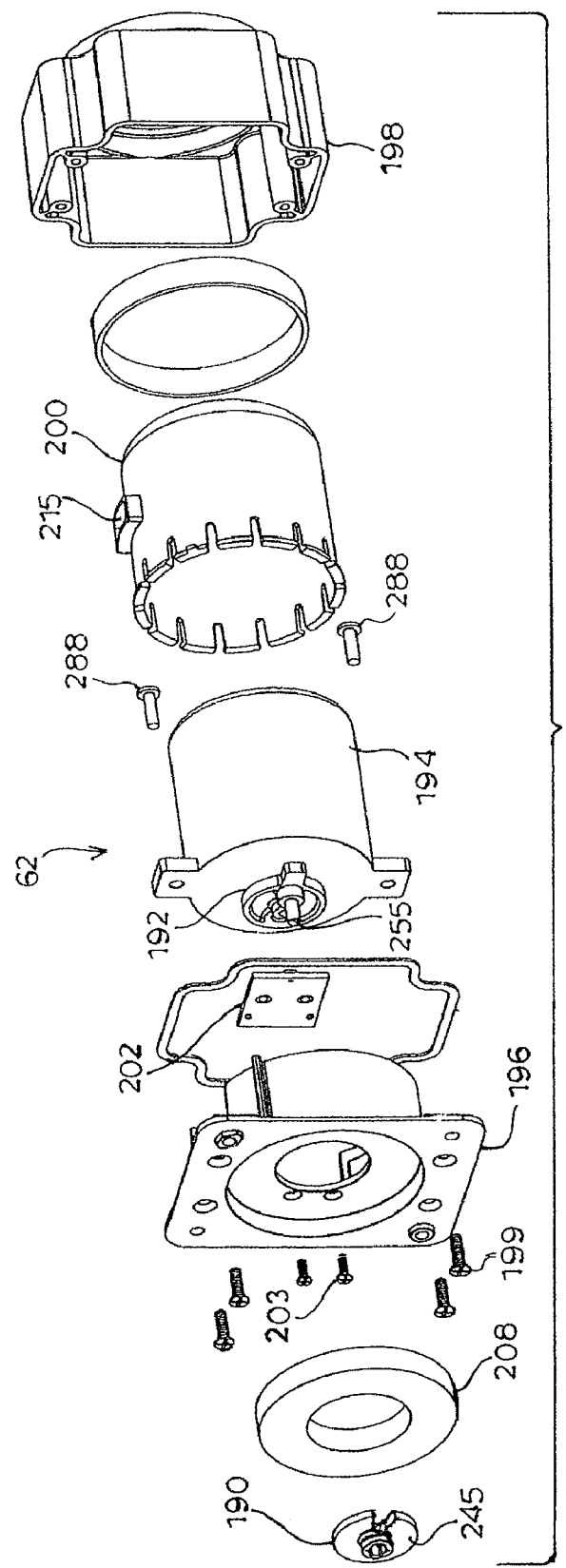
FIG. 17 is an exploded perspective view of the drive unit shown in FIG. 16.
Figure 18:
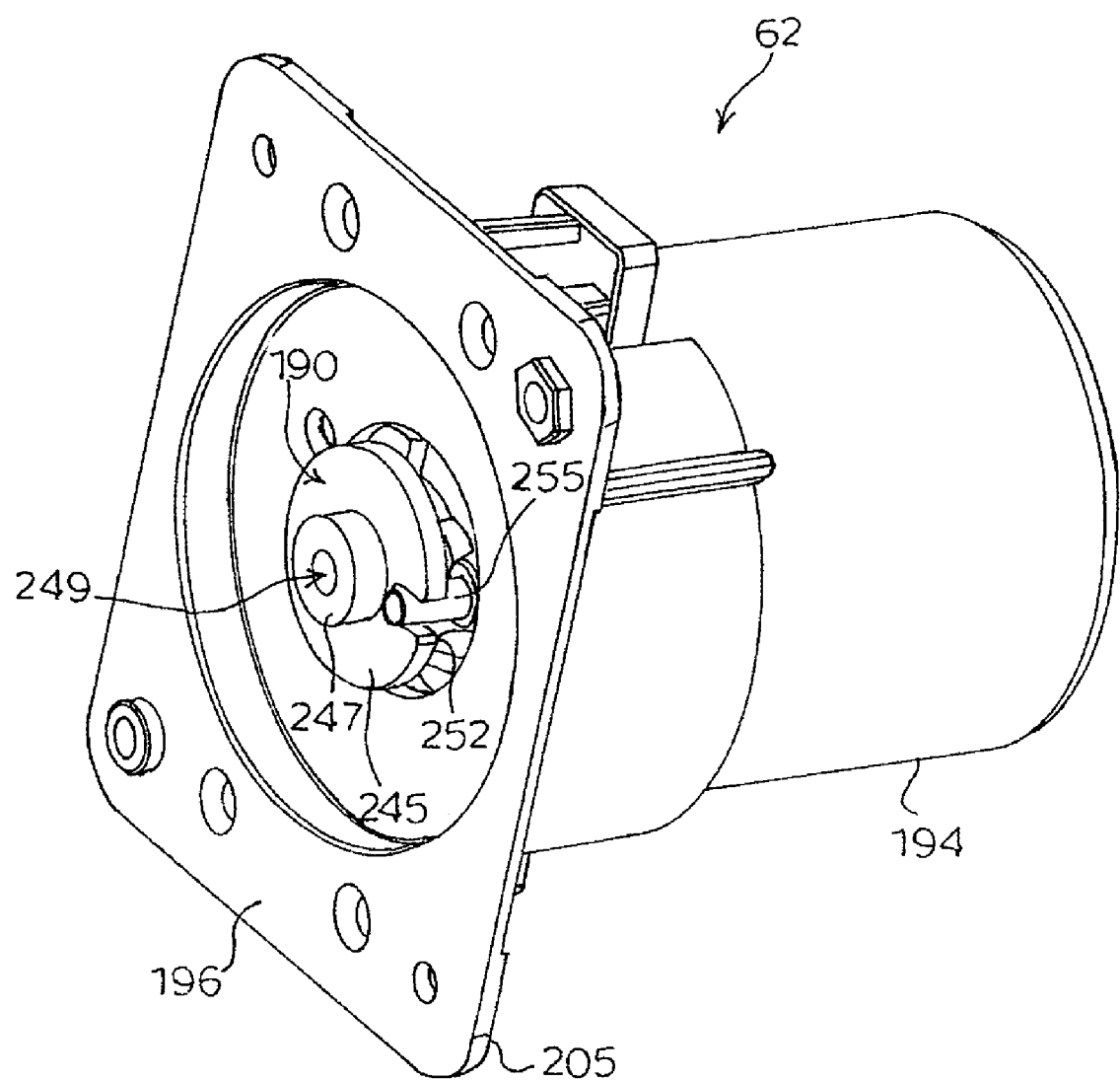
FIG. 18 is a perspective view of the drive unit shown in FIG. 16 with the cover removed.

The drive unit 62 is coupled to the COS 124 and rotates the COS 124 as appropriate to control the angular position of the valve shaft 124 in a desired manner, as will be described in more detail below. Referring to FIGS. 16 and 17, the drive unit 62 comprises a COS coupler 190, a motor coupler 192, a servo motor 194, a mounting bracket 196, a cover including a fixed cap 198 and a rotating cap 200, and a PCB board 202. As shown in FIGS. 17 and 18, the COS coupler 190 includes a disc 245 with a hollow tab extension 247 positioned at a center of the disc 245. The tab 247 defines a hole 249 for receiving the cut-off screw 170. The center of the hole 249 is aligned with the center of the disc 245. The inner wall of the tab 247 is dimensioned such that the cut-off screw 170 fits snugly into the tab 247 for fixed rotation of the cut-off screw 170 and the COS coupler 190 (FIGS. 5-7).

Figure 20:
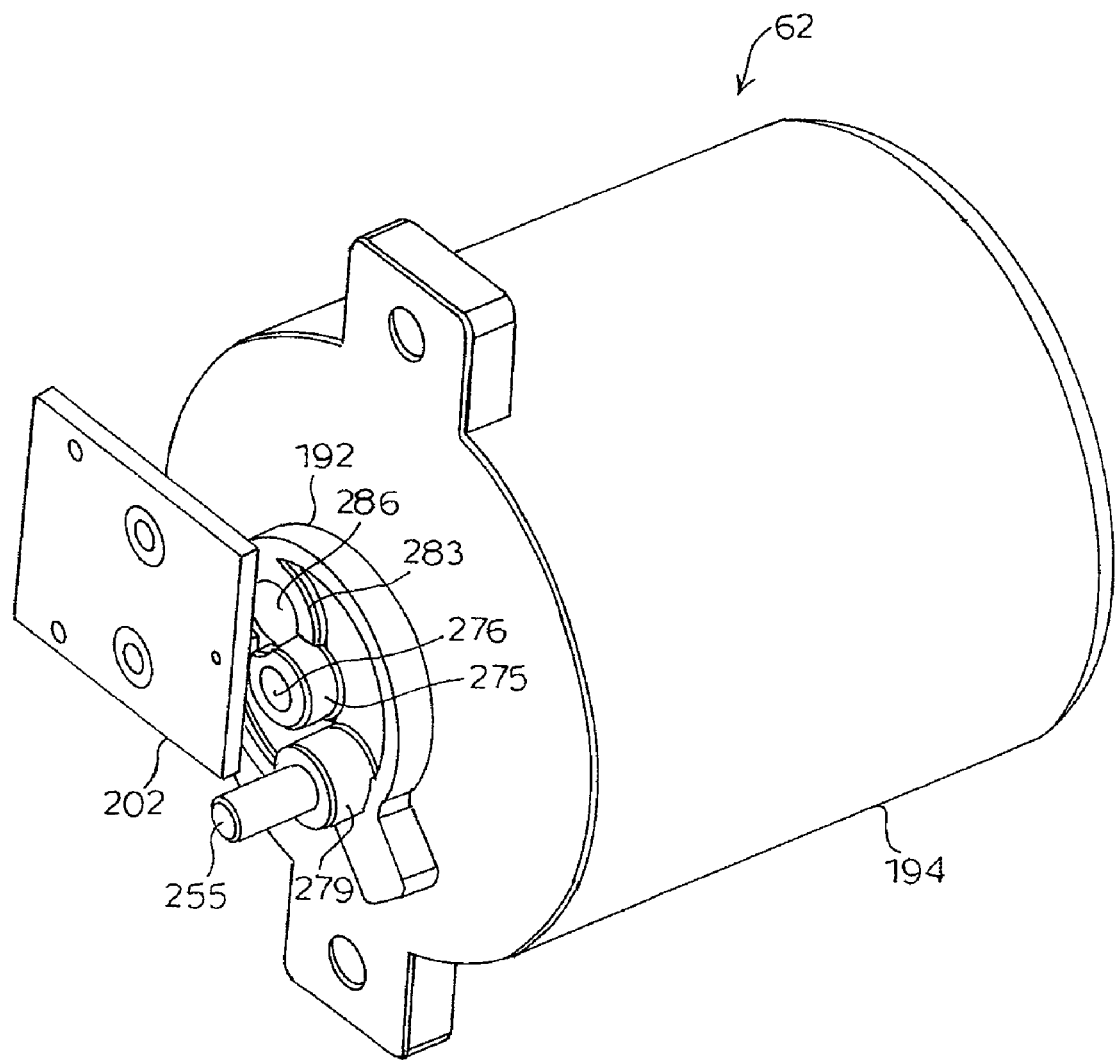
FIG. 20 is a partially exploded perspective view of the drive unit shown in FIG. 19 with the mounting bracket removed.
Figure 21:
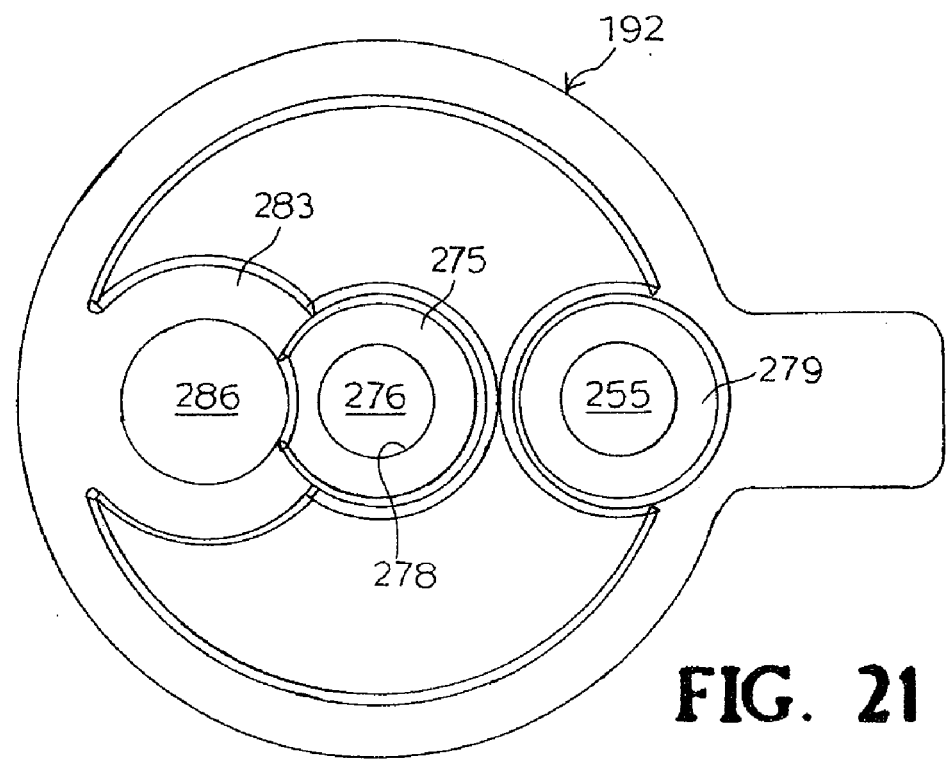
FIG. 21 is a front plan view of a motor coupler according to the present invention for use with the drive unit shown in FIG. 16.

Referring to FIGS. 20 and 21, the motor coupler 192 is also a disc having a hollow tab extension 275 positioned at a center of the motor coupler 192. The tab 275 defines an opening 278 for receiving a motor shaft 276, which is rotated by the motor 194. The inner wall of the tab 275 is dimensioned such that the motor shaft 276 fits snugly in the tab 275 for fixed rotation of the shaft 276 and the motor coupler 192. The motor coupler 192 has another hollow tab extension 279 into which an axially extending pin 255 is inserted. The inner wall of the tab 279 is dimensioned such that the pin 255 fits snugly in the tab 279, and frictional forces generally keep the pin 255 stationary with respect to the motor coupler 192. Therefore, any rotation of the motor coupler 192 moves the pin 255 about the center of the motor shaft 276. The motor coupler 192 has yet another hollow tab extension 283 into which a magnet 286 is inserted. For example, in one exemplary embodiment, the magnet 286 is glued to the motor coupler 192, but other techniques of attaching the magnet 286 to the motor coupler 192 are possible in other embodiments. As the motor coupler 192 rotates, the magnet 286 rotates about the center of the motor shaft 276.

Figure 22:
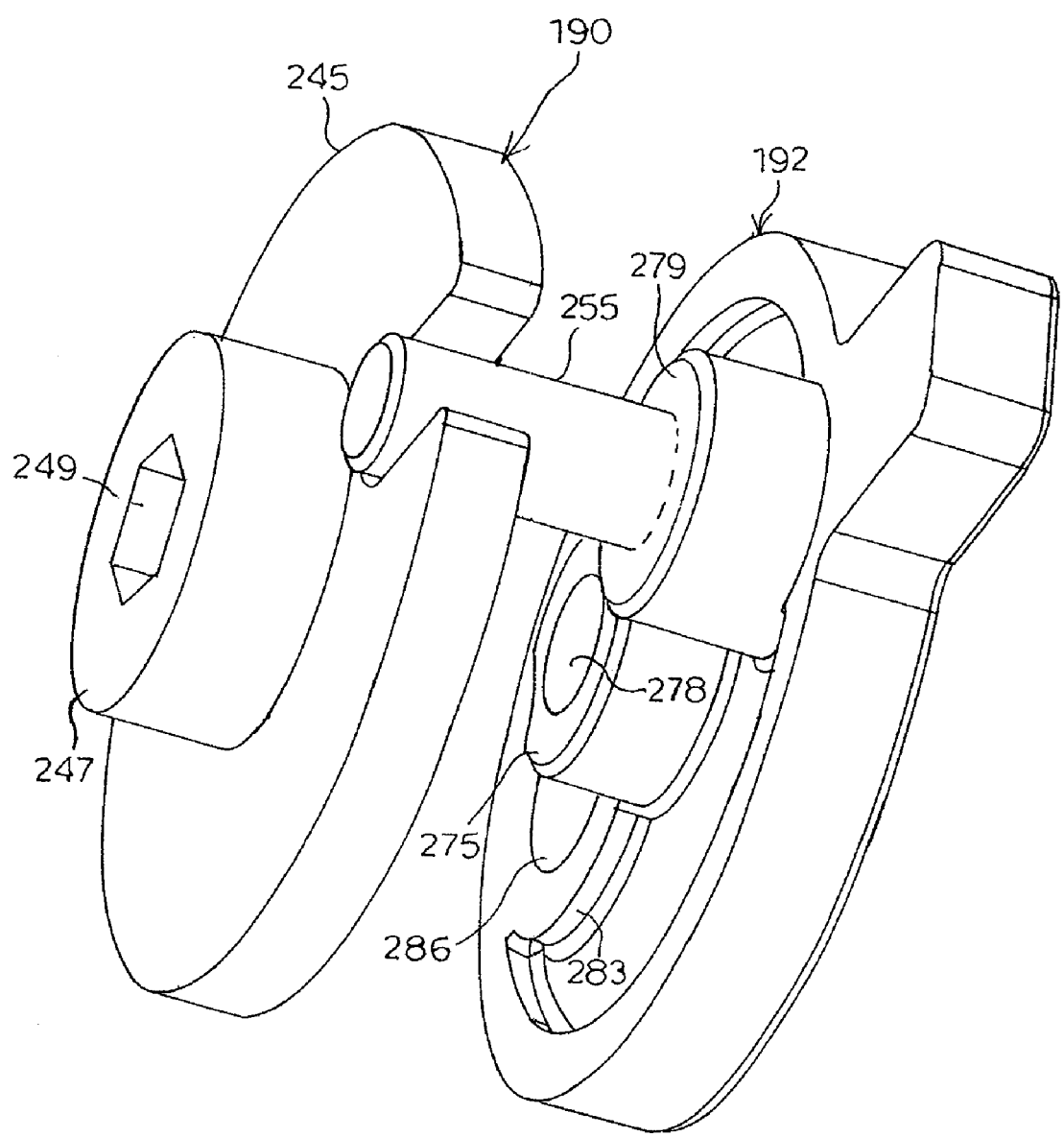
FIG. 22 is an elevated perspective view of a COS coupler operatively connected to the motor coupler shown in FIG. 21.

Referring to FIGS. 18 and 22, the COS coupler disc 245 has a slot 252 which receives the pin 255 on the motor coupler 192. The slot 252 is dimensioned such that its width (in a direction perpendicular to the r-direction) is slightly larger than the diameter of the pin 255 so that frictional forces do not prevent the COS coupler 190 from moving relative to the pin 255 in the y-direction, which is parallel to the centerline of the pin 255. Therefore, if the COS coupler 190 receives any mechanical forces in the y-direction, such as forces from a user kicking or slamming the door 52 or from pressure of the fluid flowing in the valve assembly 100, the COS coupler 190 is allowed to move in the y-direction relative to the pin 255 thereby preventing such forces from passing through the pin 255 to other components, such as the motor 194, coupled to the pin 255. Such a feature can help prevent damage to such other components and, in particular, the motor 194. In addition, as shown by FIG. 22, the radial length of the slot 252 in the r-direction is significantly greater than the diameter of the pin 255 such that it is unnecessary for the alignment between the couplers 190, 192 to be precise. Indeed, any slight misalignment of the couplers 190, 192 simply changes the position of the pin 255 along a radius of the COS coupler 190 without creating stress between the pin 255 and the COS coupler 190. That is, slight misalignments between the COS coupler 190 and the motor coupler 192 changes the location of the pin 255 in the r-direction. However, since the pin 255 can freely move to at least an extent in the r-direction relative to the COS coupler 190, such misalignments do not create stress in either of the couplers 190, 192.

In one exemplary embodiment, the width (perpendicular to the r-direction) of the slot 252 is about equal to or just slightly larger than the width of the pin 255. Thus, the width of the slot 252 is small enough so that any rotation of the motor coupler 192 causes a corresponding rotation of the COS coupler 190 but is large enough so that significant friction or other mechanical forces are not induced by movement of the COS coupler 190 in the y-direction. Allowing the COS coupler 190 to move relative to the motor coupler 192 in the y-direction not only prevents mechanical forces from transferring from the COS coupler 190 to the motor coupler 192 but also obviates the need to precisely set the separation distance between the couplers 190, 192.

The couplers 190, 192 may be composed of plastic, which is typically a low cost material. Note that the shapes of the coupler components, as well as the shapes of devices coupled to such components, can be changed, if desired. For example, the cross-sectional shape of the cut-off screw 170 may be circular; however, other shapes are possible. For example, the cross-sectional shape of the cut-off screw 170 could be a square or rectangle. In such an example, the shape of the hole 249 in the hollow tab extension 247 on the COS coupler 190 may be a square or rectangle to correspond to the shape of the cut-off screw 170. In addition, the cross-sectional shape of the disc 245 is shown to be generally circular, but other shapes, such as a square or rectangle are possible. Similarly, the motor coupler 192 and the pin 255 may have shapes other than the ones shown explicitly in the figures.

In the embodiments described above, the pin 255 is described as being fixedly attached to the motor coupler 192 but not the COS coupler 190. In other embodiments, other configurations are possible. For example, it is possible for a pin 255 to be fixedly coupled to a COS coupler and movable relative to a motor coupler.

In addition, it should be further noted that it is unnecessary for the couplers 190, 192 to rotate over a full 360 degree range during operation. In one exemplary embodiment, about a thirty-five degree range of movement is sufficient for providing a full range of angular positions for the valve shaft 124. In this regard, assuming that the valve shaft 124 is in a fully closed position such that the valve shaft 124 allows no fluid flow, then rotating the integral cut-off screw 170 about 35 degrees transitions the valve shaft 124 from the fully closed position to the fully open position (i.e., the valve's flow rate is at a maximum for a given pressure). In such an example, there is no reason for the cut-off screw 170 to be rotated outside of such a 35 degree range. However, the foregoing 35 degree range is provided herein as merely an example of the possible range of angular movements for the valve shaft 124, and other ranges are possible in other embodiments.

The motor 194 (FIG. 20) is an electric reversible motor with the motor drive shaft 276, a portion of which extends from the housing of the motor 194. The motor 194 is reversible such that the rotation of the motor 194 in one direction will cause the drive shaft 276 to rotate in one direction and rotation of the motor 194 in the opposite direction will cause the drive shaft 276 to rotate in the opposite direction. Such motors are widely commercially available and the construction and operation of such motors are well known; therefore, the details of the motor 194 are not described in specific detail herein. A suitable motor 194 for use in the door closer assembly 50 of the present invention is a 3 volt motor providing a gear ratio of 109:1 and a rated torque of 1.3 oz-in. The motor 194 operates under the direction and control of the control unit 64, which is electrically coupled to the motor via an electrical cable.

Figure 3:
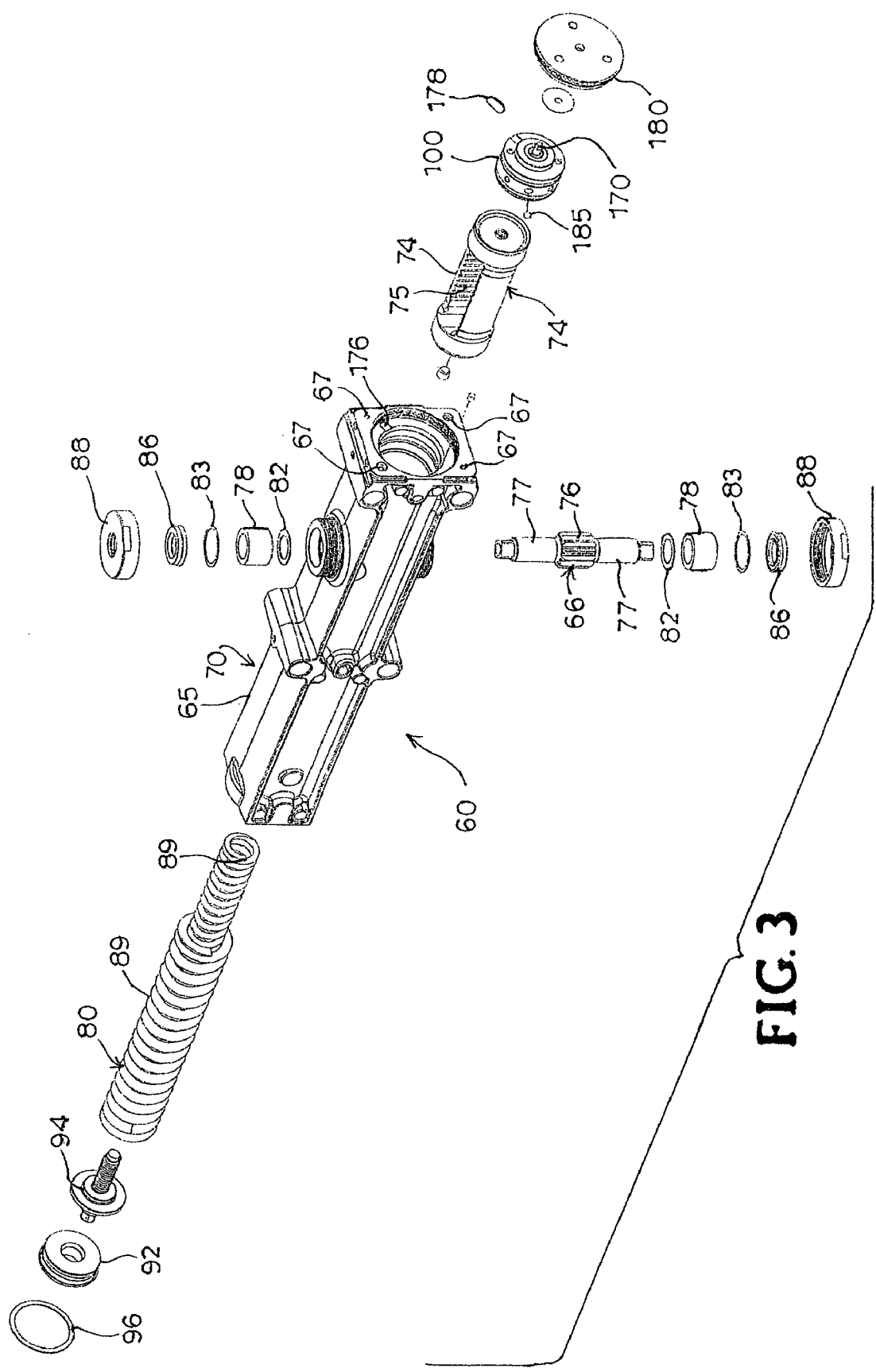
FIG. 3 is an exploded perspective view of a door closer according to the present invention for use with the door closer assembly shown in FIG. 1.
Figure 4:
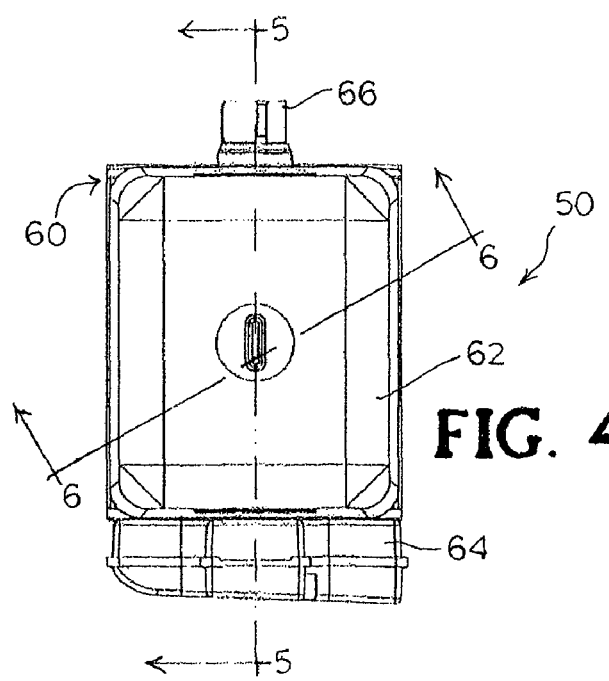
FIG. 4 is an end view of the assembled door closer shown in FIG. 3.

The motor 194 is secured to the mounting bracket 196 (FIG. 17) and then to the door closer housing 65 using threaded fasteners received in axial threaded openings 67 in the corners of the end of the housing 65 (FIG. 3). A sealing ring 208 is received in a corresponding recess in the mounting bracket 196 and fits against the door closer housing 65. The sealing ring 208 helps to keep any water from seeping between the drive unit 62 and the door closer 60 from reaching the various electrical components of the drive unit.

One advantage of the exemplary design of the couplers 190, 192 is that it facilitates assembly. In this regard, as described above, precise tolerances between the cut-off screw 170 and the motor shaft 276, as well as between couplers 190, 192, is unnecessary. Such a feature not only facilitates assembly but also promotes interchangeability. For example, the couplers 190, 192 may be used to reliably interface a motor 194 and door closer 60 of different vendors. Moreover, to interface the motor 194 with the door closer 60, a user simply attaches the COS coupler 190 to the COS shaft 124 and positions the couplers 190, 192 such that the pin 255 is able to pass through the slot 252 as the motor 194 is mounted on the door closer 60. The motor 194 can be secured to the mounting bracket 196 via screws 288 or other attachment mechanisms. As described above, there is no need to precisely align the couplers 190, 192 as long as the couplers 190, 192 are appropriately positioned such that the pin 255 passes through the slot 252.

In this regard, slight misalignments of the couplers 190, 192 do not create significant stresses between the couplers 190, 192. For example, assume that the couplers 190, 192 are slightly misaligned such that the centerline of the COS 124 does not precisely coincide with the centerline of the motor shaft 276. That is, the center of rotation of the COS coupler 190 is not precisely aligned with the center of rotation of the motor coupler 192. In such an example, the pin 255 moves radially relative to the COS coupler 190 as the couplers 190, 192 rotate. In other words, the pin 255 moves toward and/or away from the center of rotation of the COS coupler 190 as the couplers 190, 192 rotate. If the pin 255 is not movable along a radius of the COS coupler 190 when the couplers 190, 192 are misaligned, then the rotation of the couplers 190, 192 would induce stress in the couplers 190, 192 and pin 255. However, since the pin 255 is radially movable relative to the COS coupler 190 due to the dimensions of the slot 252, such stresses do not occur.

In addition, as described above, the COS coupler 190 is movable in the y-direction (i.e., toward and away from the motor coupler 192) without creating stresses in the couplers 190, 192 or transferring significant forces from the COS coupler 190 to the motor coupler 192. In this regard, the pin 255 is not fixedly attached to the COS coupler 190, and the length of the slot 252 in the r-direction (i.e., along a radius of the COS coupler 190) is sufficiently large so that the COS coupler 190 can slide along the pin 255 (or otherwise move relative to the pin 255) without transferring forces through the pin 255 to the motor coupler 192.

Figure 23:
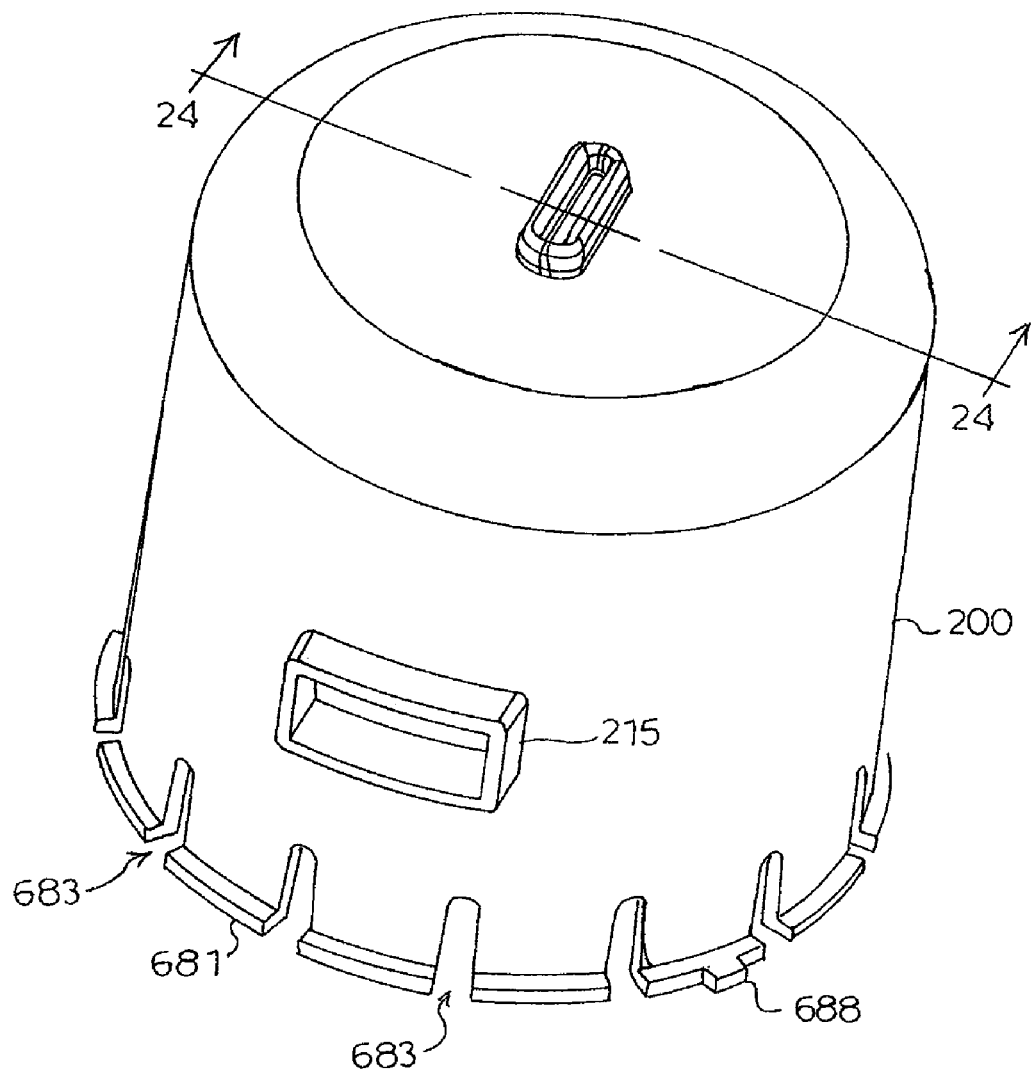
FIG. 23 is a perspective view of a rotatable motor cover according to the present invention for use with the drive unit shown in FIG. 16.
Figure 24:
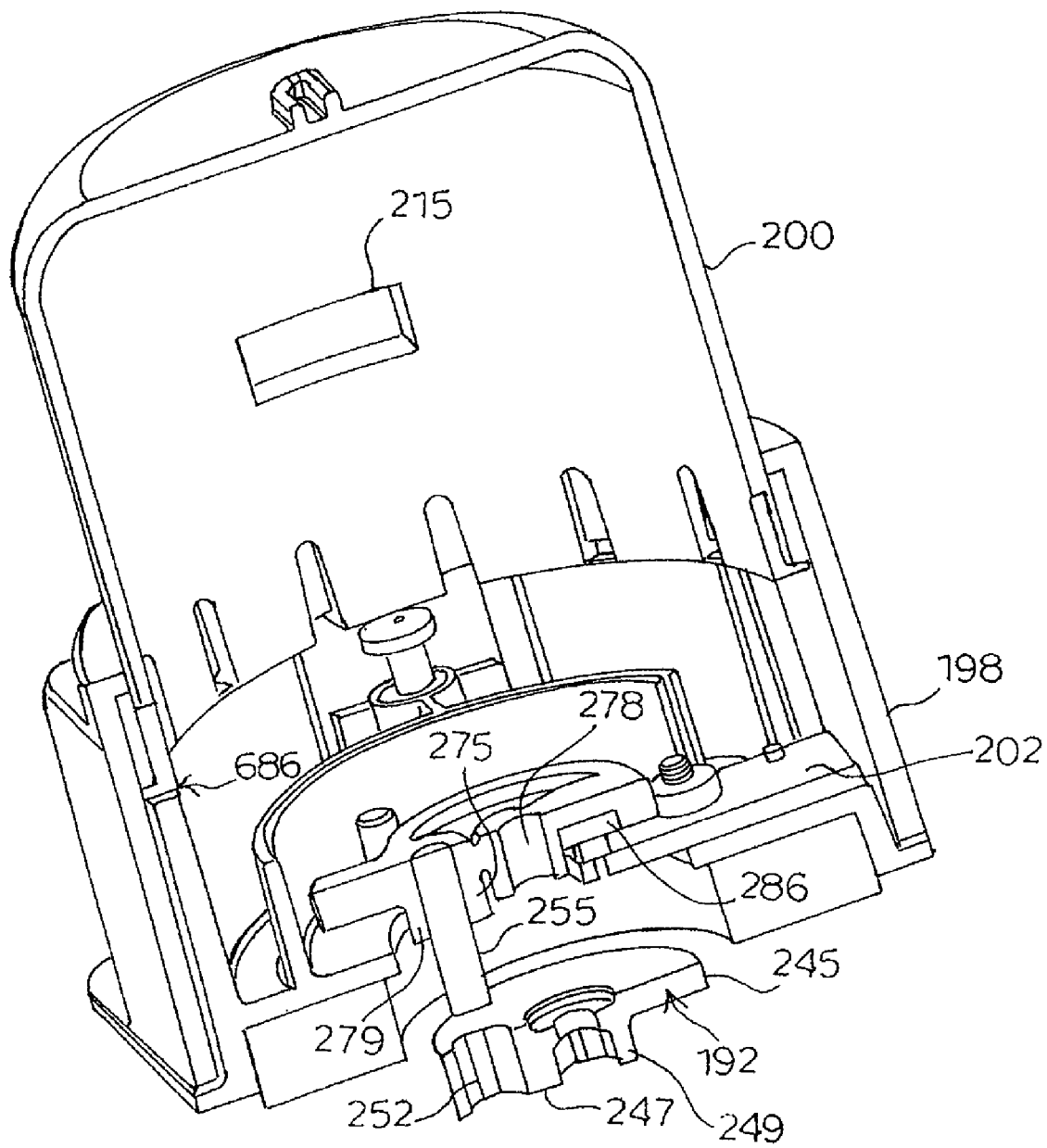
FIG. 24 is a partial view of a cross-section of the drive unit shown in FIG. 16.

As shown by FIG. 16, the fixed cover 198 is coupled to the mounting bracket 196 with screws. As shown by FIG. 24, the fixed cover 198 is coupled to the rotatable cover 200, which can be rotated relative to the fixed cover 198. Referring to FIG. 23, the rotatable cover 200 has a lip 681 that extends around a perimeter of the cover 200. The cover 200 has a plurality of notches 683 along such perimeter, but such notches 683 are unnecessary in other embodiments. The interior of the fixed cover 198 forms a channel 686 (FIG. 24) into which the lip 681 fits and through which the lip 681 slides. A tab 688 extends from the lip 681 and limits the movement of the cover 200 relative to the fixed cover 198. In this regard, the fixed cover 198 has a pair of stops (not shown). The cover 200 is rotatable with the tab 688 between the stops. As the cover 200 is rotated in one direction, the tab 688 eventually contacts one of the stops preventing further movement of the cover 200 in such direction. As the cover 200 is rotated in the opposite direction, the tab 688 eventually contacts the other stop preventing further movement of the cover 200 in such direction. In one exemplary embodiment, the cover 200 is rotatable up to 180 degrees (i.e., half of full revolution). Limiting the movement of the cover 200 helps to prevent entanglement of a motor cable (not shown) that is within the cover 200.

The rotatable cover 200 has a receptacle 215 for receiving electrical wires, such as the electrical cable 277 from the control unit 64. The motor cable (not shown) has a connector that electrically connects the motor cable to the cable 277 from the control unit 64. Thus, one end of the motor cable is connected to the cable 277 from the control unit 64, and the other end is connected to the motor 194 thereby electrically connecting the motor 194 to the control unit 64. Since the cover 200 is rotatable, it is possible to position the control unit 64 at various locations, such as either on top of or below the hydraulic door closer 60, and to then rotate the cover 200 until the receptacle 215 is oriented in a manner conducive to receiving the cable 277. In addition, the cover 200 may be rotated such that the receptacle 215 is generally faced downward in order to help keep rainwater from falling into the receptacle 215 and reaching electrical components housed by the covers 198, 200. In one exemplary embodiment, the covers 198, 200 are both composed of plastic, but other materials for the covers are possible in other embodiments.

Figure 19:
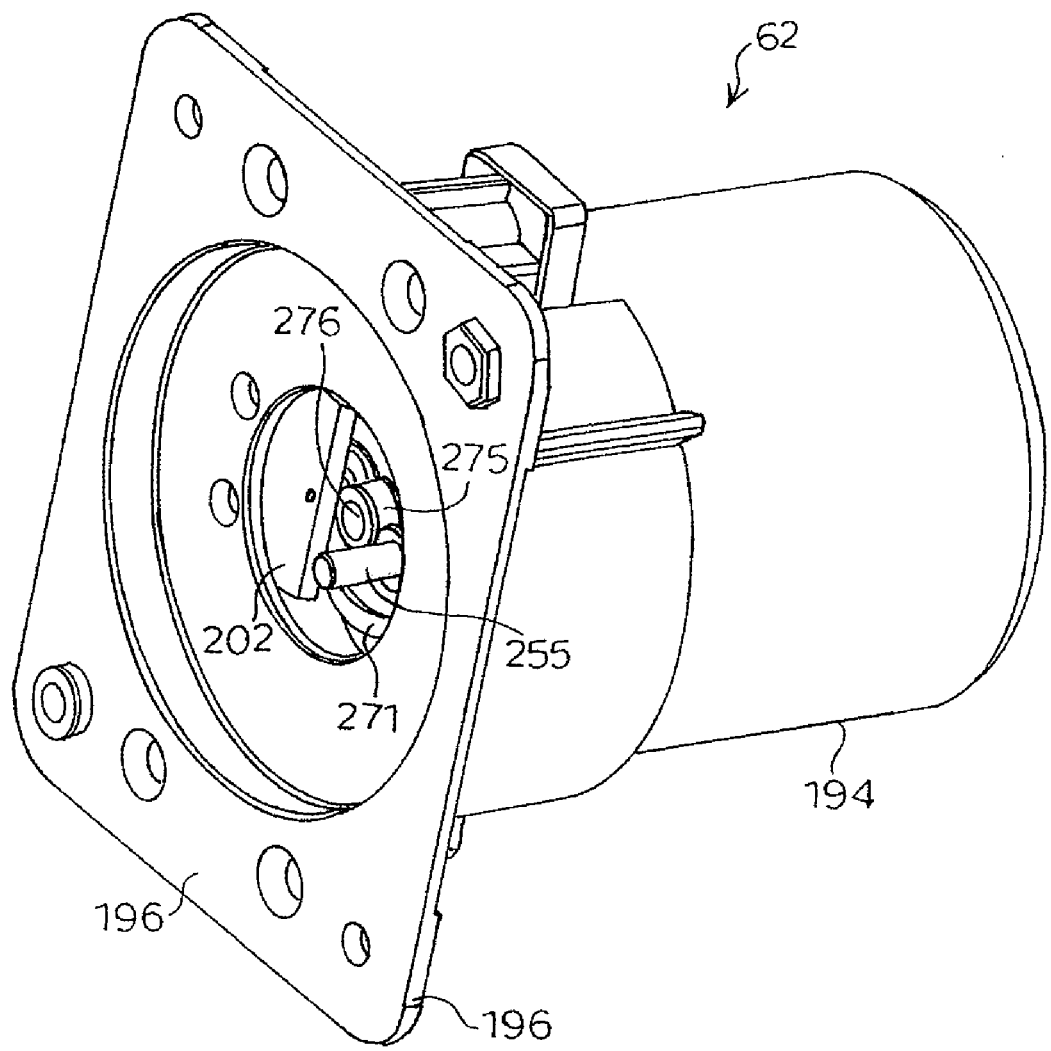
FIG. 19 is a perspective view of the drive unit shown in FIG. 18 with the COS coupler removed.
Figure 25:
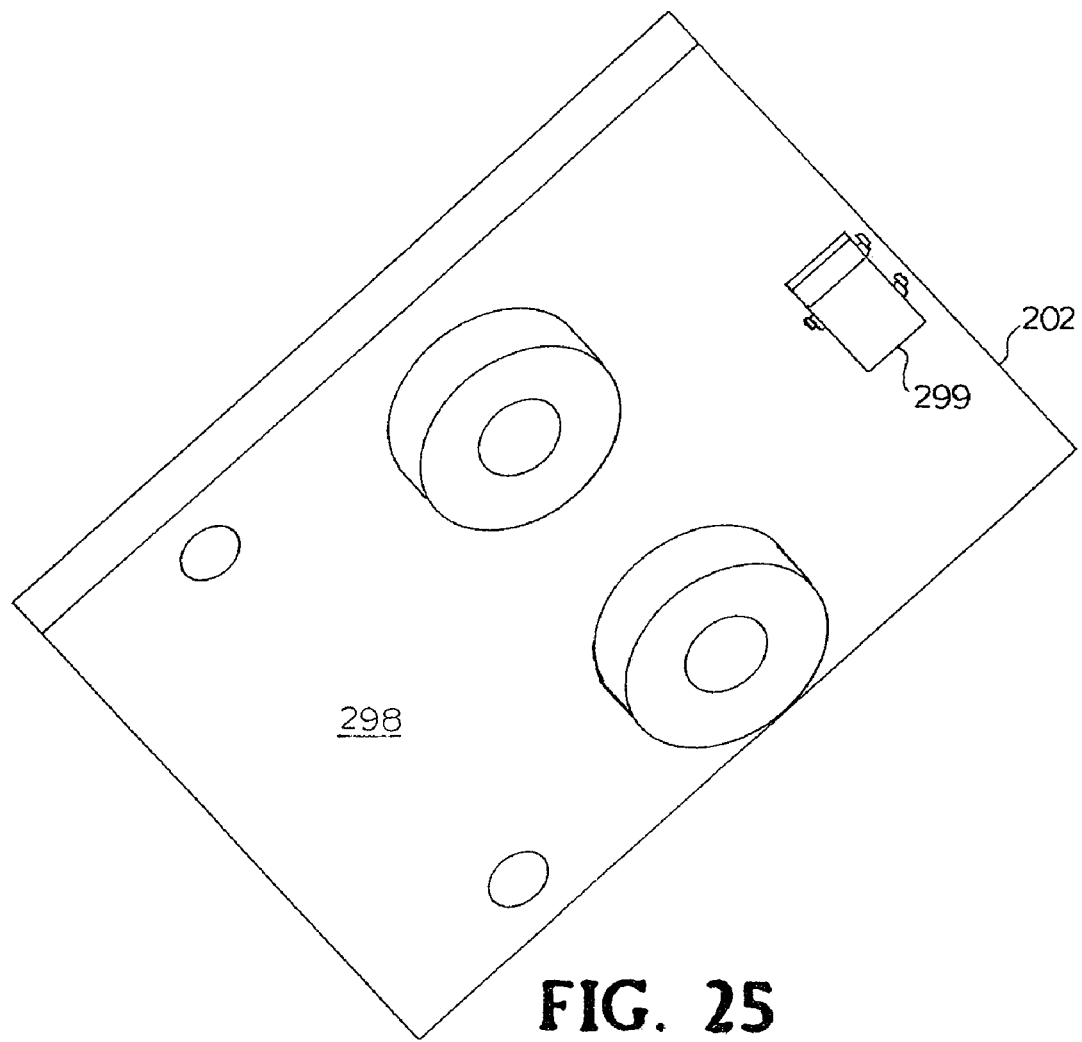
FIG. 25 is perspective view of an inner surface of a PCB board according to the present invention for use with the drive unit shown in FIG. 16.

Referring to FIGS. 19 and 20, a PCB board 202 is positioned between the motor coupler 192 and the COS coupler 190. In one exemplary embodiment, the PCB board 202 is attached to the mounting bracket 196 via, for example, screws 203 (FIG. 17), but other techniques for mounting the PCB board 202 on the mounting bracket 196 or other component are possible in other embodiments. As shown by FIG. 25, a magnetic sensor 299 is mounted on an inner surface 298 of the PCB board 202. The magnetic sensor 299 is configured to detect a strength of the magnetic field generated by the magnet 286 on the motor coupler 192. Such a detection is indicative of the angular position of the valve shaft 124 of the door closer 60. In this regard, to change such angular position, the motor 194 rotates the motor shaft 276 causing the motor coupler 192 to rotate. Such rotation is translated to the COS coupler 190 through the pin 255. In this regard, rotation of the motor coupler 192 moves the pin 255 about the motor shaft 276. When moving, the pin 255 presses against and moves the COS coupler 190. In particular, the pin 255 rotates the COS coupler 190 and, therefore, the cut-off screw 170 that is inserted into the hollow tab extension 247. The rotation of the cut-off screw 170 changes the angular position of the valve shaft 124. Since rotation of the motor coupler 192 ultimately changes the angular position of the valve shaft 124, the position of the magnet 286 relative to the sensor 299 on the PCB board 202, which is stationary, indicates the angular position of the valve shaft 124.

The sensor 299 is configured to transmit a signal having a voltage that is a function of the magnetic field strength sensed by the sensor 299. In one exemplary embodiment, the sensor 299 is a ratiometric sensor such that a ratio (R) of the sensor's input voltage to the sensor's output voltage is indicative of the angular position of the valve shaft 124. In this regard, each discrete angular position of the valve shaft 124 is associated with a specific voltage ratio (R), which is equal to the input voltage of the sensor 299 divided by the output voltage of the sensor 299. For example, assume that to open the valve shaft 124 more so that flow rate increases, the motor coupler 192 is rotated such that the magnet 286 is moved closer to the sensor 299 thereby increasing the magnetic field strength sensed by the sensor 299. In such an example, R increases the more that the valve shaft 124 is opened. Further, R decreases when the motor coupler 192 is rotated such that the magnet 286 is moved away from the sensor 299. Thus, R decreases as the valve shaft 124 is closed in order to decrease flow rate.

In one exemplary embodiment, control logic 280 stores data 301, referred to herein as "valve position data," that maps various possible R values to their corresponding angular positions for the valve shaft 124. Thus, the control logic 280 can determine an R value from a reading of the sensor 299 and use the stored data 301 to map the R value to the valve's angular position at the time of the reading. In other words, based on the reading from sensor 299 and the mappings stored in the valve position data 301, the control logic 280 can determine the angular position of the valve 69.

Note that the use of a ratiometric sensor can be desirable in embodiments for which power is supplied exclusively by a generator 294. In such an embodiment, conserving power can be an important design consideration, and it may be desirable to allow the input voltage of the sensor 299 to fluctuate depending on power demands and availability. Using a voltage ratio to sense valve position allows the input voltage to fluctuate without impairing the integrity of the sensor readings. In other embodiments, other types of magnetic sensors may be used to sense the magnetic field generated by the magnet 286.

In one exemplary embodiment, the sensor 299 is coupled to the control unit 64 via three wires of the cable 277. One wire carries an input voltage for the sensor 299. Another wire carries an output voltage for the sensor 299, and the third wires carries an enable signal. In this regard, the sensor 299 is configured to draw current from the control logic 280 only when receiving an enable signal from the logic 280. Thus, if the sensor 299 is not receiving an enable signal via the third wire, the sensor 299 is not usurping any electrical power. Moreover, when the control logic 280 desires to determine the current position of the valve shaft 124, the control logic 280 first transmits an enable signal to the sensor 299, waits a predetermined amount of time (e.g., a few microseconds) to ensure that sensor 299 is enabled and providing a reliable reading, reads a sample from the sensor 299, and then disables the sensor 299 thereby preventing the sensor 299 from drawing further current. Accordingly, for each reading, the sensor 299 draws current only for a short amount of time thereby helping to conserve electrical power.

In one exemplary embodiment, readings from the sensor 299 are used to assist in the control of the motor 194. In such an embodiment, the motor 194 is a servomotor, and the control logic 280 instructs the motor 194 when and to what extent to rotate the motor shaft 276 (thereby ultimately rotating the cut-off screw 170 by a corresponding amount) by transmitting pulse width modulation (PWM) signals to the motor 194. In this regard, pulse width modulation is a known technique for controlling servomotors and other devices by modulating the duty cycle of control signals. Such techniques can be used to control the motor 194 such that the motor 194 drives the shaft 276 by an appropriate amount in order to precisely rotate the shaft 276 by a desired angle.

In controlling the door closer 60, the control logic 280 may determine that it is desirable to set the angular position of the valve shaft 124 to a desired setting. For example, the control logic 280 may determine that the angle of the door 52 has reached a point at which the force generated by the closer 60 is to be changed by adjusting the angular position of the valve shaft 124. If the current angular position of the valve shaft 124 is unknown, the control logic 280 initially determines such angular position by taking a reading of the sensor 299. In this regard, the control logic 280 enables the sensor 299, waits a predetermined amount of time to ensure that the sensor 299 is enabled and is providing a reliable value, and then determines the angular position of the valve shaft 124 based on the sensor 299. In one exemplary embodiment in which the sensor 299 is ratiometric, the control logic 280 determines the ratio, R, of the sensor's input and output voltages and maps this ratio to a value indicative of the valve's current angular position via the valve position data 301.

Based on the valve's current angular position, the control logic 280 determines to what extent the cut-off screw 170 is to be rotated in order to transition the valve shaft 124 to the desired angular position. For example, the control logic 280 can subtract the desired angular position from the current angular position to determine the degree of angular rotation that is required to transition the valve shaft 124 to its desired angular position. The control logic 280 then transmits a PWM signal to the motor 194 to cause the motor to rotate the shaft 276 by a sufficient amount in order transition the valve shaft 124 to its desired angular position. In response, the motor 194 rotates the shaft 276 thereby rotating the motor coupler 192. Since the pin 255 passes through the COS coupler 190, the COS coupler 190 rotates in unison with the motor coupler 192 thereby rotating the cut-off screw 170. Accordingly, the motor 194 effectively drives the cut-off screw 170 such that the valve shaft 124 is transitioned to its desired angular position. Once the valve shaft 124 is transitioned to its desired angular position, the control logic 280, if desired, can take another reading of the sensor 299, according to the techniques described above, in order to ensure that the valve shaft 124 has been appropriately set to its desired angular position. If there has been any undershoot or overshoot of the sensor's angular position, the control logic 280 can transmit another PWM signal to the motor 194 in order to correct for the undershoot or overshoot.

Figure 26:
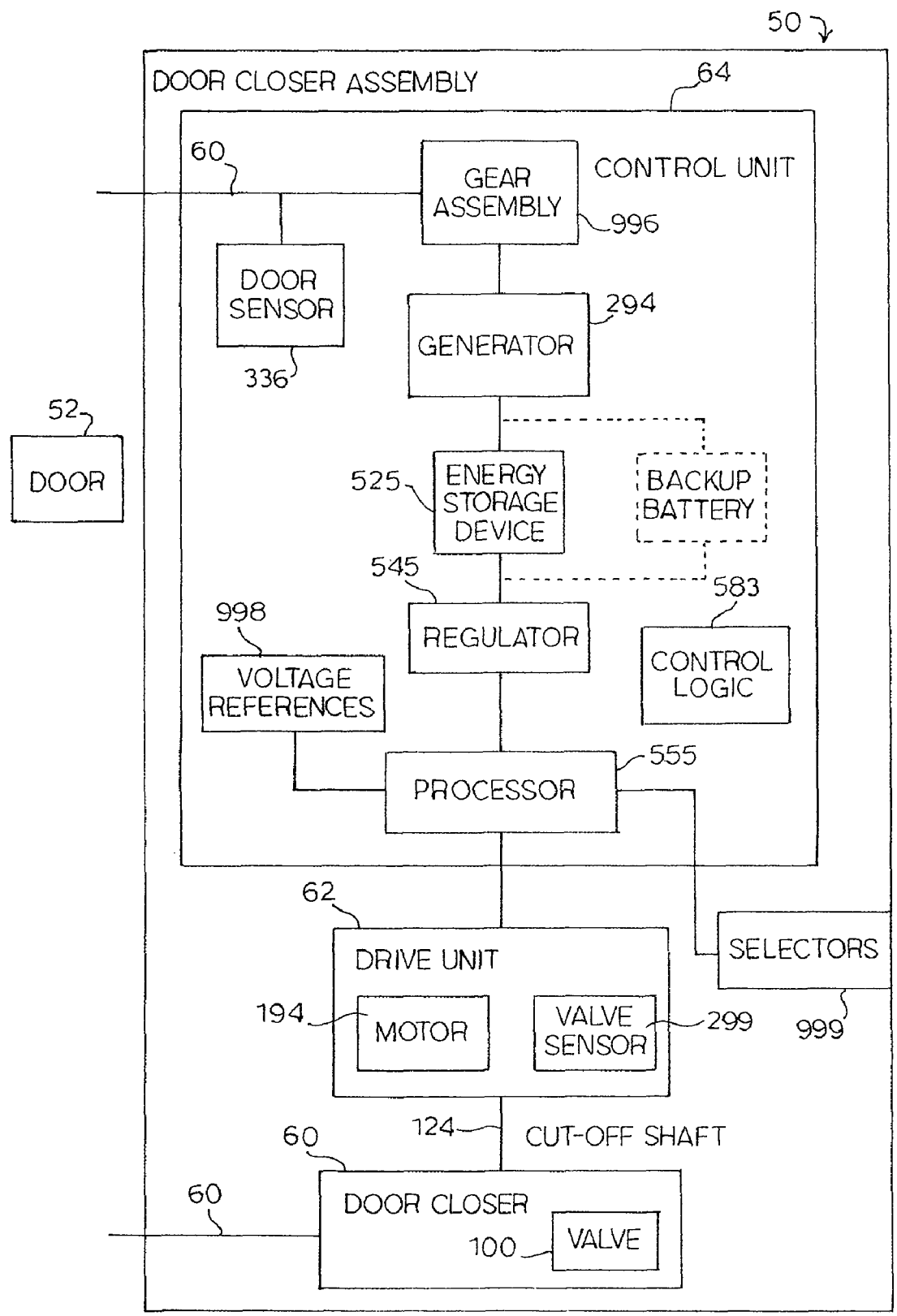
FIG. 26 is a functional block diagram of a door closer assembly according to an exemplary embodiment of the present invention.

FIG. 26 shows a functional block diagram of a door closer assembly according to an exemplary embodiment of the present invention. The exemplary door closer assembly 50 may include a door closer 60, a control unit 64, and a drive unit 62. The door closer 60 may include a valve 100 that regulates fluid in the door closer 60 causing the door closer 60 to control a speed of operation of the door 52. The drive unit 62 may include a motor 194 that drives a cut-off shaft 124 to control the valve 100. The drive unit 62 may also include a valve sensor 299 that monitors an angular position of the valve 100 based on a rotation of the valve shaft 124. The control unit 64 may include a processor 555, a regulator 545, an energy storage device 525, a generator 294, a gear assembly 996, control logic 997 and a door sensor 336. The processor 555 may be connected to the drive unit 62 and the regulator 545. The regulator 545 regulates an output voltage of the energy storage device 525. The generator 294 receives power through the gear assembly 996 based on movement of the door 52 and generates power used to charge the energy storage device 525 power the processor 555, regulator 545, motor 194 and any other electrical circuitry in the control unit 64. The control logic 997 and other components of the control unit 64 may reside on a printed circuit board (PCB). Further, although not shown, the control unit 64 may have one or more storage devices that may store software applications, data, control instructions, etc.

In embodiments according to the present invention, it is possible for the control unit 64 to have a battery in addition or in lieu of the generator 294 in order to provide power to the electrical components of the door closer assembly 50. However, a battery, over time, must be replaced. In one exemplary embodiment, the control unit 64 may be designed such that all of the electrical power used by the control unit 64 is generated by the generator 294 so that use of a battery is unnecessary, or only used as a backup source of power. In other embodiments according to the present invention, electrical power may be received from a battery or other types of power sources. Moreover, although not explicitly shown, the generator 294 and/or the energy storage device 525 may provide power to all appropriate components in the control unit 64 as well as the motor 194 and appropriate components in the drive unit 62 and the door closer 60.

The door sensor 336 monitors an angular position of the door 52 based on movement of the door 52. The processor 555 obtains data from the valve sensor 299 regarding the angular position of the valve and data from the door sensor 336 regarding the angular position of the door and uses both data to determine whether the position of the valve requires adjustment. The valve sensor 299 and the door sensor 336 may be in the form of Hall effect sensors where as the angular position of the valve shaft 124 varies and the angular position of the door 52 varies a magnetic field detected by the valve sensor 299 and the door sensor 336, respectively will also vary. The processor 555 uses data from the magnetic fields detected by the valve sensor 299 and the door sensor 336 to determine an associated angular position of the valve and an associated angular position of the door, respectively. To help illustrate embodiments according to the present invention magnet sensors, e.g., Hall effect sensors, will be used for the valve sensor 299 and the door sensor 336, however, embodiments according to the present invention are not limited to use of magnetic type sensors as any type of sensor that provides data useable for determining an angular position of a valve shaft 124 and a door 52 are within the scope of the present invention.

Moreover, according to embodiments of the present invention, one or more switches, knobs, or other types of selectors 999 (FIG. 29) may be accessible external to the door closer assembly 50 allowing a user of the door closer assembly 50 to set desired values for a closer operation mode, a delayed action time, a backcheck position, a backcheck intensity, and a teach mode. The values set on the selectors may be used by the processor 555 in determining adjustment of the valve 100. The selectors 999 may be interconnected to a printed circuit board on the control unit 64.

Further, control software in the control unit 64 may monitor a voltage level of the energy storage device, e.g., capacitor, and based on comparisons against stored voltage references 998, change a mode of operation of the processor, shut down the processor, or permit adjustment of the valve 100.

FIG. 27 shows a diagram of door opening and closing regions according to an exemplary embodiment of the present invention. To help illustrate embodiments according to the present invention, example values for various door opening and closing parameters will be used, however, embodiments of the present invention are not limited to the use of these exact values. Further, selectors may be used to set desired door opening and closing operation parameters. In FIG. 27, seven dipswitches will be used to help illustrate these selectors, however, any type of selectors such as, for example, knobs, buttons, etc. may be used and be within the scope of the present invention. During a door opening cycle, the door closer 60 may begin control between a first door opening angle and a second door opening angle, e.g., 60° and 85°, arresting motion by a third door opening angle, e.g. 90°. During the closing cycle, the door closer 60 must maintain control from a certain door opening angle, e.g., 115° to close. The closing speed of the door 52 may be maintained for a period of time, e.g. a 5 to 7 second closing time from 90° of door opening. As the door 52 closes, there may be two regions of closing speed. The first region may begin control at a certain door opening angle, e.g., 115°, from the door-closed position and continues to within a certain arc length, e.g., 12", of the door-closed position. These measurements may be taken at a certain radius, e.g., 30", from the door's pivot point. The second region may begin control at a certain arc length, e.g., 12", from the door-closed position and continues to the door-closed position.

According to embodiments of the present invention, a sensor or encoder may be attached to a pinion connected to a door 52 to sense the door position and calculate its speed. This value may be used for monitoring speed, position, and teaching of the mounting for the door closer operation. A teach mode may be enabled when a Dipswitch 7 is turned on. This may serve as an override of existing settings that can be activated to re-teach a Home and Fully Open position of the door 52 when a user (e.g., facilities/maintenance person who maintains the door closer) deems it necessary. An example operation of the teach mode may be: (1) Initiate Teach Mode (turn dipswitch on); (2) Open door to Fully Open position and hold for a small period of time (e.g., 4 seconds); (3) Let door close to the Home position and then wait a small period of time (e.g., 4 seconds) after the door latches; and (4) End Teach Mode (turn dipswitch off).

During operation, the door closer 60 may adjust a speed to a target value (once each cycle) for each region of door travel by adjusting the valve 100. If conditions arise where the closer operation is idle for an extended period of time the valve 100 may be adjusted to maintain control of the door 52 based upon normal operation. The speed for each region may need to be measured and stored for future adjustment. The value for each speed may need to be calculated from the average of the last few (e.g., five) speed readings. This may be initially preset from the factory. The valve may be set for each target speed in the cycle. Moreover, the valve 100 may need to be adjusted once for each range and not continuously "search" for the perfect speed. The only exception may be due to gross speed error. Door closers 60 may be initially setup with certain settings (e.g., for a standard 90° opening, parallel mounting configuration) when received by a user where the user may change these initial settings if desired.

As shown in FIG. 26, the door speed may be controlled through oil flow restriction in the door closer 60 between fully Open (2) and Home (1) (both opening and closing). Backcheck is the opening speed control between (BC) and (2). The exemplary dipswitch-setting scheme below identifies an exemplary target speed for backcheck.

TABLE 1

| Backcheck | B Deg/Sec | Dipswitch 1 | Dipswitch 2 |
|---|---|---|---|
| Soft | | On | On |
| Medium | | Off | Off |
| Hard | | On | Off |

If the door 52 is opened to a position between ((1)+70°)) and (2), then Delay Action as set below may be applied. Delay action may hold the door 52 (shut down the valve) for D seconds. The delay may only be used if the door 52 was opened to a position between ((1)+70°)) and (2) and the dipswitch is set for Delay Action.

The dipswitch-setting scheme below identifies the target delay times. If D is defined as 0 Seconds, then there is no delay action.

TABLE 2

| Delay Action | D Seconds | Dipswitch 3 | Dipswitch 4 |
|---|---|---|---|
| None | 0 | On | On |
| Standard | 10 | Off | Off |
| Long | 20 | On | Off |

On the closing cycle, closer speed control may be applied between (2) and (L) (after delay). On the closing cycle, latch speed control may be applied between (L) and (1).

The dipswitch-setting scheme below identifies the target closer & latch speeds.

TABLE 3

| Closer Speed | C Deg/Sec | L Deg/Sec | Dipswitch 5 | Dipswitch 6 |
|---|---|---|---|---|
| Normal | 15 | 10 | On | On |
| ADA | 10 | 30 | Off | Off |
| Security | 20 | 10 | On | Off |

FIG. 28 shows a diagram of a table translating a door 52 position angle to a pinion 66 position angle according to an exemplary embodiment of the present invention. The table shows door angles ranging from 0 degrees to 180 degrees in 10 degree increments and their associated pinion angle per a mounting type. The mounting types may include a regular mounting, a parallel mounting and a top jamb mounting. Values in this table may be used to determine an angular position of the door 52.

Figure 29:
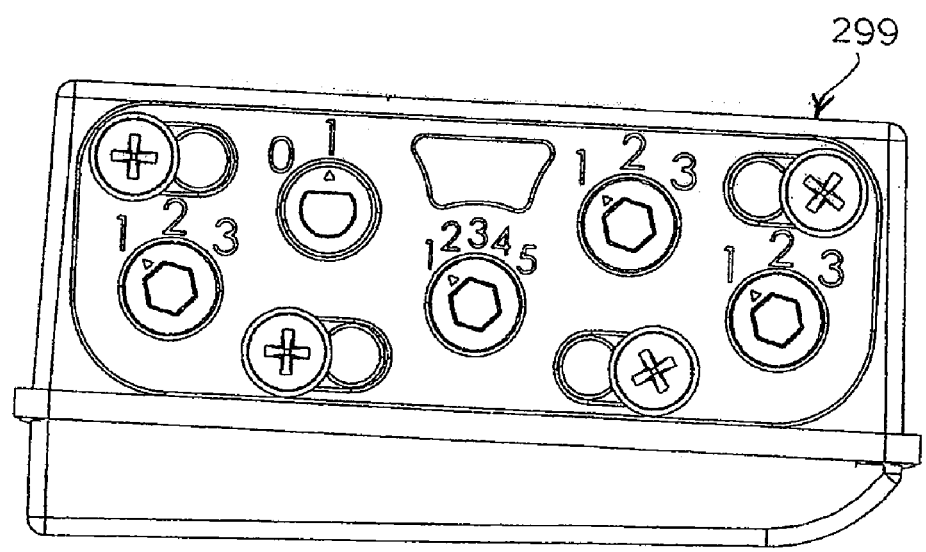
FIG. 29 is a diagram of selectors used to set desired door opening and closing operation parameters according to an exemplary embodiment of the present invention.

FIG. 29 shows a diagram of selectors 999 used to set desired door opening and closing operation parameters according to an exemplary embodiment of the present invention.

Figure 30:
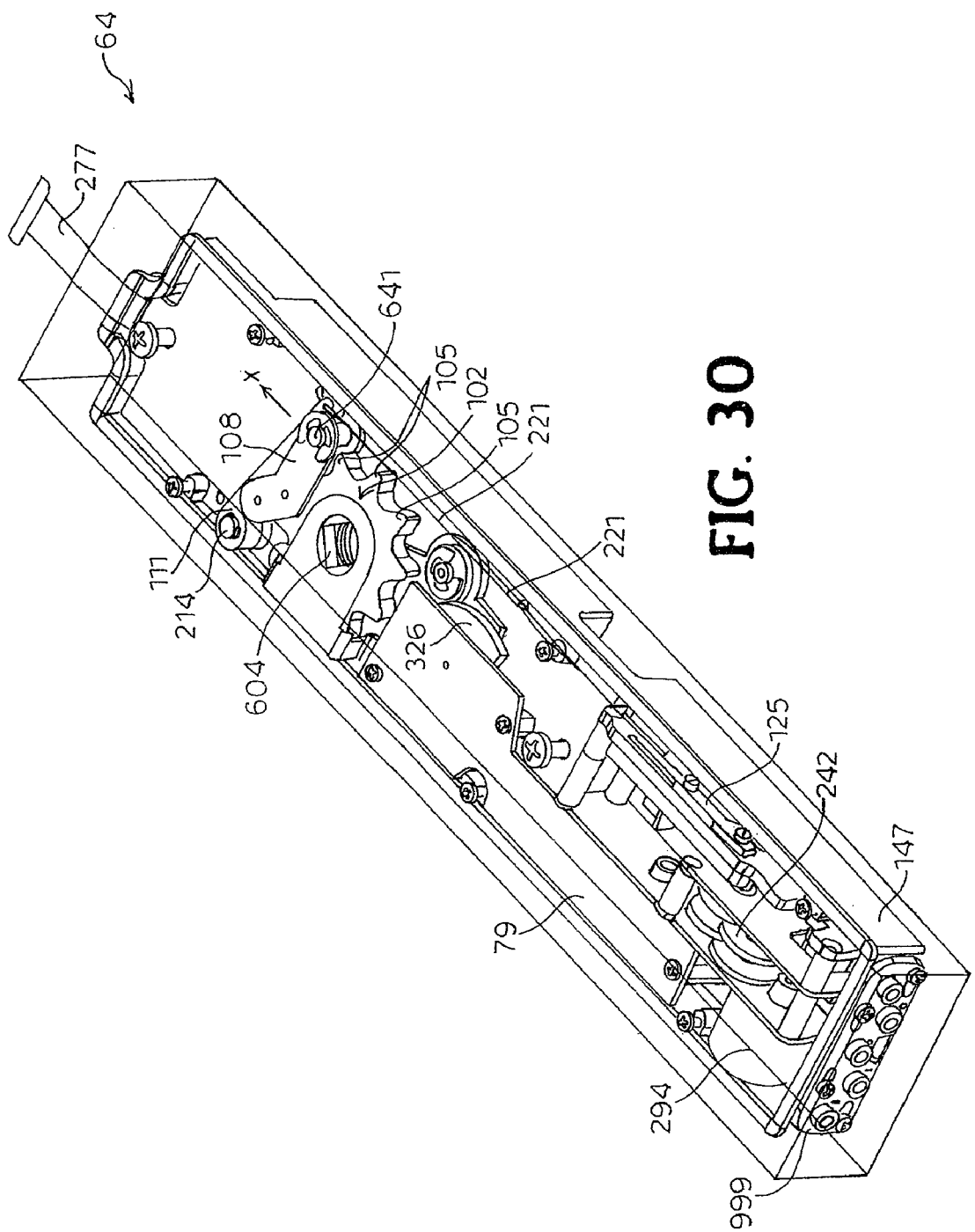
FIG. 30 is an exemplary diagram a control unit according an exemplary embodiment of the present invention.
Figure 31:
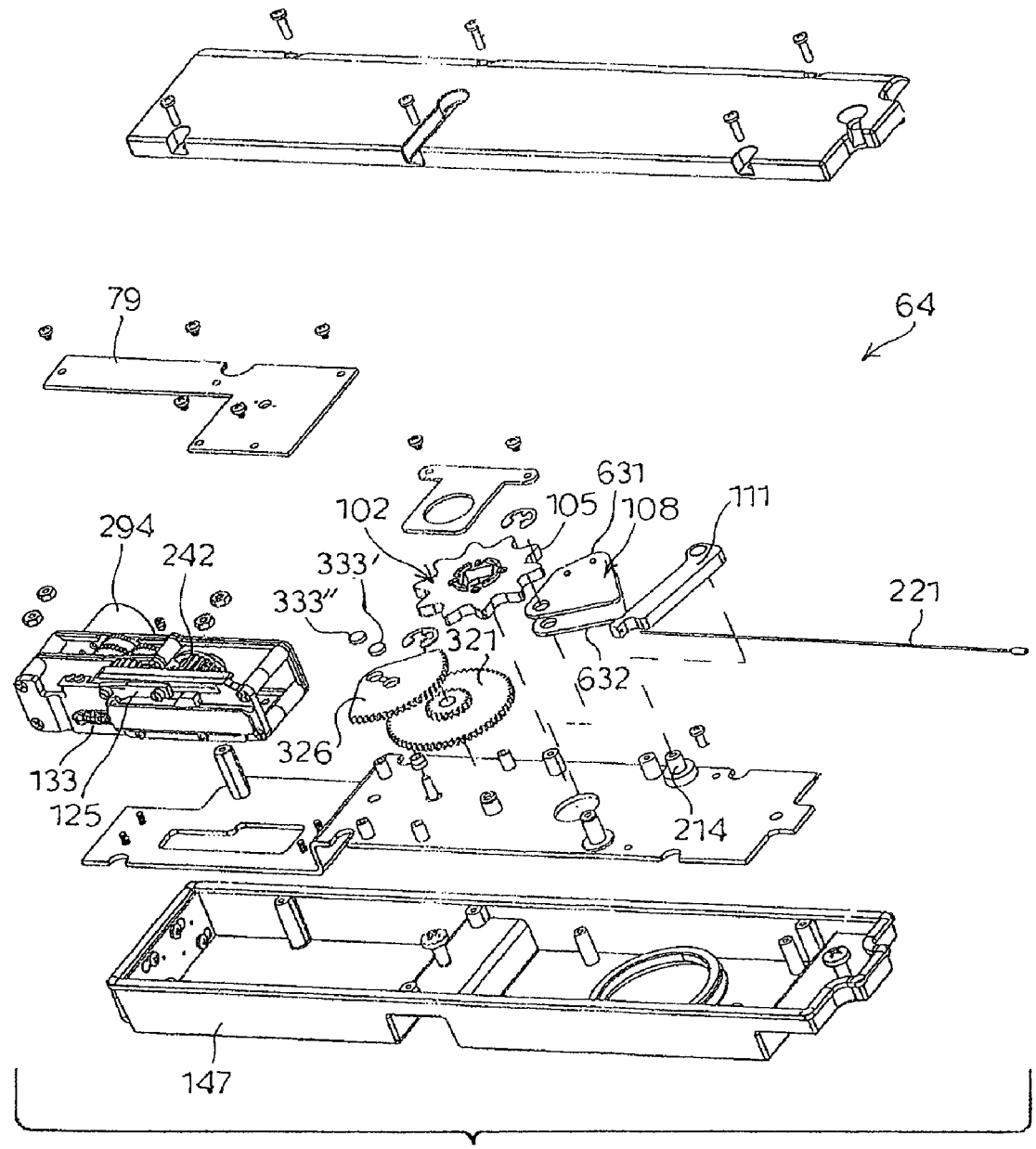
FIG. 31 is an exemplary diagram an exploded view of a control unit according an exemplary embodiment of the present invention.

FIGS. 30 and 31 show an exemplary diagram of a control unit 64 according an exemplary embodiment of the present invention. The components of the control unit 64 may be housed in an enclosure 147, which can be mounted on a bottom of the door closer 60, or at another location, such as on top of the door closer 60. The control unit 64 may include a printed circuit board (PCB) 79. The components of the PCB 79 receive electrical power from a generator 294 (described in more detail following). A star gear 102 receives an end of the pinion 66, which rotates the star gear 102 when the door 52 is moving. The star gear 102 has a plurality of teeth 105 formed along the outer edge of the gear 102. As the star gear 102 rotates, the gear teeth 105 engage a force activator 108 causing the force activator 108 to push a pull arm 111 in generally the x-direction so that the arm 111 pivots about a pivot point 214, as indicated in FIG. 30. The x-direction is generally in a direction towards the end of the control unit 64 with the ribbon cable 277. An end of the pull arm 111 is coupled to a wire 221 (or a cord, a rod, etc.), which is also coupled to a movable trigger 125. When forced in the x-direction, the pull arm 111 pulls the trigger 125 in the same direction.

The trigger 125 may be spring loaded by a spring 133. In this regard, the trigger's 125 movement in the x-direction elongates the spring 133. As the activator 108 is forcing the pull arm 111 in the x-direction, a point is reached at which continued rotation by the star gear 102 causes the tooth 105 in contact with the activator 108 to disengage the activator 108. At this point, the spring 133 forces the trigger 125 in a direction opposite of the x-direction. As the star gear 102 continues to rotate, another tooth 105 of the star gear 102 makes contact with the activator 108 causing the force activator 108 to again push the pull arm 111 in the x-direction causing the arm 111 to pivot about the pivot point 214 and to again pull the trigger 125 in the same x-direction, and the process repeats as the star gear 102 turns responsive to movement of the door 52. When the door 52 is in motion and the trigger 125 is pulled in the x-direction and then in a direction opposite the x-direction, the trigger's connection to a gear train 242 causes the rotation of at least one gear in the gear train 242 that translates through the gear train 242 to the generator 294. The generator 294 harnesses this energy and generates an electrical pulse for each movement of the trigger 125. The electrical pulses generated by the generator 294 may be used to power components of the control unit 64 and other items in the door closer assembly 50 without the need for other types of power. Further details will be discussed following.

According to embodiments of the present invention, the trigger 125 moves resulting in the generator 294 generating power when the door 52 is moving. When the door 52 is no longer moving, such as after the door 52 fully closes, the generator 294 may stop generating power and various electrical components, such as components on the PCB 79, may be shut-off. Thus, the electrical power requirements of the door closer assembly 50 can be derived solely from movement of the door 52, if desired, with no need for an external power source.

Once a user begins opening the door 52, the door's movement is translated into movement by the trigger 125 and, ultimately, electrical power by the generator 294. When the generator 294 begins providing electrical power, the electrical components are powered, and the closer 60 is controlled in a desired manner until the door 52 closes or otherwise stops moving at which time various electrical components are again shut-off. However, the techniques described above for generating electrical power are exemplary. Other techniques for providing electrical power are within the scope of the present invention. Further, according to embodiments of the present invention, it may be unnecessary or undesirable for electrical components to be shut-off when the door 52 stops moving. The control unit 64 may also include selectors 999 such as, for example, switches, dials, knobs, etc. for setting desired door closer operating parameters. These parameters may include, for example, a closer operation mode, a delayed action time, a backcheck position, a backcheck intensity, a teach mode, etc.

Figure 32:
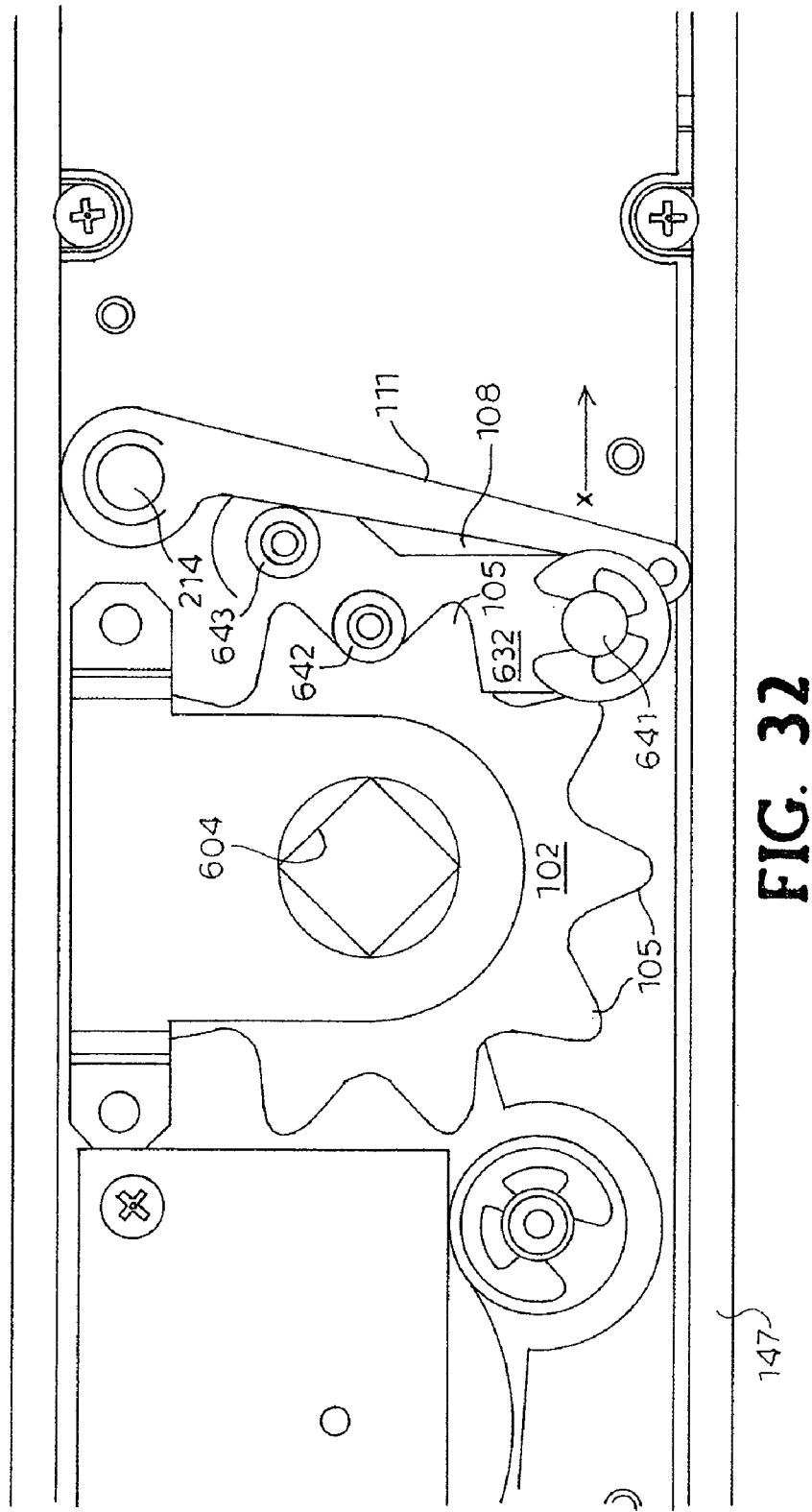
FIG. 32 is a diagram of a detailed view of a star gear and components that interact with the star gear according to an exemplary embodiment of the present invention.

FIG. 32 shows a diagram of a detailed view of the star gear 102 and components that interact with the star gear 102 according to an exemplary embodiment of the present invention. The force actuator 108 may include a top cover 631 (not shown in FIG. 32) and a bottom cover 632. Teeth 105 on the star gear 102 may pass between the top cover 631 and the bottom cover 632 as the star gear 102 rotates. The top cover 631 is removed and not shown in FIG. 32 for illustrative purposes.

The force actuator 108 may include a pivot point 641 and two rods 642 and 643. The force actuator 108 pivots about the pivot point 641 due to movement of the star gear 102. As the star gear 102 rotates, the teeth 105 engage and disengage the first rod 642. In this regard, when a tooth 105 comes in contact with the first rod 642, the tooth 105 presses against the first rod 642, and the first rod 642 slides along the leading edge of the tooth 105 as the gear 102 rotates causing the force actuator 108 to pivot about the pivot point 641 thereby causing the second rod 643 to push the pull arm 111 in the x-direction. Accordingly, the pull arm 111 rotates about the pivot point 214. This motion causes the trigger 125 to move. In this regard, as the trigger 125 is pulled in the x-direction by the pull arm 111, a spring 133 coupled to the trigger 125 is stretched. Once the first rod 642 slides past the peak of the tooth 105, the force applied to the force actuator 108 by the star gear 102 is decreased allowing the trigger's spring 133 to pull the trigger 125 in the direction opposite of the x-direction. This trigger 125 movement forces the pull arm 111 in the direction opposite of the x-direction, as well, causing the first rod 642 to slide along the trailing edge of the tooth 105 until the first rod 642 contacts and slides along the leading edge of the next tooth 105.

The force actuator 108 and pull arm 111 operate essentially the same regardless of the direction of rotation of the star gear 102. Thus, the trigger 125 is repeatedly actuated as the door 52 is both opening and closing. The opening of the door 52 rotates the star gear 102 in one direction and the closing of the door 52 rotates the star gear 102 in the opposite direction. In either case, as noted previously, the trigger 125 is actuated and the generator 294 harnesses energy from the trigger 125 movement to generate power.

Figure 33A:
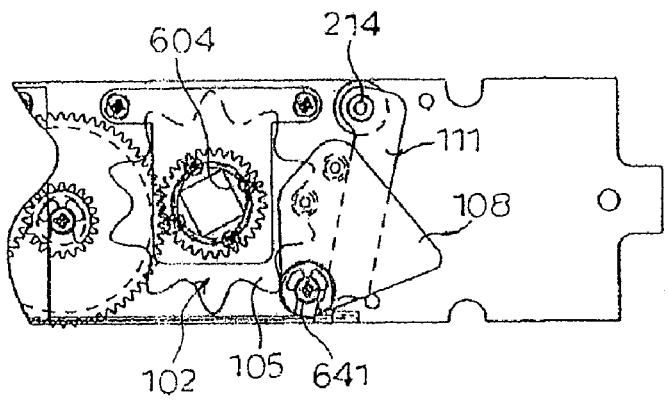
FIGS. 33A and 33B are diagrams of a top view of a star gear and a pull arm in a home position and an associated position of a trigger, respectively according to an exemplary embodiment of the present invention.
Figure 33B:
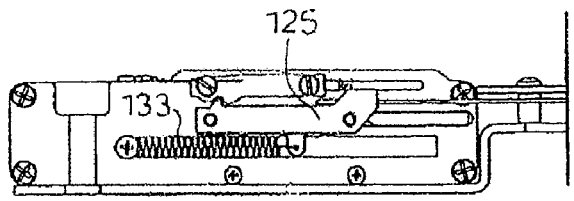

FIGS. 33A and 33B show diagrams of a top view of a star gear and a pull arm in a home position and an associated position of a trigger, respectively according to an exemplary embodiment of the present invention.

Figure 34A:
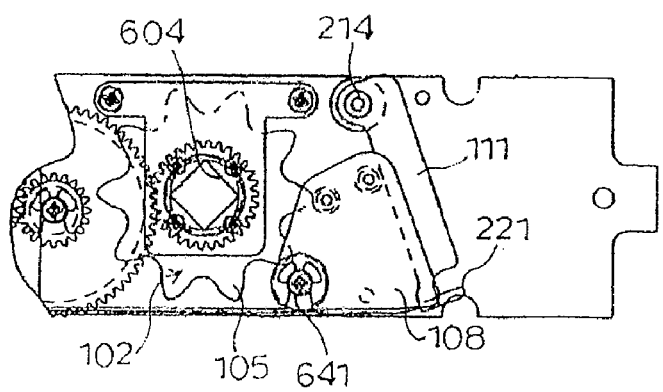
FIGS. 34A and 34B are diagrams of a top view of a star gear and a pull arm in a maximum rotation position and an associated position of a trigger, respectively according to an exemplary embodiment of the present invention.
Figure 34B:
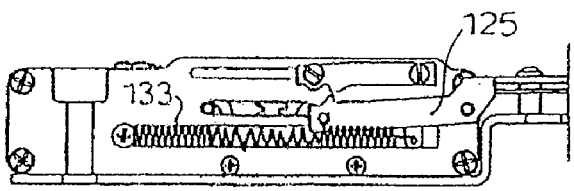

FIGS. 34A and 34B show diagrams of a top view of a star gear and a pull arm in a maximum rotation position and an associated position of a trigger, respectively according to an exemplary embodiment of the present invention.

Figure 37:
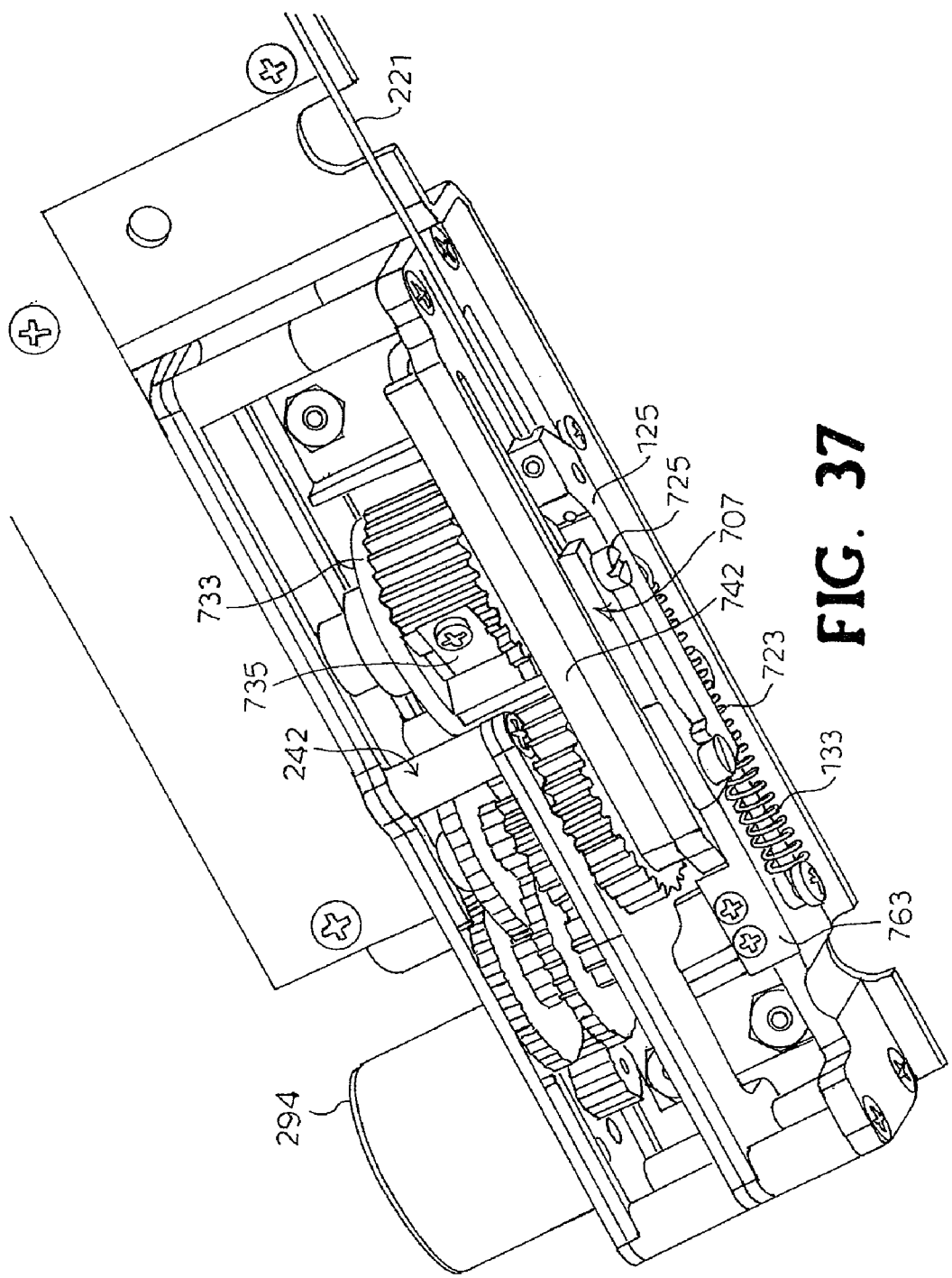
Figure 38:
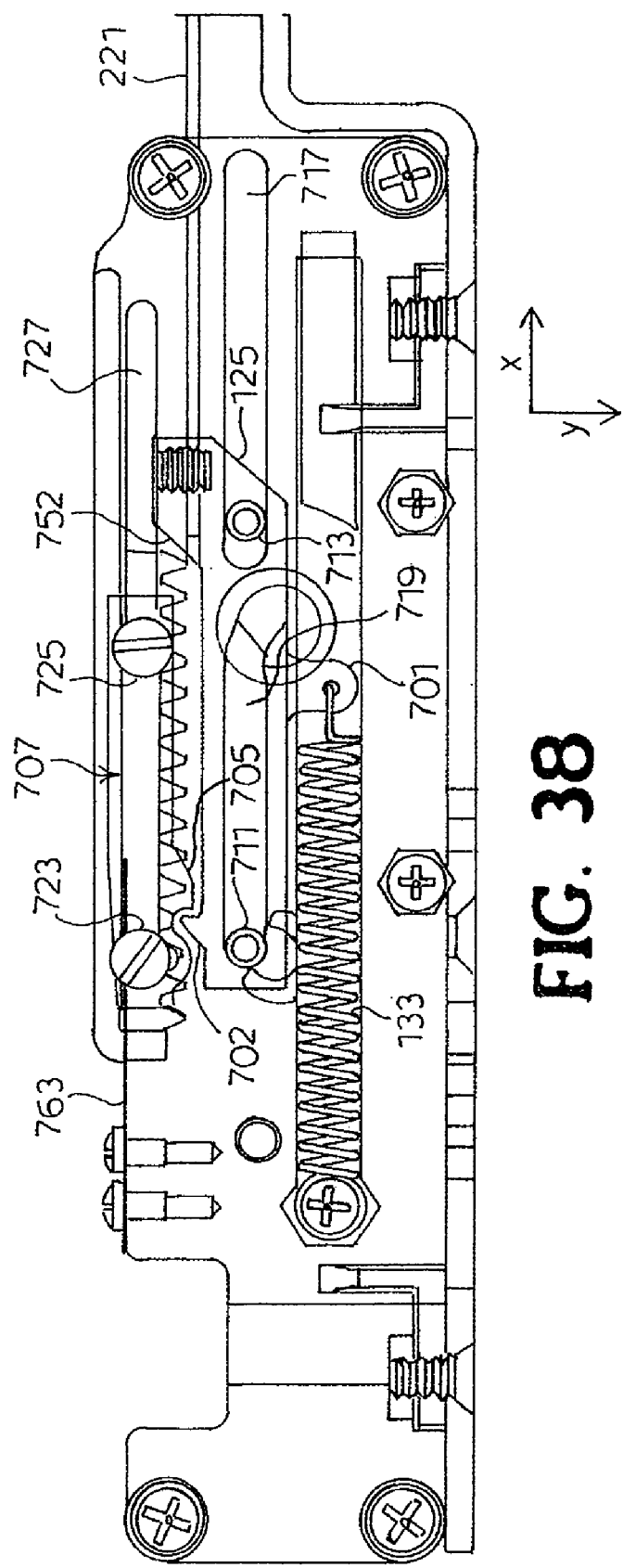
FIG. 38 is a diagram of the assembly of FIG. 37 from a side view perspective according to an exemplary embodiment of the present invention.

FIGS. 35-38 show diagrams of the trigger 125 and gear train 242 assembly according to an exemplary embodiment of the present invention. The trigger 125 may include a plurality of tabs 701 and 702. The first tab 701 may be coupled to the spring 133. The trigger 125 also may have two bolts 711 and 713 that pass through and are guided by slots 717 and 719 (FIG. 38). In particular, the second bolt 713 passes through and is guided by a slot 717, and the first bolt 711 passes through and is guided by a slot 717 and 719 (FIG. 38).

Figure 35:
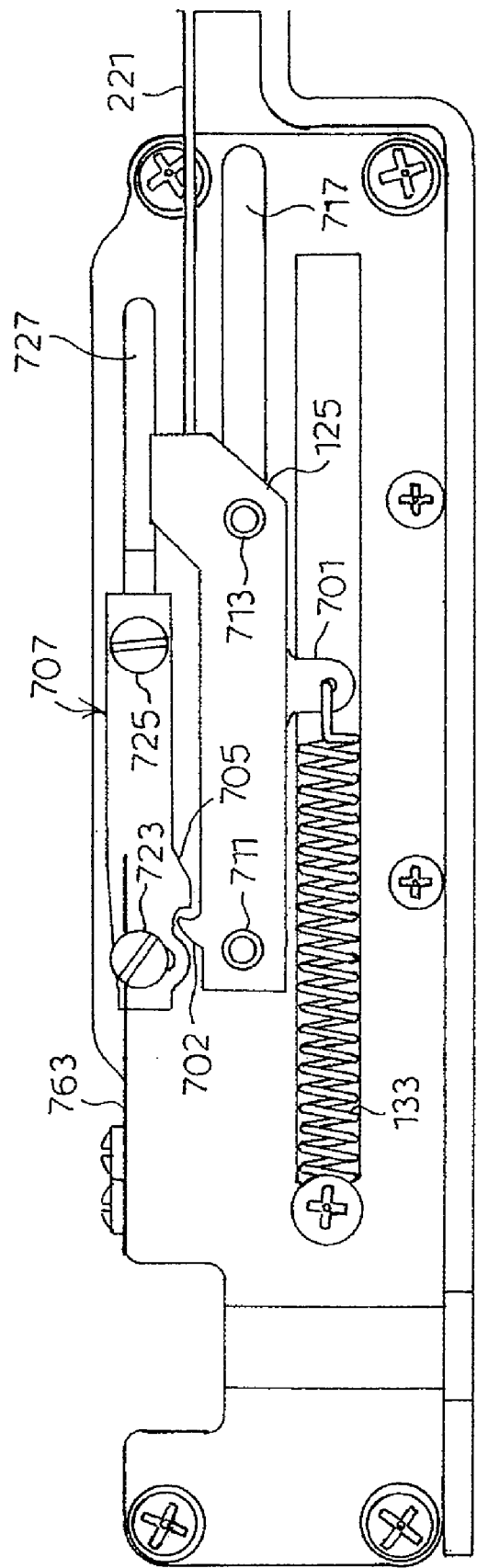
FIGS. 35-37 are diagrams of a trigger and gear train assembly according to an exemplary embodiment of the present invention.
Figure 36:
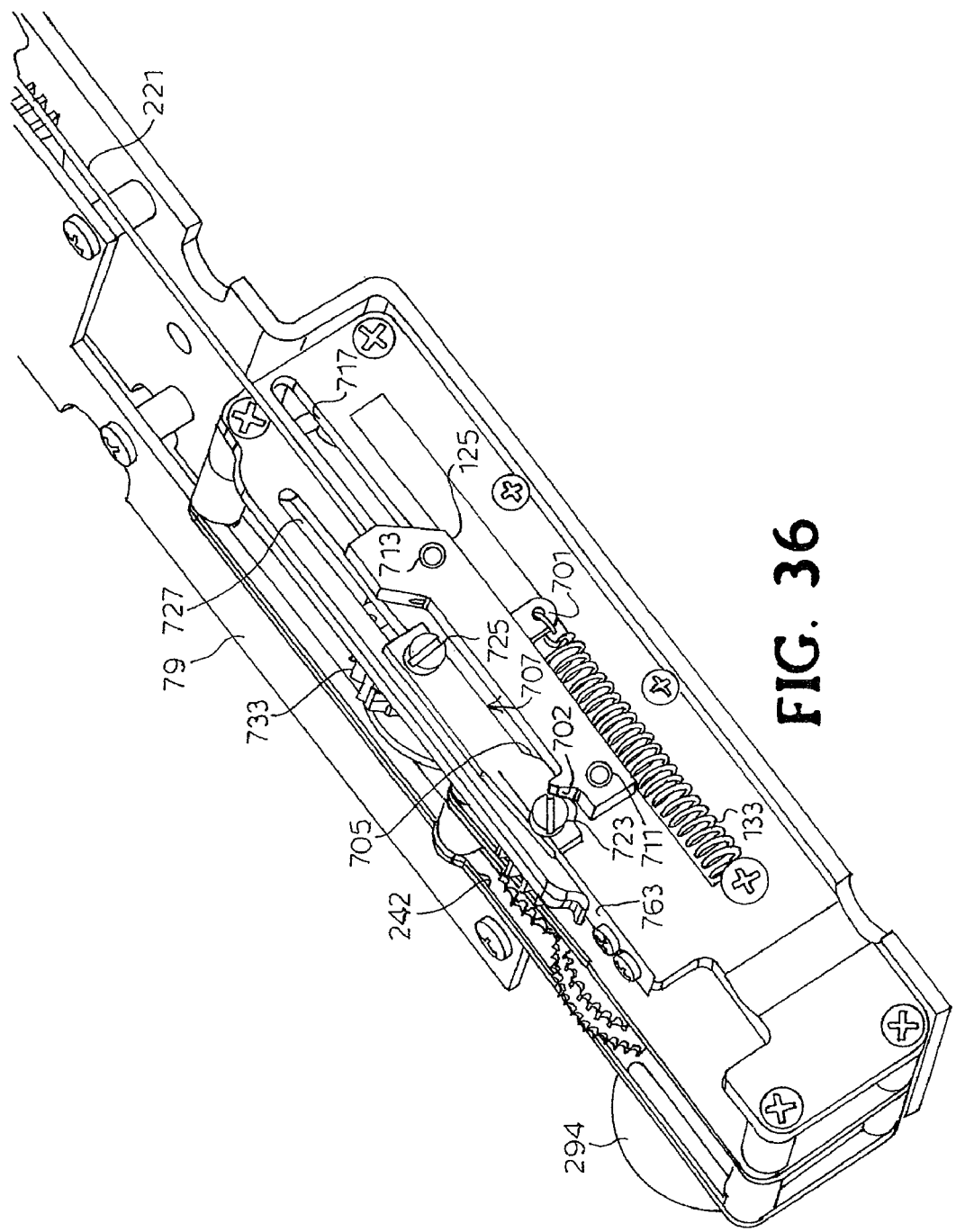

FIG. 38 shows a diagram of the assembly of FIG. 37 from a side view perspective according to an exemplary embodiment of the present invention. Various components, such as the slot 719, which are hidden from view in FIG. 35 are shown in dashed lines in FIG. 38 for illustrative purposes. The slot 719 may be curved, and an end of the slot 719 may slope downward. A movable element 707 may have two bolts 723 and 725 that pass through and are guided by a slot 727. When the trigger 125 is forced in the x-direction by the pull arm 111, the second tab 702 presses against a third tab 705 of the movable element 707 and moves the element 707 in the x-direction.

Figure 39:
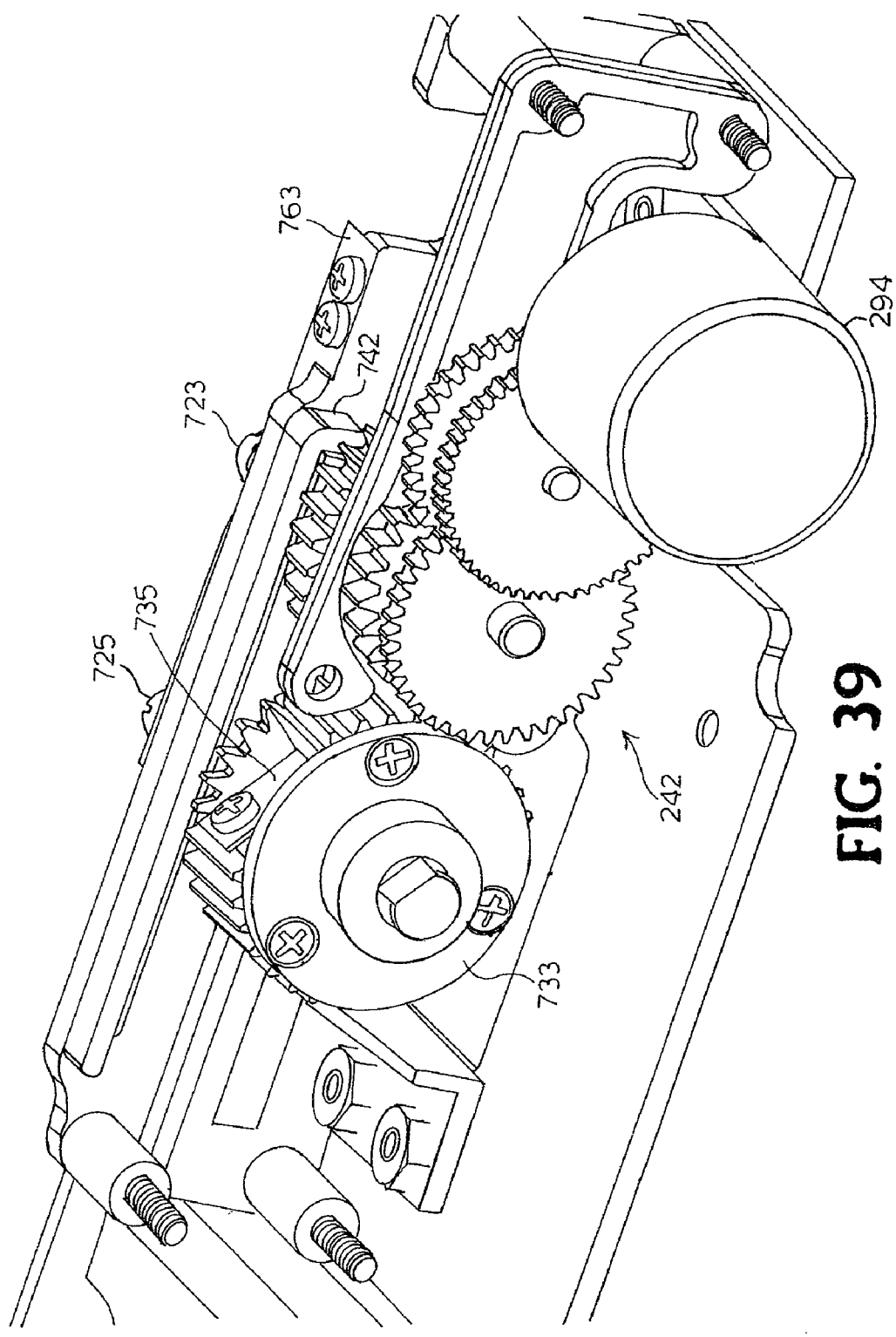
FIGS. 39 and 40 show diagrams of a gear train according to an exemplary embodiment of the present invention.
Figure 40:
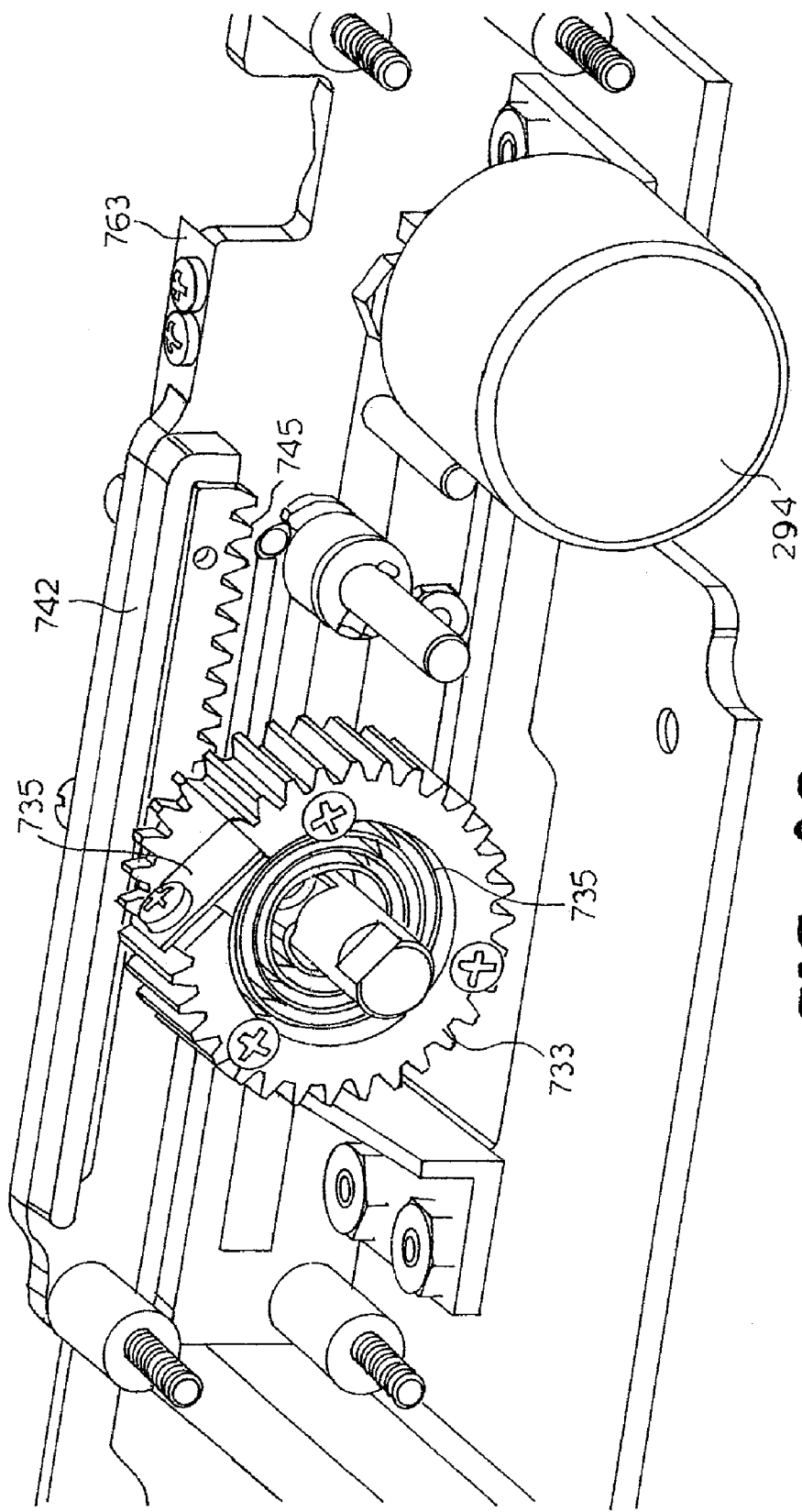

FIGS. 39 and 40 show diagrams of the gear train 242 according to an exemplary embodiment of the present invention. The gear train 242 includes a plurality of gears. One gear 733 has an internal clock spring 735 (as shown in FIG. 40). The bolts 723 and 725 of the movable element 707 are coupled to a rack 742, which has teeth 745 that engage teeth (not shown) of the gear 733. As the movable element 707 is in the x-direction by the trigger 125, the rack 745 moves in the x-direction along with the element 707 thereby rotating the gear 733. This rotation of the gear 733 loads the clock spring 735. As described above and shown in FIG. 37, the slot 719 through which the bolt 711 passes is sloped downward at one end. When the bolt 711 enters this sloped area of the slot 719, the end of the trigger 125 closest to the second tab 702 is lowered such that the second tab 702 disengages the third tab 705 of the movable element 707. At this point, the force applied to the element 707 by the trigger 125 is removed, and the element 707 is released from the trigger 125. When this occurs, force from the clock spring 735, which has been loaded by movement of the rack 742 in the x-direction, spins the gear 733 until the tension in the spring 735 is exhausted. The rotation of the gear 733 is translated through the gear train 242 to the generator 294, which harnesses such energy thereby providing an electrical pulse. In embodiments according to the present invention, a clutch mechanism may be used to ensure that the generator 294 receives, from the gear train 242, energy for rotating the generator 294 in only one direction. The generator may be any type of generator that may accomplish this task such as, for example, a generator with a rotating electromagnet that rotates from rotation of the gear train 242 and generates electrical power based on the rotation of the rotating electromagnet.

After the movable element 707 is released by the trigger 125 such that the element 707 is rapidly forced in the direction opposite of the x-direction by the loaded clock spring 735, a peak of the star gear tooth 105 (FIG. 32) in contact with the first rod 642 passes the first rod 642 thereby reducing the force exerted by the star gear 102 on the force actuator 108 and ultimately the pull arm 111. Thus, the tension in the spring 133 begins to pull the trigger 125 in the direction opposite of the x-direction.

As the trigger 125 moves in the direction opposite of the x-direction, the second tab 702 contacts third tab 705 pushing the end of the movable element 707 closest to the first bolt 723 upward such that the movable element 707 pivots about the second bolt 725 in a clockwise direction relative to the view seen by FIG. 35. Such pivoting allows the second tab 702 to pass the third tab 705 as the trigger 125 moves in the direction opposite of the x-direction. A torsion spring 763 resists the pivoting movement and generally applies a downward pressure on the bolt 723 when the bolt 723, along the end of the element 707 closest to bolt 723, are lifted by the second tab 702. Thus, once the second tab 702 passes the third tab 705 as the trigger 125 is moving the direction opposite of the x-direction, the spring 763 forces the first bolt 723 downward such that the movable element 707 pivots about the second bolt 725 in the counter-clockwise direction thereby returning the third tab 705 into the path of the second tab 702, the position shown by FIG. 35. Accordingly, when the next star gear tooth 105 contacts the force actuator 108 moving the pull arm 111 in the x-direction, both the trigger 125 and the movable element 707 are pulled in the x-direction as described above, and the afore described process is repeated in order to generate another electrical pulse.

Moreover, the process of actuating and releasing the movable element 707 is continually repeated as long as the door 52 is moving thereby generating a series of electrical pulses. These pulses are used to charge an energy storage device such as, for example, a capacitor or battery (not shown), which provides a continuous supply of electrical power to electrical components of the door closer assembly 50 until the energy storage device has lost all power (e.g., capacitor is discharged). In one exemplary embodiment, a capacitor may be coupled to a voltage regulator (not shown), which regulates the voltage of the capacitor such that the voltage is constant as long as there is sufficient electrical power available to maintain the regulated voltage.

Figure 41:
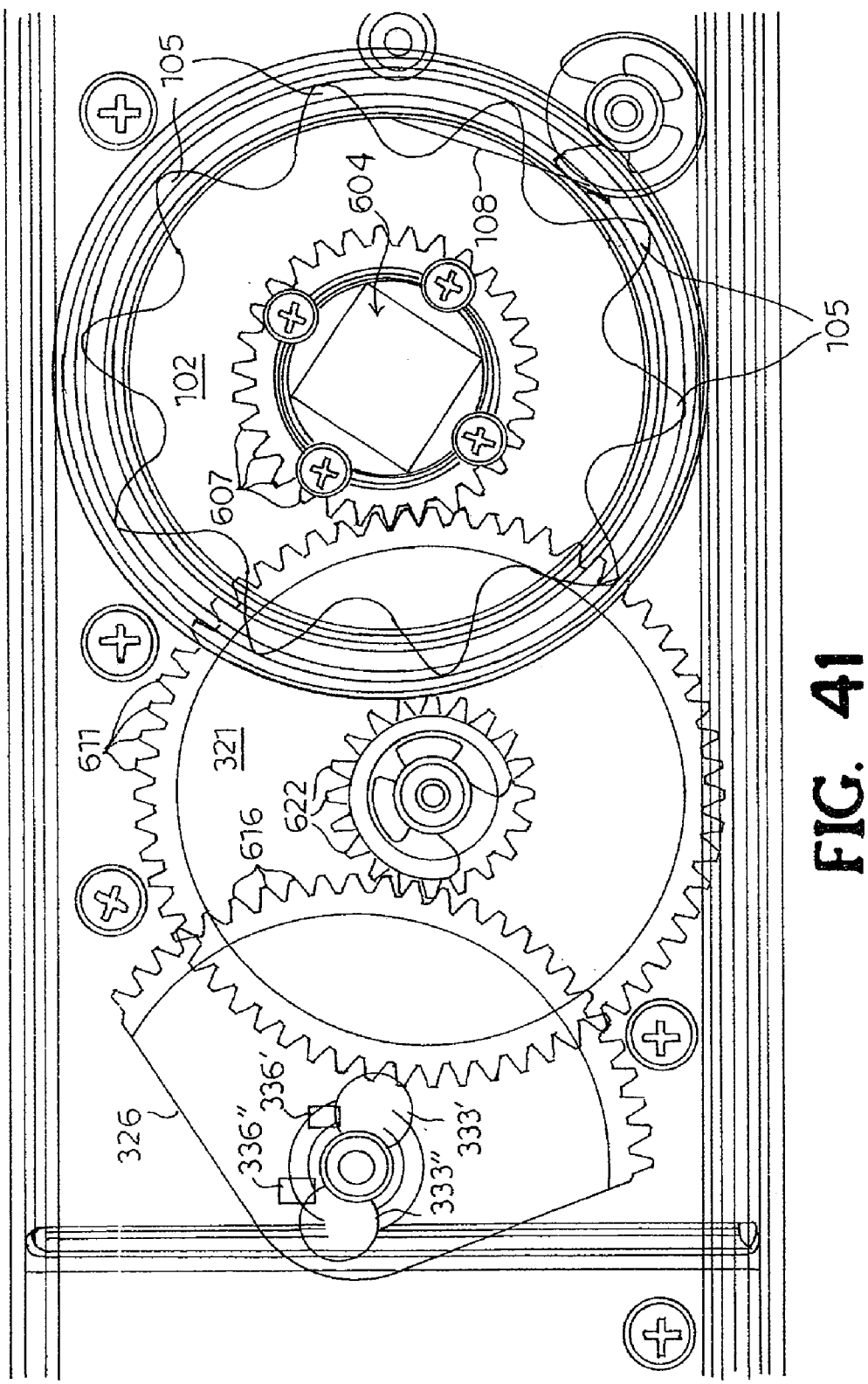
FIG. 41 is a gear train in a door closer according to an exemplary embodiment of the present invention.

FIG. 41 shows a gear train 242 in a door closer 60 according to an exemplary embodiment of the present invention. The gear train 242 may include one or more gears 326, 321, 102. An intermediate gear 321 may be coupled to an arm gear 326 and a star gear 102. The end of the pinion 66 passes through a hole 604 in the star gear 102. The end of the pinion 66 fits snugly through the hole 604 such that the star gear 102 rotates in unison with the end of the pinion 66. The star gear 102 has teeth 607 that engage teeth 611 of the intermediate gear 321. Further, the arm gear 326 has teeth 616 that engage a second set of teeth 622 of the intermediate gear 321. When the star gear 102 rotates due to rotation of the pinion 66, the intermediate gear 321 rotates due to the interaction of the intermediate gear teeth 611 and the star gear teeth 607. In addition, when the intermediate gear 321 rotates, the arm gear 326 rotates due to the interaction of the arm gear teeth 616 and the second set of teeth 622 of the intermediate gear 321. Thus, any rotation of the pinion 66 causes a corresponding rotation of the arm gear 326. In one embodiment, the pinion 66 rotates at a ratio of 6 to 1 relative to the arm gear 326. For example, for 6 degrees of rotation of the pinion 66, the arm gear may rotate 1 degree. However, other ratios are possible in other embodiments according to the present invention.

Moreover, as shown in FIG. 41, at least one magnet 333' is mounted on the arm gear 326, and at least one magnetic sensor 236 is mounted on the printed circuit board (PCB) 79. Note that the PCB 79 is removed from FIG. 41 for illustrative purposes. The magnetic sensor 236 is stationary, and the magnet 333' moves with the arm gear 326. Thus, any movement by the door 52 causes a corresponding movement by the magnet 333' relative to the sensor 236. The control software logic 280 may be configured to determine a value indicative of the magnetic field strength sensed by the sensor 336' and to map such value to the door's angular position. Further, as described above, the control software 280 may be configured to use the door's 52 angular position to adjust the valve's angular position to control the force generated by the closer 50. An exemplary operation and use of the door closer assembly 50 is described in more detail following.

To help illustrate embodiments according to the present invention, assume that it is desirable for the door closer assembly 50 to control the hydraulic force generated by the door closer assembly 50 during door opening based on two door angles, referred to hereafter as "threshold angles," of 50 degrees and 70 degrees. In this regard, assume that the door closer assembly 50 is to generate a first hydraulic force resistive of the door motion during opening for door angles less than 50 degrees. Between 50 and 70 degrees, the door closer assembly 50 is to provide a greater hydraulic force resistive of the door motion. For door angles greater than 70 degrees, the door closer assembly 50 is to provide a yet greater hydraulic force resistive of the door motion. Further assume that during closing, the door closer assembly 50 is to generate another hydraulic force for door angles greater than 15 degrees and a smaller hydraulic force for door angles equal to or less than 15 degrees.

Figure 42:
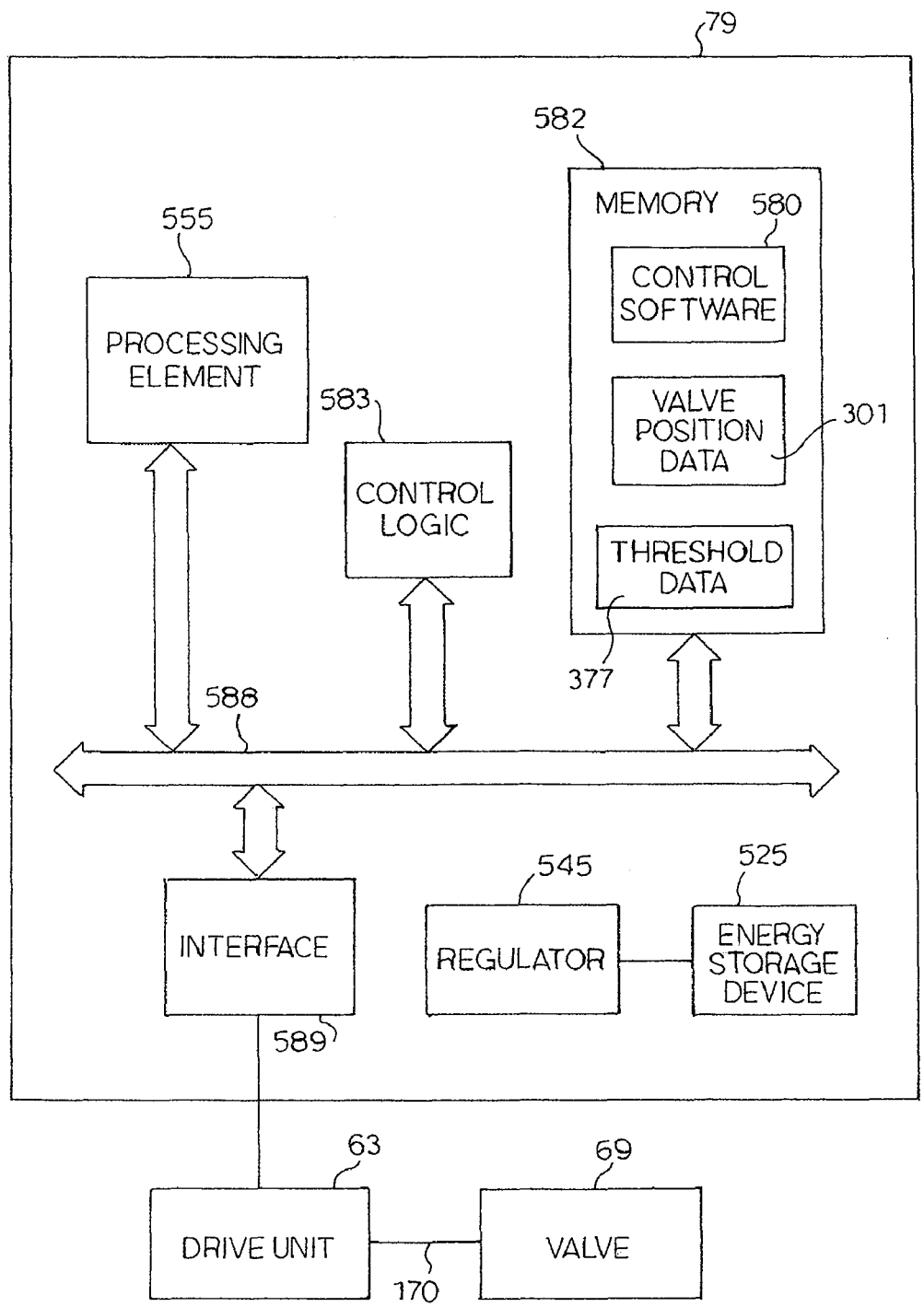
FIG. 42 is a block diagram of a control unit printed circuit board for controlling a valve of a door closer according to an exemplary embodiment of the present invention.

FIG. 42 shows a block diagram of a control unit 64 printed circuit board 79 for controlling a valve 100 of a door closer according to an exemplary embodiment of the present invention. The PCB 79 may include a processing element 555, a memory 582, control logic 583, a regulator 545, an energy storage device 525, and an electrical interface 589. The processing element 555, the memory 582, the control logic 583, and the electrical interface 589 may be interconnected via a local interface bus 588. The electrical interface 589 provides an interface for components on the PCB 79 to a drive unit 62. The drive unit 62 may be interconnected to a valve 100 via a cut-off screw 170. The control logic 583 may include various types of electronic components and may communicate with the processing element 555 and the memory 582 and may operate together with the control software 80 and/or the processing element 555 during control operations. In this regard, during discussion of embodiments of the present invention, if control software 580 is mentioned as performing a task, the control logic 583 may also be involved. Similarly, if the control logic 583 is mentioned as performing a task, the control software 580 may also be involved.

The memory 582 may contain information used in controlling a valve for operation of a door such as, for example, valve position data 301, the control software 580, and threshold data 377. The threshold data 377 includes desired opening and closing characteristics for the door 52. For example, the threshold data 377 may indicate the door angles and the desired angular position of the valve 69 for each door angle range. In particular, the data 377 may indicate that the angular position of the valve 69 is to be at one position, referred to hereafter as the "high-flow position," when the door angle is 50 degrees or less during opening. The data 377 may also indicate that the angular position of the valve 69 be at another position, referred to hereafter as the "medium-flow position," when the door angle is greater than 50 degrees but less than or equal to 70 degrees during opening. The threshold data 377 may further indicate that the angular position of the valve 69 is to be at yet another position, referred to hereafter as the "low-flow position," when the door angle is greater than 70 degrees during opening. The medium-flow position allows a lower flow rate than that allowed by the high-flow position, and the low-flow position allows a lower flow rate than that allowed by the medium-flow position. Thus, using the above threshold data 377, the hydraulic forces generated by the closer 60 resisting door movement should be at the highest above a door angle of 70 degrees and at the lowest below a door angle of 50 degrees. In addition, for illustrative purposes the threshold data 377 may also indicate that, when the door is closing, the angular position of the valve is to be at the medium-flow position for angles above 15 degrees and at the low-flow position for angles less than or equal to 15 degrees. According to embodiments of the present invention, the threshold data 377 that includes the door opening threshold data and the door closing threshold data may be changed as desired by a user. For example, the threshold data 377 may be customized based on an environment that the door exists 52 in, or based on the nature of people opening and closing the door. The stored threshold data 377 may be programmed and changed by the use of selectors 999 on the exterior of the door closer assembly 50.

For illustrative purposes, assume that the door 52 is initially closed and a user pushes the door 52 to an angle of 80 degrees in order to walk through the doorway. Responsive to the door 52 opening, the generator 294 begins to generate electrical power, which powers electronics in the control unit 64. For example, the processing element 555 begins a power-up process upon receiving electrical power above a threshold and then may begin to execute the control software 580 in the memory 582. Upon execution by the processing element 555 the control software 580 determines the angular position of the valve 100 based on the magnetic sensor 299. In this regard, the control software 580 may enable the sensor 299 and take a reading of the sensor 299. The control software 580 then maps the sensor reading to the valve's angular position using the stored valve position data 301. In the instant example, assume that the valve 69 is initially set to the high-flow position.

The control software 580 may also determine the door angle based on the sensor 336' residing on the arm gear 326. Assume that at this first reading of the sensor 336' the door angle is less than 50 degrees as the door 52 has just started opening. The control software 580 determines whether the valve's angular position is to be adjusted. In this regard, the control software 580 determines whether the door 52 is opening or closing based on the door angle. If the door angle is increasing, then the control software 580 determines that the door 52 is opening. If the door angle is decreasing, the control software 580 determines that the door 52 is closing. In the instant example, the door 52 is opening, and the door angle is increasing.

The control software 580 accesses the threshold data 377 based on the current angle of the door 52, to determine the appropriate valve 100 position. In the instant example, the door angle is less than 50 degrees and the door is opening. Therefore, the control software 580 determines that the valve 100 should be set to the high-flow position. In addition, the control software 580 determines, based on the valve's current angular position, that no adjustment is needed since the valve 100 is already at the appropriate position.

Moreover, according to embodiments of the present invention, power is saved by the control software 580 determining whether to transition to a power-off state. In one exemplary embodiment, such a decision may be based on the amount of electrical power that is available to continue powering the electrical components of the door closer assembly 50. There are various techniques that can be used to determine the amount of power that is currently available. In one embodiment, an energy storage device such as, for example, a capacitor or a battery, (not shown) may be mounted on the PCB 79 and charged by energy from the generator 294. Using a capacitor for the energy storage device for illustration, the control software 580 may monitor the amount of charge stored by the capacitor. When the charge stored by the capacitor falls below a predefined threshold, the control software 580 may determine that it is time to transition to a power-off state. In such a case, the control software 580 transitions the processing element 555 to a power-off state. For example, the control software 580 may cause the processing element 555 to power down so that no further power is drawn by the processing element 555 until the door 52 is later moving thereby causing the generator 294 to generate power and restarting the process. In addition, according to embodiments of the present invention, during operation any of the electrical components, including the processing element 555, may be shut down or transitioned to a sleep state in order to conserve electrical power.

The control software 580 may take another reading of the door angle and repeat the process until the control software 580 determines that the door angle has increased above 50 degrees. When this occurs, the control software 580 accesses the threshold data 377 and may determine that the valve 100 should be in the medium-flow position, assuming that the door angle is still less than 70 degrees. Since the valve 100 is currently in the high-flow position, the control software 580 determines that the valve position should be adjusted. The control software 580 may cause the processing element 555 to transmit a signal (e.g., a pulse width modulation (PWM) signal), to the motor 194, sufficient for causing the motor 194 to drive the cut-off screw 170 such that the valve's position is transitioned from the high-flow position to the medium-flow position. As a result, the valve 100 restricts its flow rate such that the force generated by the door closer assembly 50 for resisting the movement of the door 52 is increased.

If desired, the control software 580 may cause the processing element 555 take additional readings of the valve sensor 299 to assist with control of the motor 194 and/or to ensure that the cut-off screw 170 is rotated to put the valve 100 in the appropriate position. In this regard, readings of the door sensor 336 and the valve sensor 299 may be continuously periodically taken while power is available and the valve position adjusted accordingly. The processor may be put into a sleep mode for a period to conserve power between cycles of reading the door sensor 336 and the valve sensor 299. Further, once the position of the door 52 is read from the door sensor 336, it may be desired to only repeatedly read the valve sensor 299 to insure the correct position of the valve 100. Also, since additional readings of the valve sensor 299 increase power requirements, it may be desirable to adjust the angular position of the valve 100 without any additional readings of the valve sensor 299.

When the door angle exceeds 70 degrees, the control software 580 determines that the valve position is to be adjusted to the low-flow position. Accordingly, the control software 580 causes the processing element 555 to control the motor 194 such that the cut-off screw 170 is rotated causing the valve 100 to transition to the low-flow position. Therefore, the hydraulic force generated by the door closer assembly 50 and resisting the movement of the door 52 is further increased.

Assume that, at some point, the door 52 is released or stopped and not opening. When this occurs, one or more springs in the door closer assembly 50, which were loaded as the door 52 was being opened, may now generate a sufficient force to start closing the door 52 thereby decreasing the door angle. In such a state, the hydraulic force generated by the door closer assembly 50 may counteract the force generated by the one or more springs, which are closing the door 52. Upon sensing closing of the door 52 based on door angles read from the door sensor 336, the control software 580 determines that the valve position is to be adjusted to the medium-flow position. Accordingly, the control software 580 causes the processing element 555 to control the motor 194 such that the cut-off screw 170 is rotated causing the valve 100 to transition to the medium-flow position. Therefore, the hydraulic force generated by the door closer assembly 50 resisting the movement of the door 52 is decreased.

When the door angle falls below 15 degrees during closing, the control software 580 determines that the valve position is to be adjusted to the high-flow position. Accordingly, the control software 580 causes the processing element 555 to control the motor 264 such that the cut-off screw 170 is rotated causing the valve 69 to transition to the high-flow position. Therefore, the hydraulic force generated by the door closer assembly 50 and resisting the movement of the door 52 is further decreased.

Once the door 52 fully closes, the generator 294 no longer receives power since the door 52 is no longer moving. Thus, the generator 294 stops generating power. Power may still be stored in the energy storage device 525 from the recent door movement. Eventually, the control software 580 determines that the available power from the energy storage device 525 has significantly decreased and makes the determination to transition the processing element 555 (and possibly other elements in the control unit 64) to a power-off state. The processing element 555 remains in a power-off state until the door 52 is later moved, (such as when the door is again opened) thereby causing power to be provided to the processing element 555 from the generator 294 and energy storage device 525 and restarting the process of reading the door sensor 336 (i.e., angular position of the door), the valve sensor 299 (i.e., angular position of the valve), and adjusting the angular position of the valve 100 accordingly.

Figure 43:
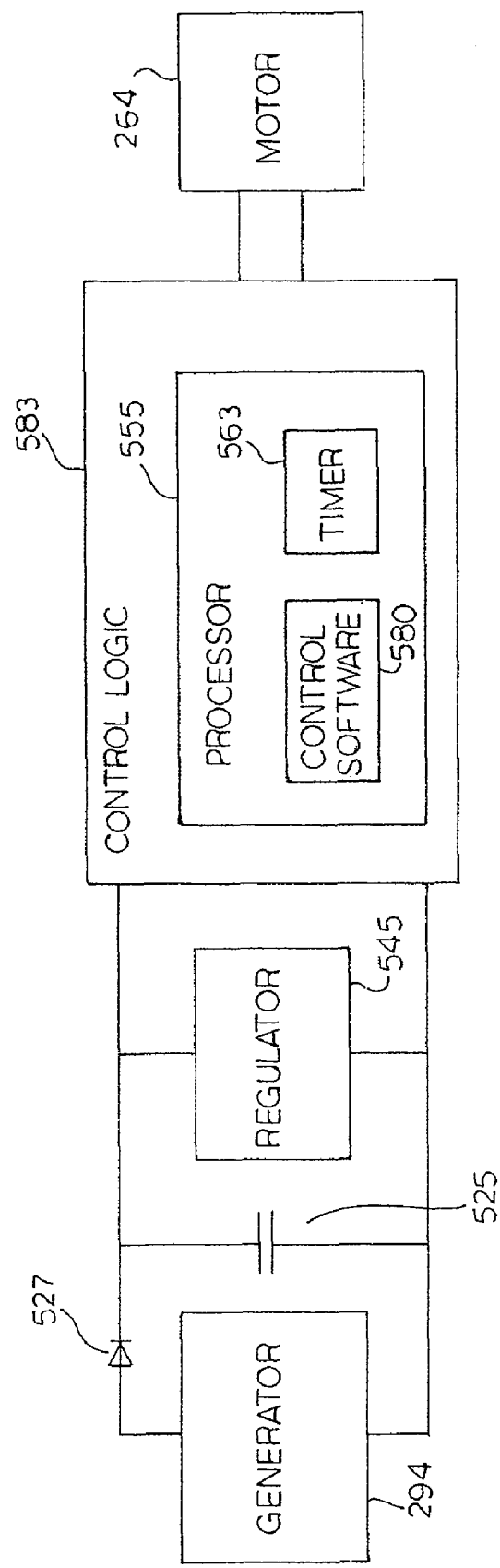
FIG. 43 is a diagram of a circuit for conserving power in a door closer assembly according to an exemplary embodiment of the present invention.

FIG. 43 shows a diagram of a circuit for conserving power in a door closer assembly 50 according to an exemplary embodiment of the present invention. The circuit may include the generator 294 coupled to the energy storage device 525 where both may be coupled to a regulator 545 and control logic 583. The control logic 583 may be connected to a motor 194 and may include a microprocessor 555. In this exemplary embodiment, the processor 555 is shown as being a part of the control logic 583. Further, the processor 555 contains memory for storing the control software 580 and also includes a timer function 563. Embodiments of the present invention are not limited to this design as the control software 580 and the timer 563 may reside outside of the processor 555 and/or outside of the control logic 583.

As noted previously, according to embodiments of the present invention, to further help conserve power, the control software 580 monitors the amount of power that is available and takes various actions based on the amount of available power. In this regard, an energy storage device 525 may be coupled to the generator 294 via a diode 527. To help illustrate embodiments of the present invention a capacitor is shown as the energy storage device. As noted previously, when a tooth 105 of the star gear 102 disengages from the activator 108 allowing the spring 133 to move the trigger 125 rapidly in a direction opposite of the x-direction FIG. 33A-34B, the generator 294 generates an electrical pulse. As long as the door 52 continues moving, the generator 294 repetitively generates electrical pulses since the trigger 125 is being actuated again and again.

Each electrical pulse from the generator 294 charges the capacitor 525. Further, the capacitor 525 discharges over time between pulses. Accordingly, if the door 52 is moving fast enough, electrical power is continually delivered to control logic 283 during such movement. Further, a voltage regulator 545 may be coupled to the capacitor 525 and regulate the capacitor voltage so that this voltage is constant. This is provided that there is sufficient power available to maintain the constant voltage. For example, in one embodiment according to the present invention, the regulator 545 may regulate the voltage across capacitor 525 to a particular voltage, for example, 3 volts. Thus, as long as the capacitor 525 is sufficiently charged, the regulator 545 keeps the voltage across capacitor 525 equal to 3 volts. However, if the door stops moving, thereby stopping the generation of electrical pulses by the generator 294, then the voltage across capacitor 525 eventually falls below 3 volts as the capacitor 525 starts to discharge.

According to embodiments of the present invention, the control logic 583 may include a microprocessor 555. Further, at least a portion of the control software 580 may be implemented in software and run on the microprocessor 555. The timer 563 in the microprocessor 555 may be configured to generate an interrupt at certain times, as will be described in more detail hereafter.

The parameters on which decisions are made to adjust valve position may change relatively slowly compared to the speed of a typical microprocessor. In this regard, a typical microprocessor is capable of detecting parameters that have a rate of change on the order of a few microseconds. A longer time period may likely occur between changes to the state of the valve position. To help conserve power, the control software 580 may be configured to transition the microprocessor 555 to a sleep state after checking the valve sensor 299 and the door sensor 336 and adjusting the valve position based on these readings, if appropriate.

Before transitioning the microprocessor 555 to the sleep state, the control software 580 may first set the timer 563 to expire a specified amount of time (e.g., 100 milliseconds) after the transition of the microprocessor 555 to the sleep state. When the timer 563 expires, the timer 563 generates an interrupt, causing the microprocessor 555 to awaken from its sleep state. Upon awakening, the control software 580 may check the valve sensor 299 and the door sensor 336 and adjust the valve position based on these readings, if appropriate. Thus, according to embodiments of the present invention, the microprocessor 555 may repetitively enter and exit a sleep state thereby saving electrical power while the microprocessor 555 is in a sleep state. Moreover, in embodiments according to the present invention, other components of the control logic 583 may similarly be transitioned into and out of a sleep state, if desired.

In one exemplary embodiment, the control software 580 may monitor the voltage across the capacitor 525 to determine when to perform an orderly shut-down of the control logic 583 and, in particular, the microprocessor 555. In this regard, the control software 580 may be configured to measure the voltage across the capacitor 525 and to compare the measured voltage to a predefined threshold voltage level, referred to hereafter as the "shut-down threshold." In one embodiment, the shut-down threshold may be established such that it is lower than the regulated voltage but within the acceptable operating voltage for the microprocessor 555. In this regard, many microprocessors 555 have a specified operating range for supply voltage to the microprocessor 555. If the microprocessor 555 is operated outside of this range, then errors are likely. Thus, the shut-down threshold may be established such that it is equal to or slightly higher than the lowest acceptable operating voltage of the microprocessor 555, according to the microprocessor's specifications as indicated by its manufacturer. It may also be possible for the shut-down threshold to be set lower than such minimum voltage, but doing so may increase the risk of error.

If the measured voltage falls below the shut-down threshold, then the capacitor 525 has likely discharged to the extent that continued operation in the absence of another electrical pulse from the generator 294 is undesirable. In such case, the control software 580 may initiate an orderly shut-down of the control logic 583 and, in particular, the microprocessor 555 such that continued operation of the microprocessor 555 at voltages outside of the desired operating range of the microprocessor 555 is prevented. Once the shut-down of the microprocessor 555 is complete, the microprocessor 555 no longer draws electrical power.

In addition, the control software 580 may be configured to take other actions based on the measured voltage of the capacitor 525. For example, in one embodiment according to the present invention, the control software 580 may be configured to delay or prevent an adjustment of valve position based on the measured voltage of the capacitor 525. In this regard, as the capacitor 525 discharges, the measured voltage (which is indicative of the amount of available power remaining) may fall to a level that is above the shut-down threshold but nevertheless at a level for which the shut-down threshold will likely be passed if an adjustment of valve position is allowed and performed. Performing an adjustment of the valve position may consume a relatively large amount of electrical power compared to other operations, such as reading the valve sensor 299 and the door sensor 336. As noted previously, to change the valve position, the motor 194 may be actuated such that the cut-off screw 170 is driven to an appropriate position in order to effectuate a desired valve position change. If the voltage of the capacitor 525 is close to the shut-down threshold before a desired valve position adjustment, then the power usurped by the motor 194 in effectuating the valve position adjustment may cause the voltage of the capacitor 525 to fall significantly below the shut-down threshold.

To prevent the capacitor 525 voltage from falling significantly below the shut-down threshold, the control software 580 may compare the measured voltage of the capacitor 525 to a threshold, referred to hereafter as the "delay threshold," before initiating a valve position change. The delay threshold may be lower than the regulated voltage but higher than the shut-down voltage. The delay threshold is preferably selected such that, if it is exceeded prior to a valve position adjustment, then the power usurped to perform a valve position adjustment is not likely to cause the capacitor 525 voltage to fall significantly below the shut-down threshold.

If the measured voltage of the capacitor 525 is below the delay threshold but higher than the shut-down threshold, then the control software 580 may wait before initiating the valve position adjustment and continue monitoring the capacitor's 525 voltage. If an electrical pulse is generated by the generator 294 before the shut-down threshold is reached, then the electrical pulse should charge the capacitor 525 and, therefore, raise the voltage of the capacitor 525. If the measured voltage increases above the delay threshold, then the control software 580 may initiate the valve position adjustment. However, if the measured voltage eventually falls below the shut-down threshold, then the control software 580 may initiate an orderly shut-down of the circuitry 540 and, in particular, the microprocessor 555 without performing the valve position adjustment.

Figure 44:
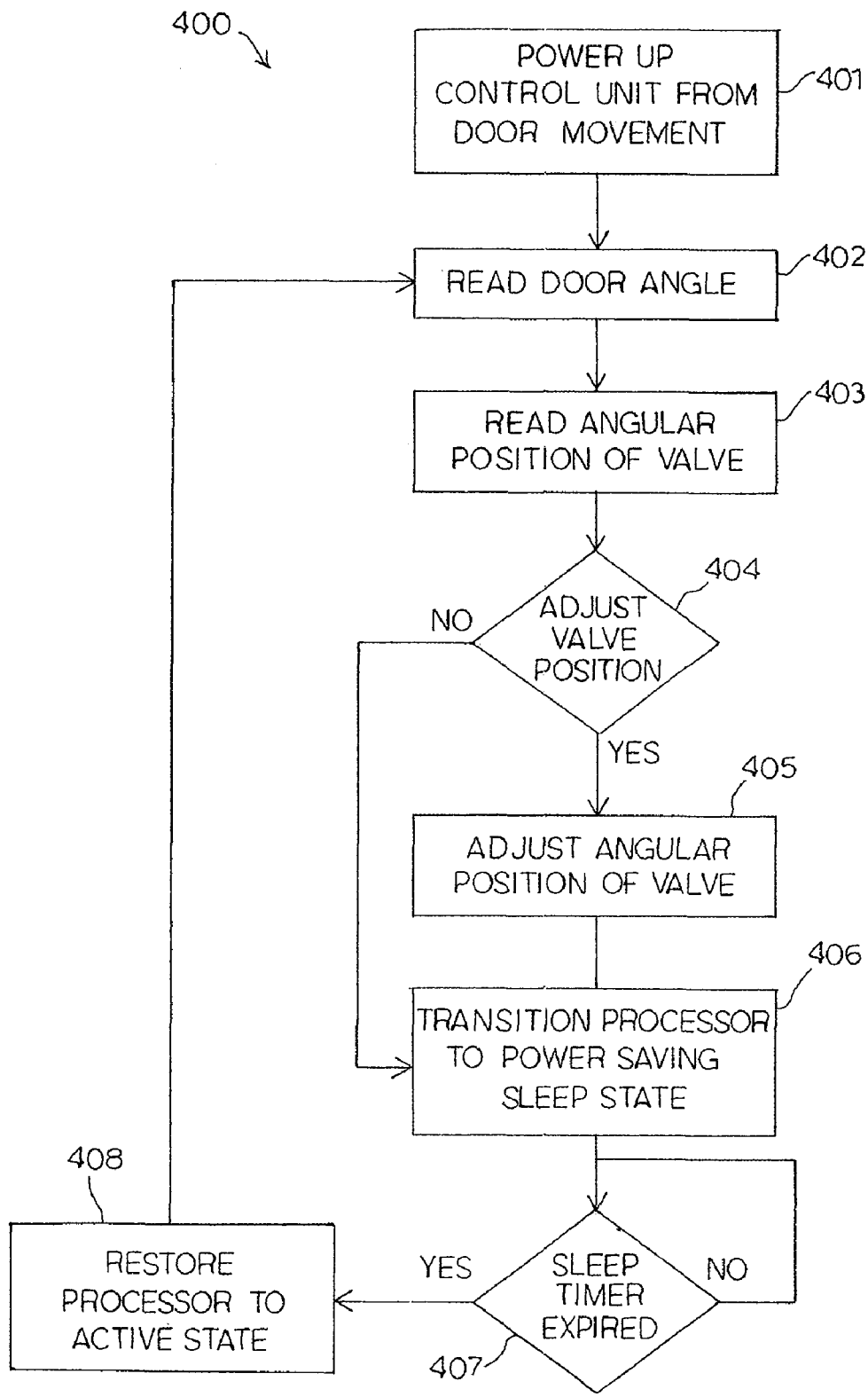
FIG. 44 is a flowchart of a process for self-powered operation of a door closer according to an exemplary embodiment of the present invention.

FIG. 44 shows a flowchart of a process for self-powered operation of a door closer 60 according to an exemplary embodiment of the present invention. In the process 400, in block 401 a control unit 64 in a door closer assembly 50 is powered up from movement of a door 52. In block 402 an angular position of the door 52 is read. In block 403 an angular position of a valve 100 is read. In block 404 it may be determined if the valve 100 is to be adjusted and if so, then in block 405 the angular position of the valve 100 may be adjusted and in block 406 a processor 555 transitioned to a power saving sleep state. If the valve 100 is not to be adjusted then in block 406 the processor may be transitioned to a power saving sleep state. Then in block 407 it may be determined whether a sleep timer 563 has expired and if not the process loops on block 407 and waits for the timer to expire. If the sleep time has expired then in block 408 the processor 555 may be restored to an active state and the process repeat where in block 402 the angular position of the door 52 is again read. The process may repeat while the control logic 582 and the processor 555 have power thus continually adjusting the angular position of the valve 100, if needed, based on the angular position of the door 52.

Figure 45A:
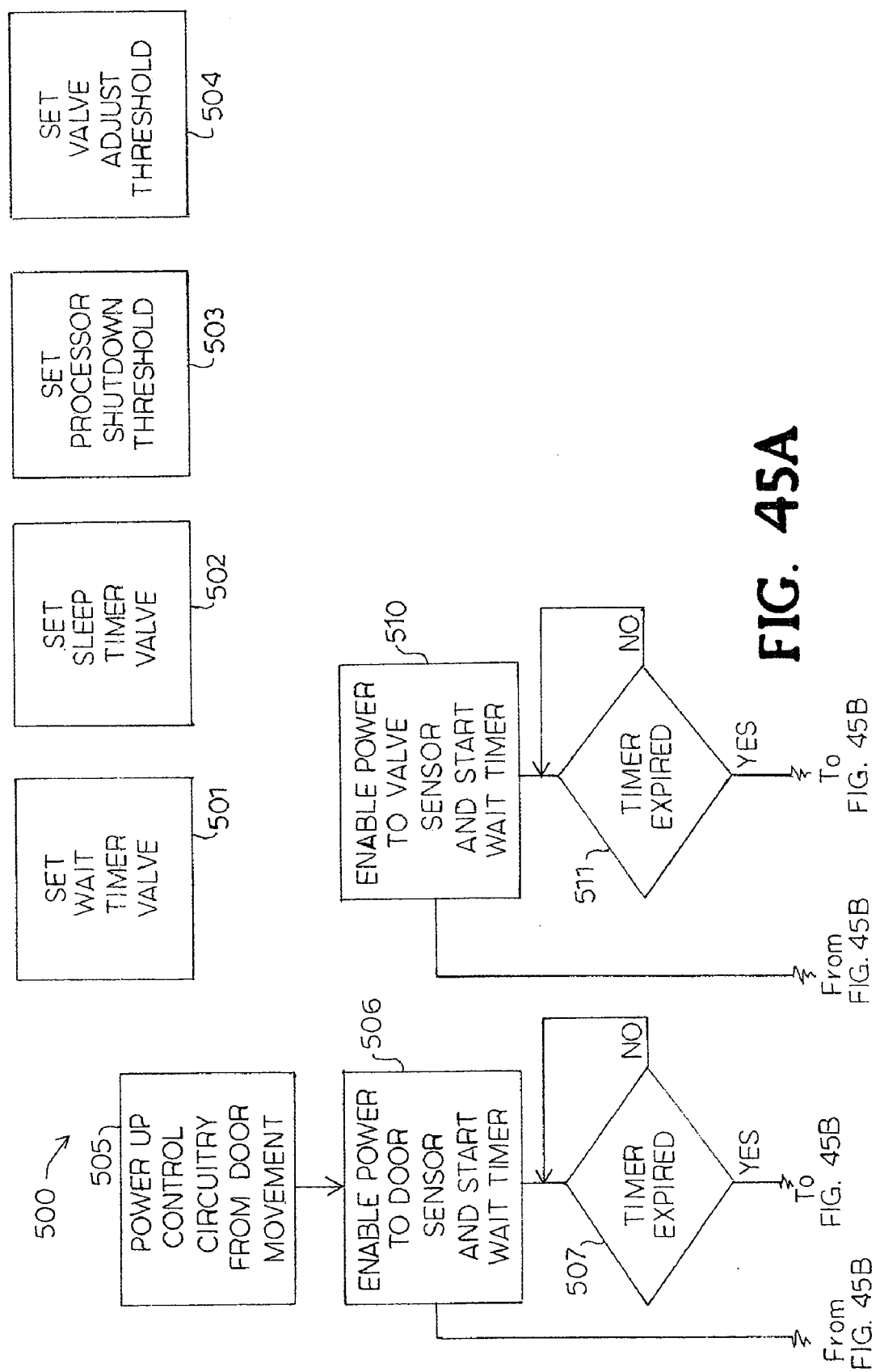
FIG. 45 is a flowchart of a process for self-powered operation of a door closer according to another exemplary embodiment of the present invention.
Figure 45C:
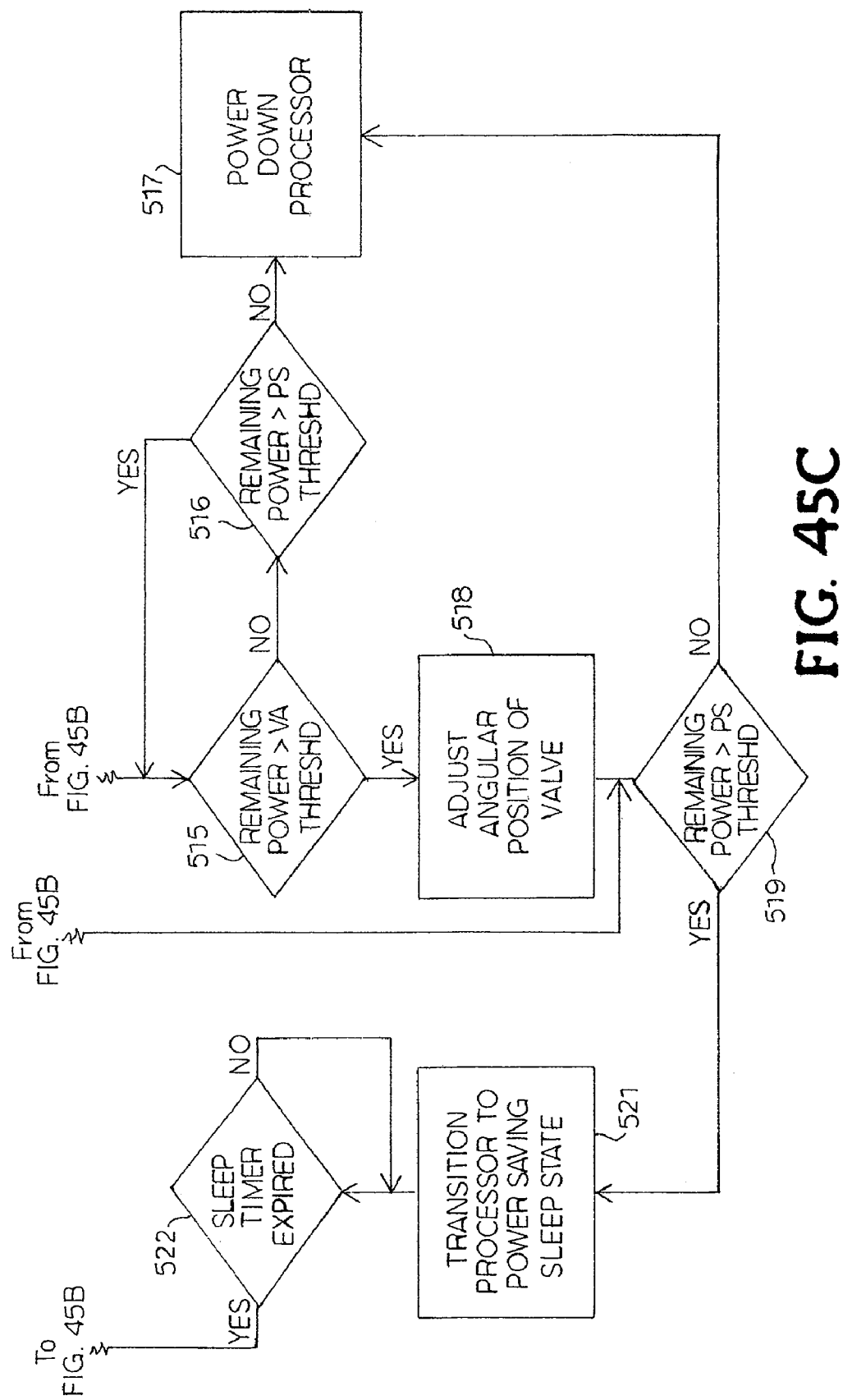

FIG. 45 shows a flowchart of a process for self-powered operation of a door closer 60 according to another exemplary embodiment of the present invention. In this example embodiment, power to the valve sensor 299 and the door sensor 336 are enabled only to take readings from these sensors and then they are disabled. In the process 500, initially certain parameters used in the process may be setup. For example, in block 501 a wait timer value may be set, in block 502 a sleep timer value may be set, in block 503 a processor shutdown threshold may be set, and in block 504 a valve adjust threshold may be set. These parameters may be used in different parts of the process.

In response to movement of a door 52, power may be generated. In block 505 control circuitry in a door closer 60 may receive power generated from movement of the door 52 and thus be powered up. In block 506, power to a door sensor 336 may be enabled and a wait timer 563 started. The wait timer 563 may be set with a value that allows time for an accurate sensor reading. In block 507 it may be determined if the wait timer 563 has expired and if not, the process continues to make this determination. If the wait timer 563 has expired then in block 508 an angular position of the door 52 may be read. In block 509 power to the door sensor 336 may be disabled.

In block 510, power to a valve sensor 299 may be enabled and the wait timer 563 started. The wait timer 563 may be set with a value that allows time for an accurate sensor reading. In block 511 it may be determined if the wait timer 563 has expired and if not, the process continues to make this determination. If the wait timer 563 has expired then in block 512 an angular position of the valve 100 may be read. In block 513 power to the valve sensor 299 may be disabled. In block 514 it may be determined if the position of the valve 100 needs to be adjusted. If the position of the valve 100 does need adjusting, then in block 515 it may be determined if the remaining power level is larger than a valve adjust threshold, and if not then in block 516 it may be determined if the remaining power level is larger than the processor shutdown threshold, and if not then in block 517 the processor 555 may be shut down and powered off. If the remaining power level is larger than the processor shutdown threshold, then the process returns to block 515 to determine if the remaining power level is larger than the valve adjust threshold.

If the remaining power level is larger than the valve adjust threshold, then in block 518 the angular position of the valve 100 may be adjusted. If the valve position is not to be adjusted (block 514) or after adjusting the angular position of the valve 100 then in block 519 it may be determined if the remaining power level is larger than the processor shutdown threshold and if not, then in block 517 the processor 555 may be shut down and powered off. If the remaining power level is larger than the processor shutdown threshold, then in block 521 the processor 555 may then be transitioned to a power saving sleep state. In block 522 it may be determined if a sleep timer 563 has expired and if not, the process 555 may keep checking. If the sleep timer 563 has expired, then an interrupt may be generated to the processor 555 and in block 523 the processor 555 may be restored an active state. Then the process may return to block 506 where power to the door sensor 336 may be enabled and the wait timer 563 started, and the process repeated.

Figure 46A:
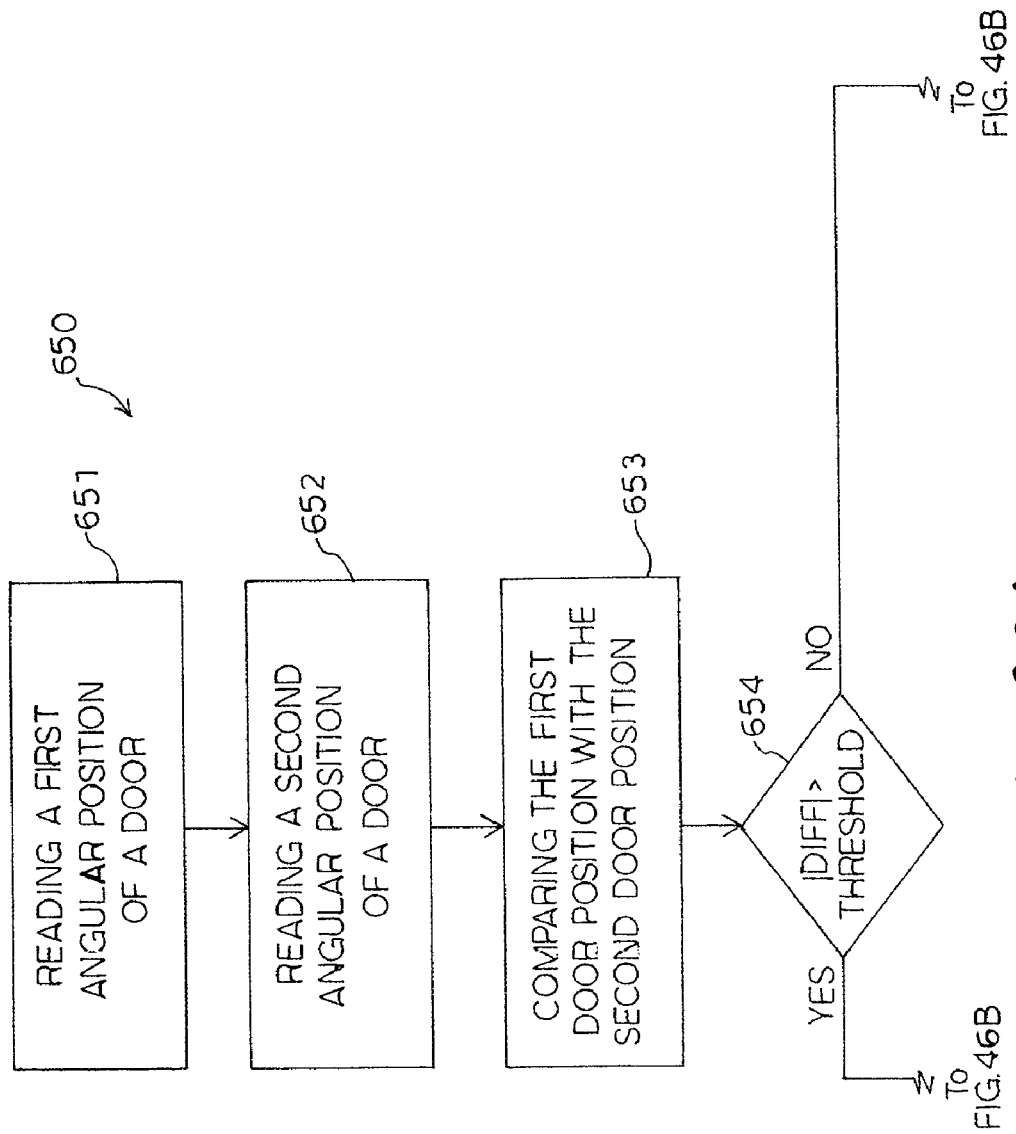
FIG. 46 is a flowchart of a process for processing a door movement according to an exemplary embodiment of the present invention.
Figure 46B:
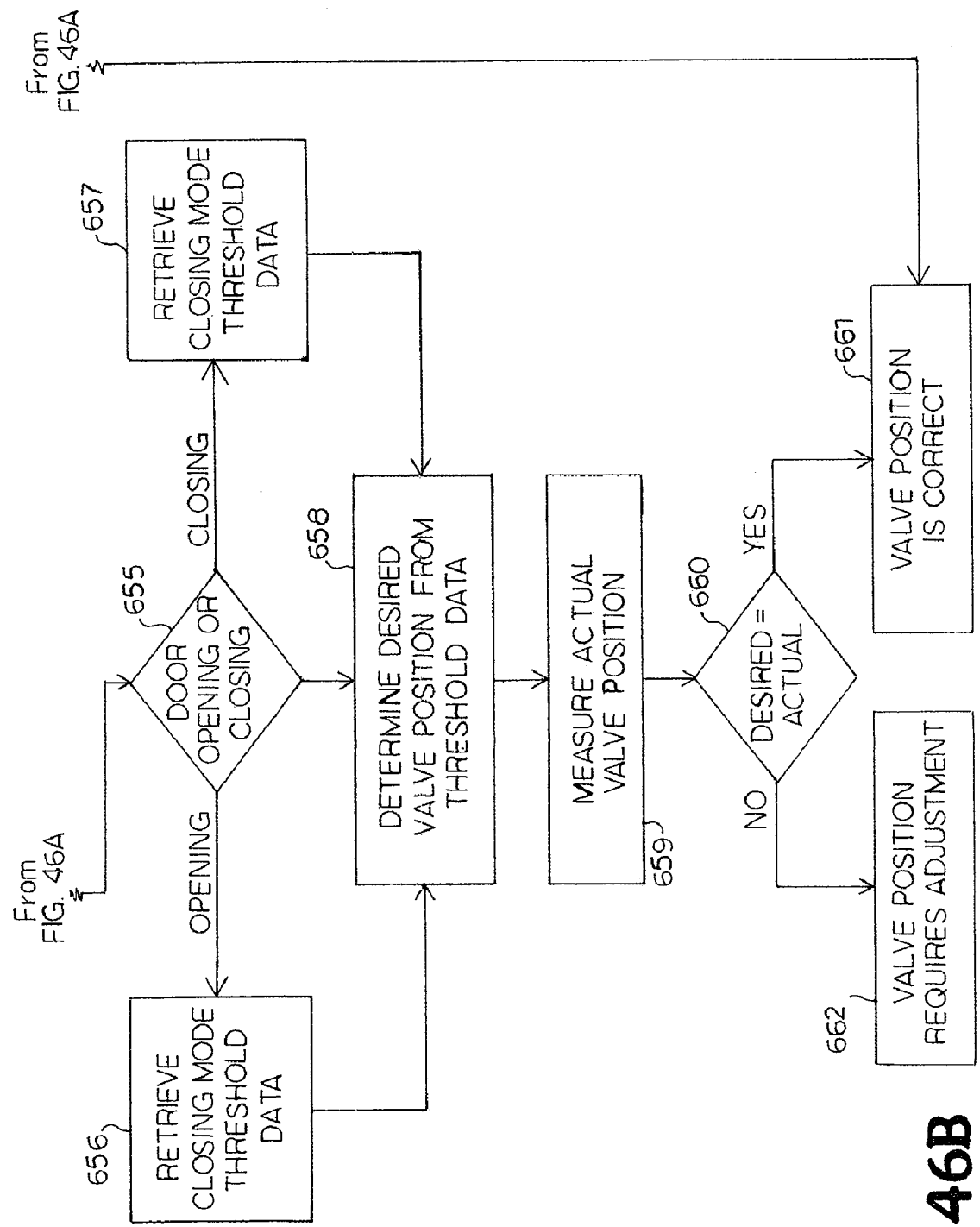

FIG. 46 shows a flowchart of a process for processing a door movement according to an exemplary embodiment of the present invention. In the process 650, in block 651 a first angular position of a door 52 is read. This may occur after movement of the door 52 is detected resulting in control logic 580 being powered up. In block 652 a second angular position of the door 52 may be read. In block 653 the first angular position of the door 52 and the second angular position of the door 52 may be compared. In block 654 it may be determined if the difference between the two door positions is larger than a defined threshold and if not, in block 661 the valve position may be determined to be correct and not need adjustment.

If the difference between the two door positions is larger than the defined threshold, then in block 655 it may be determined whether the door 52 is opening or closing. If the door 52 is opening, the in block 656 opening mode threshold data may be retrieved, whereas if the door 52 is closing then in block 657 closing mode threshold data may be retrieved. The opening mode threshold data and the closing mode threshold data contain information regarding desired valve positions relative to angular positions of the door 52. In block 658 the desired valve position may be determined from the threshold data. In block 659 the current actual valve position may be measured. In block 660 it may be determined if the desired valve position is the same as the actual valve position and if so, then in block 661 the valve position may be determined to be correct and not need adjustment. If the desired valve position is not the same as the actual valve position, then in block 662 the valve position may require adjustment.

An initial position of a door 52 may be determined by reading an angular position of the door 52 (i.e., door angle). For example, the control logic 580 may take a reading of the door sensor 336 to determine a door angle, referred to hereafter as the "initial door angle." After the initial reading, the control logic 580 takes another reading of the door sensor 336 to determine a second door angle, referred to hereafter as the "current door angle." The control logic 580 then compares the two door angles. For example, the control logic 580 may subtract the current door angle from the initial door angle. The control logic 580 may compare the absolute value of the difference between the two door angles to a predefined threshold, referred to hereafter as the "hysteresis threshold". The hysteresis threshold may be selected such that it is not exceeded if the door 52 is stationary (e.g., closed) or is moving to such a small degree such that adjusting the valve position is undesirable.

For example, a user may have opened the door 52 and be holding the door 52 open at substantially the same angle. Thus, the user is not attempting to further close or open the door 52 but is rather attempting to hold the door 52 open at a constant angle. However, minute changes in the door angle may nevertheless occur as the user is attempting to hold the door 52 at a substantially constant angle. Without a degree of hysteresis, the control logic 580 might otherwise change its determination as to whether to operate in an opening mode or a closing mode and therefore needlessly adjust the valve position many times while the user is holding the door 52 open. Such adjustments not only usurp electrical power but also may increase wear on the components used to adjust the valve position. Thus, the hysteresis threshold may be selected to provide a desired level of hysteresis for the determination as to whether the closer 60 should operate in the opening mode or closing mode.

If the hysteresis threshold is not exceeded, then the control logic 580 may determine that no adjustment of the valve position is to be performed. However, if the hysteresis threshold is exceeded, then the control logic 580 may further consider whether a valve position adjustment is to be performed. In this regard, based on the sign of the difference between the two door angles subtracted, the control logic 580 may determine whether the door 52 is opening or closing and, therefore, whether the control logic 580 should operate in the opening mode or the closing mode. If the initial door angle is greater than the current door angle, then the control logic 580 may determine that the door 52 is closing and that the control logic 580 should operate in the closing mode. If the initial door angle is less than the current door angle, then the control logic 603 may determine that the door is opening and that the control logic 580, therefore, should operate in the opening mode.

Depending on the mode of operation, the control logic 580 may retrieve a subset of the threshold data 377. In particular, the control logic 580 may retrieve the portion of the data 377 that is to be compared to the angular position of the valve 69 read for the selected mode of operation. In this regard, if in the closing mode, then the control logic 580 retrieves the data to be used to select the desired valve position when the door is closing whereas, if in the opening mode, the control logic 580 retrieves the data to be used to select the desired valve position when the door is opening. Based on the current door angle, the control logic 580 determines the desired valve position, as indicated by the retrieved data 377. The control logic 580 may also determine whether the actual position of the valve 69 matches the desired valve position. If so, the control logic 580 may determine that no valve position adjustment is to be performed. If not, the logic 580 determines that a valve position adjustment is to be performed and appropriately adjust the position of the valve 100, thereby changing the state of the valve 100, so that the valve 100 is set to its desired position, assuming that the there is sufficient power available to make the adjustment. Accordingly, a state (e.g., flow rate) of the valve 100 is changed.

Figure 47:
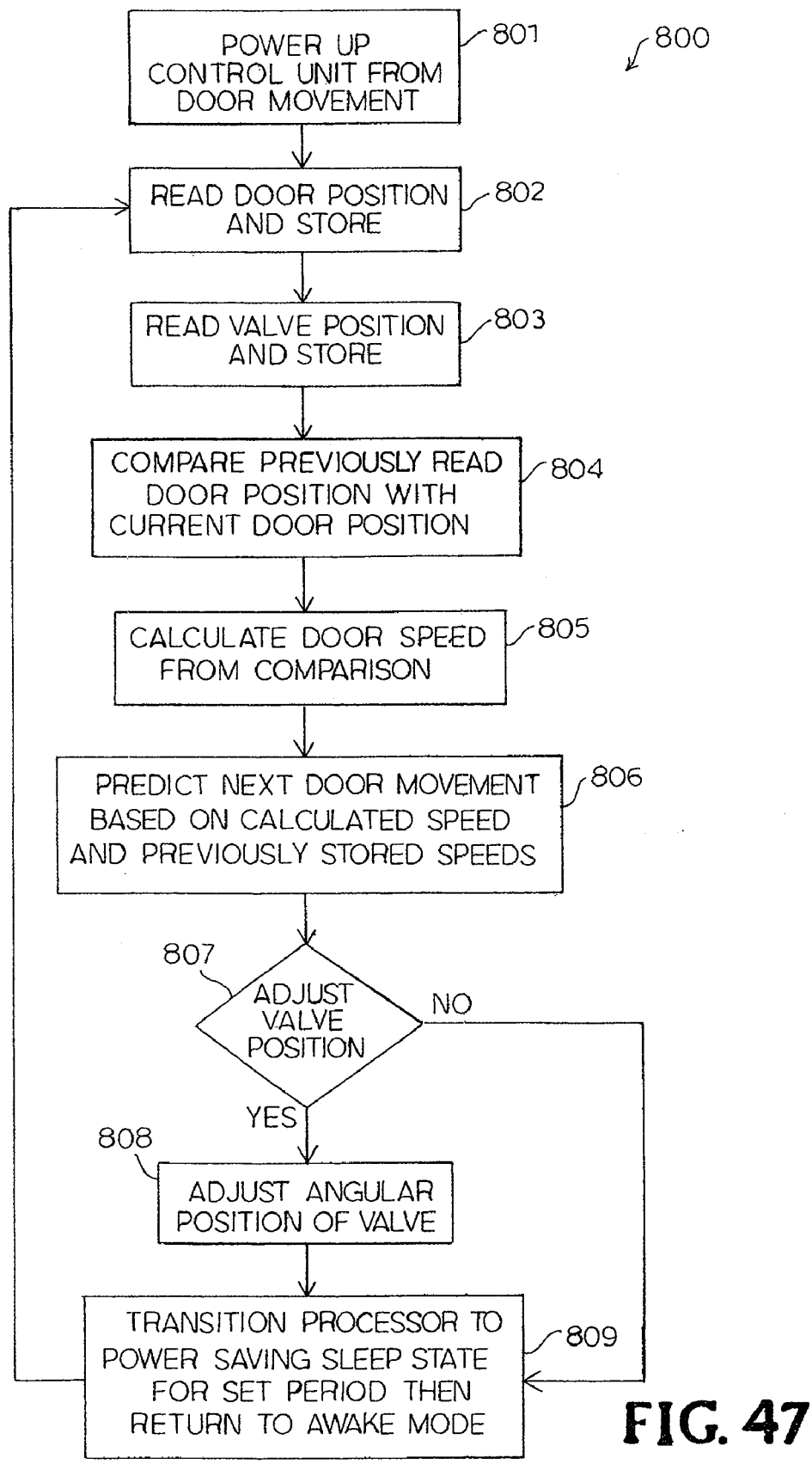
FIG. 47 is a flowchart of a process for processing a door movement according to another exemplary embodiment of the present invention.

FIG. 47 shows a flowchart of a process for processing a door movement according to another exemplary embodiment of the present invention. In the process 800, in block 801 a control unit 64 is powered up from movement of a door 52. In block 802 an angular position of the door 52 is read and stored. In block 803 an angular position of the valve 100 is read and stored. In block 804 the currently read door position may be compared with the previously read door position. In block 805 a speed of movement of the door 52 may be calculated based on the comparison. In block 806 a next door movement may be predicted based on the calculated door speed and previously stored door speeds. In block 807 it may be determined whether an angular position of a valve 100 should be adjusted and if so, in block 808 the angular position of the valve 100 may be adjusted and in block 809 a processor 555 may be transitioned to a power saving sleep state for a set period of time and then awakened. If the angular position of a valve 100 should not be adjusted then in block 809 the processor 555 may be transitioned to a power saving sleep state for a set period of time and then awakened. The process may then repeat by returning to block 802 where an angular position of the door 52 is again read and stored. Therefore, according to embodiments of the present invention, two successive door angles may be read, stored and compared to determine a speed of movement of the door 52 and the speed used with other previously stored speeds to predict a next possible position of the door 52.

Figure 48A:
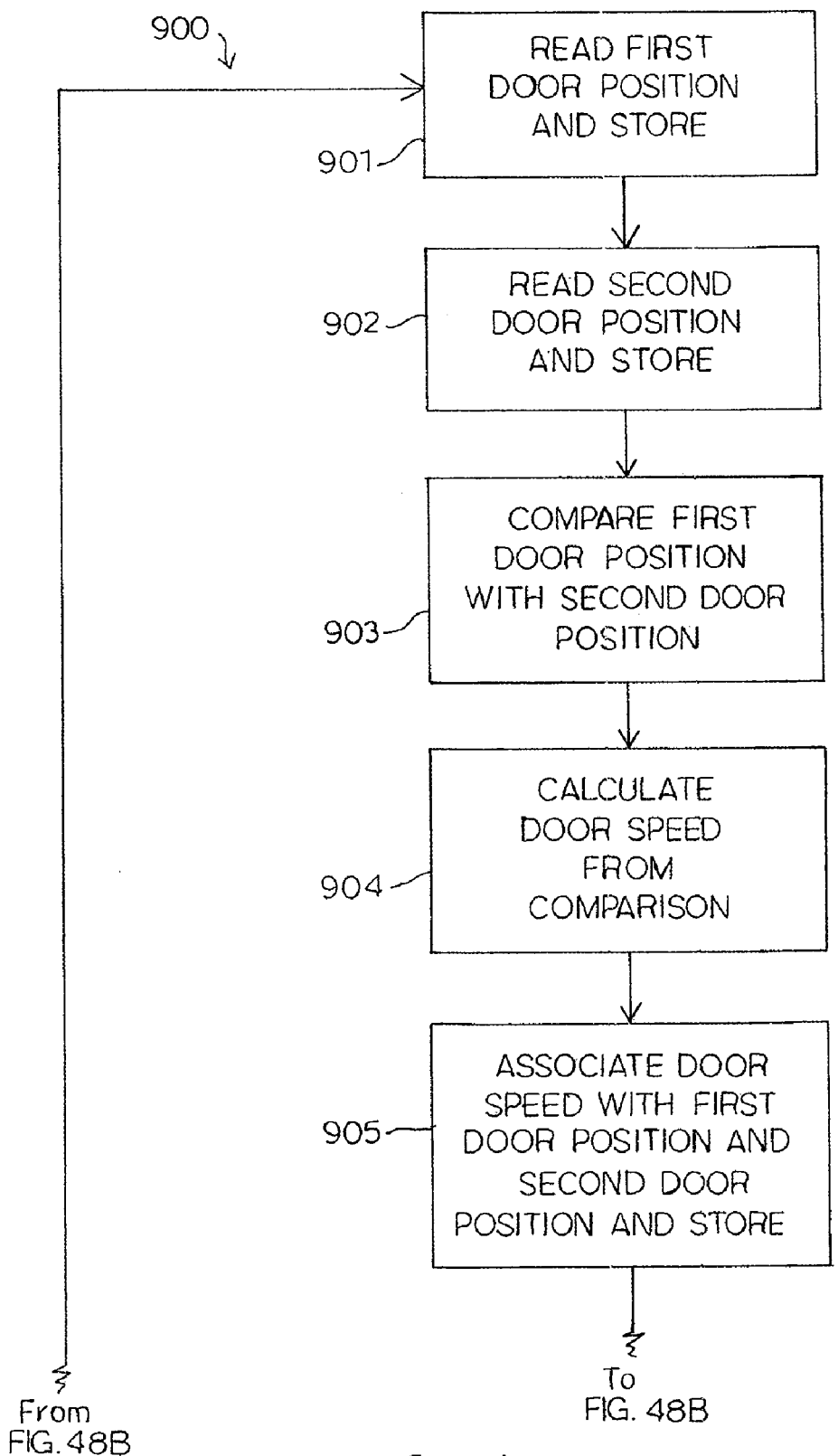
FIG. 48 is a flowchart of a process for processing a door movement according to a still further exemplary embodiment of the present invention.
Figure 48B:
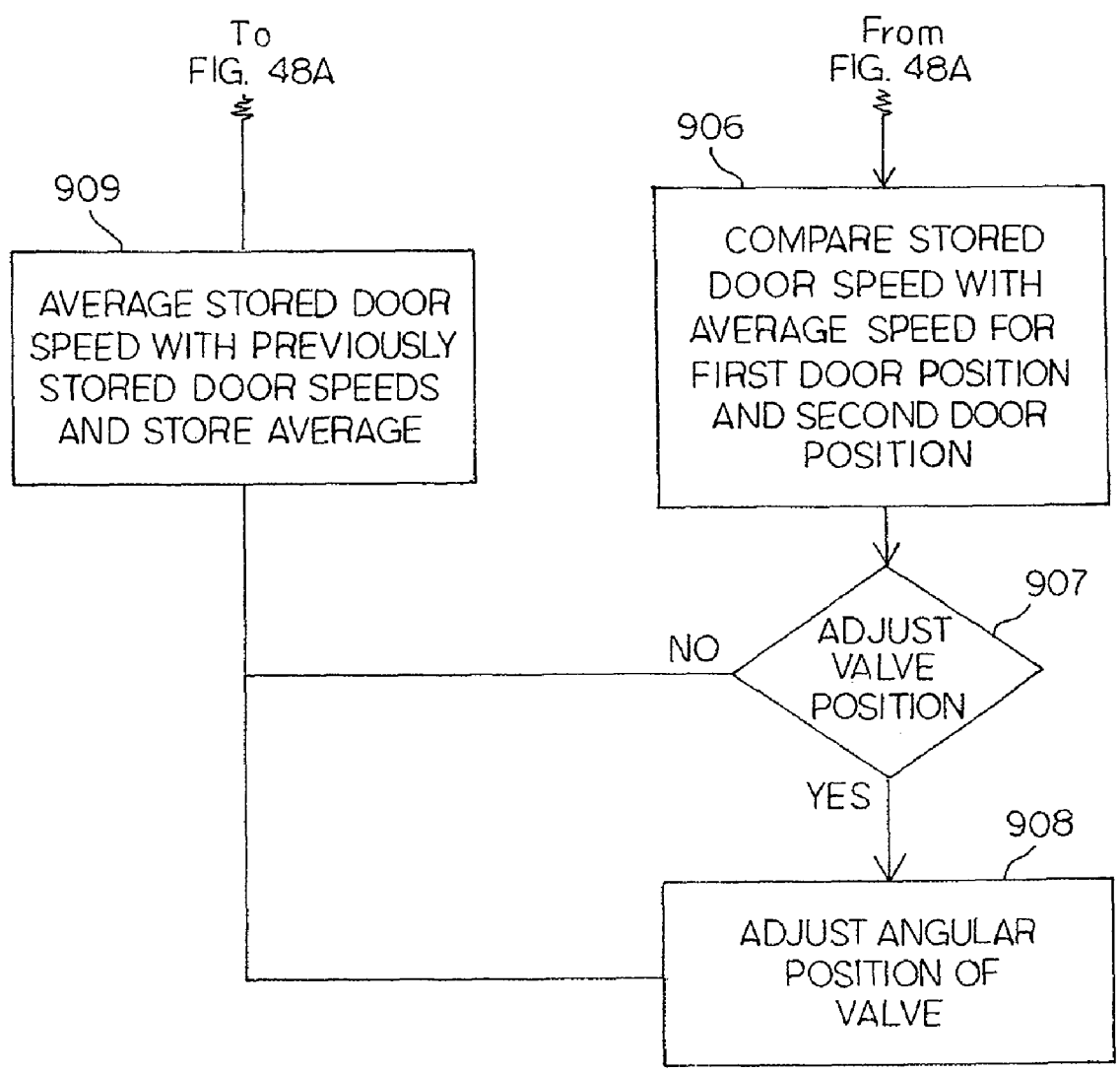

FIG. 48 shows a flowchart of a process for processing a door movement according to a still further exemplary embodiment of the present invention. In the process 900, in block 901 a first angular position of a door 52 is read and stored. In block 902 a second angular position of the door 52 is read and stored. In block 903 the first door position may be compared with the second door position. In block 904 a speed of movement of the door may be calculated based on the comparison. In block 905 the door speed may be associated with the first door position and the second door position and stored. In block 906 the stored door speed may be compared to an average speed for the first door position and the second door position. The average speed may be a value that is an average of multiple previous speeds calculated and stored for the same first door position and same second door position. In block 907 it may be determined whether an angular position of a valve 100 should be adjusted and if so, in block 908 the angular position of the valve 100 may be adjusted and in block 909 the stored door speed may be averaged with previously stored door speeds for the same first door position and second door position and stored and the process repeat to block 901 where a first angular position of a door 52 is read and stored. If the angular position of a valve 100 should not be adjusted then in block 909 the stored door speed may be averaged with previously stored door speeds for the same first door position and second door position and stored and the process repeat to block 901 where a first angular position of a door 52 is read and stored. Therefore, according to embodiments of the present invention, an angular position of valve 100 may be adjusted based on a door speed being compared to a stored average door speed thus preventing inadvertent adjustment of the valve 100 based on an abnormal movement of the door such as a sudden wind gust.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, some of the novel features of the present invention could be used with any type of hydraulic door closer. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

What is claimed is:

1. A door closer assembly, comprising:
   a valve, the valve regulating an amount of hydraulic fluid that flows through the valve, the amount of hydraulic fluid flowing through the valve controlling a force generated by the door closer assembly on a door;
   a first sensor, the first sensor measuring an angular position of the door;
   a second sensor, the second sensor measuring an angular position of the valve, the angular position of the valve determining the amount of hydraulic fluid flowing through the valve; and
   a controller, the controller controlling the adjustment of the valve based on the angular position of the door and the angular position of the valve,
   wherein the controller reads a first angular position of the door from the first sensor and then reads a second angular position of the door from the first sensor, and the controller determines a difference between the first angular position and the second angular position and compares the difference with a threshold value.

2. The door closer assembly according to claim 1, wherein the controller determines whether the door is opening or closing based on the comparison and the difference between the first angular position and the second angular position.

3. The door closer assembly according to claim 2, wherein the controller retrieves one of opening mode threshold data or closing mode threshold data when the difference is above the threshold value.

4. The door closer assembly according to claim 3, wherein the controller controls the adjustment of the valve based on one of the opening mode threshold data or the closing mode threshold data.

5. The door closer assembly according to claim 3, wherein the opening mode threshold data and the closing mode threshold data define desired valve positions based on the measured angular position of the door.

6. The door closer assembly according to claim 5, wherein the controller makes no adjustment of the valve when the difference is below the threshold value.

7. The door closer assembly according to claim 3, wherein the opening mode threshold data and the closing mode threshold data are determined by settings on the exterior of the door closer.

* * * * *